US008310538B2

(12) United States Patent
Yanagita

(10) Patent No.: US 8,310,538 B2
(45) Date of Patent: Nov. 13, 2012

(54) IMAGING APPARATUS, METHOD, PROGRAM, AND RECORDING MEDIUM USED IN THE PROGRAM

(75) Inventor: Satoshi Yanagita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 13/142,779

(22) PCT Filed: Nov. 2, 2010

(86) PCT No.: PCT/JP2010/069464
§ 371 (c)(1),
(2), (4) Date: Jun. 29, 2011

(87) PCT Pub. No.: WO2011/114572
PCT Pub. Date: Sep. 22, 2011

(65) Prior Publication Data
US 2011/0298917 A1 Dec. 8, 2011

(30) Foreign Application Priority Data

Mar. 19, 2010 (JP) ................................ 2010-064385

(51) Int. Cl.
H04N 7/18 (2006.01)
(52) U.S. Cl. .......................... 348/135; 348/153; 348/159
(58) Field of Classification Search .................. 348/135, 348/153, 159
See application file for complete search history.

(56) References Cited

U.S. PATENT DOCUMENTS

| 6,741,250 | B1 * | 5/2004 | Furlan et al. | 345/427 |
|---|---|---|---|---|
| 2008/0055420 | A1 | 3/2008 | Orihashi et al. | |
| 2009/0214107 | A1 | 8/2009 | Masuda | |
| 2011/0141297 | A1 | 6/2011 | Orimoto et al. | |

FOREIGN PATENT DOCUMENTS

| EP | 2 096 603 A1 | 9/2009 |
|---|---|---|
| JP | 2003-92768 A | 3/2003 |
| JP | 2004-120600 A | 4/2004 |
| JP | 2005-45328 A | 2/2005 |
| JP | 2005045328 A * | 2/2005 |

(Continued)

Primary Examiner — Sath V Perungavoor
Assistant Examiner — Jeffery Williams
(74) Attorney, Agent, or Firm — Birch, Stewart, Kolasch & Birch, LLP

(57) ABSTRACT

According to the present invention, a cut-out size with a predetermined aspect ratio common to a plurality of images acquired from each of a plurality of imaging units is determined based on a minimum size among sizes of possible areas around an initial optical axis center, and an image for output is cut out from each of the plurality of images in the common cut-out size determined by a size determination unit based on the initial optical axis center before each vibration correction of the plurality of imaging units. Alternatively, according to the present invention, a cut-out size with a predetermined aspect ratio common to images from each of a plurality of imaging units is determined based on a minimum value of sizes of possible cut-out areas independent of vibration correction corresponding to the plurality of imaging units, and an image for output is cut out from each of the plurality of imaging units in the common cut-out size determined by the size determination unit based on the initial optical axis center before each vibration correction of the plurality of imaging units. As a result, output images, in which the optical axis center position is maintained before and after the camera shake correction, can be obtained, and stereoscopic vision is possible using the images for output.

22 Claims, 65 Drawing Sheets

FOREIGN PATENT DOCUMENTS

| | | |
|---|---|---|
| JP | 2008-64863 A | 3/2008 |
| JP | 2008-164338 A | 7/2008 |
| JP | 2009-14445 A | 1/2009 |
| JP | 2009-205193 A | 9/2009 |
| JP | 2010-32969 A | 2/2010 |
| WO | WO 2010/013733 A1 | 2/2010 |

* cited by examiner

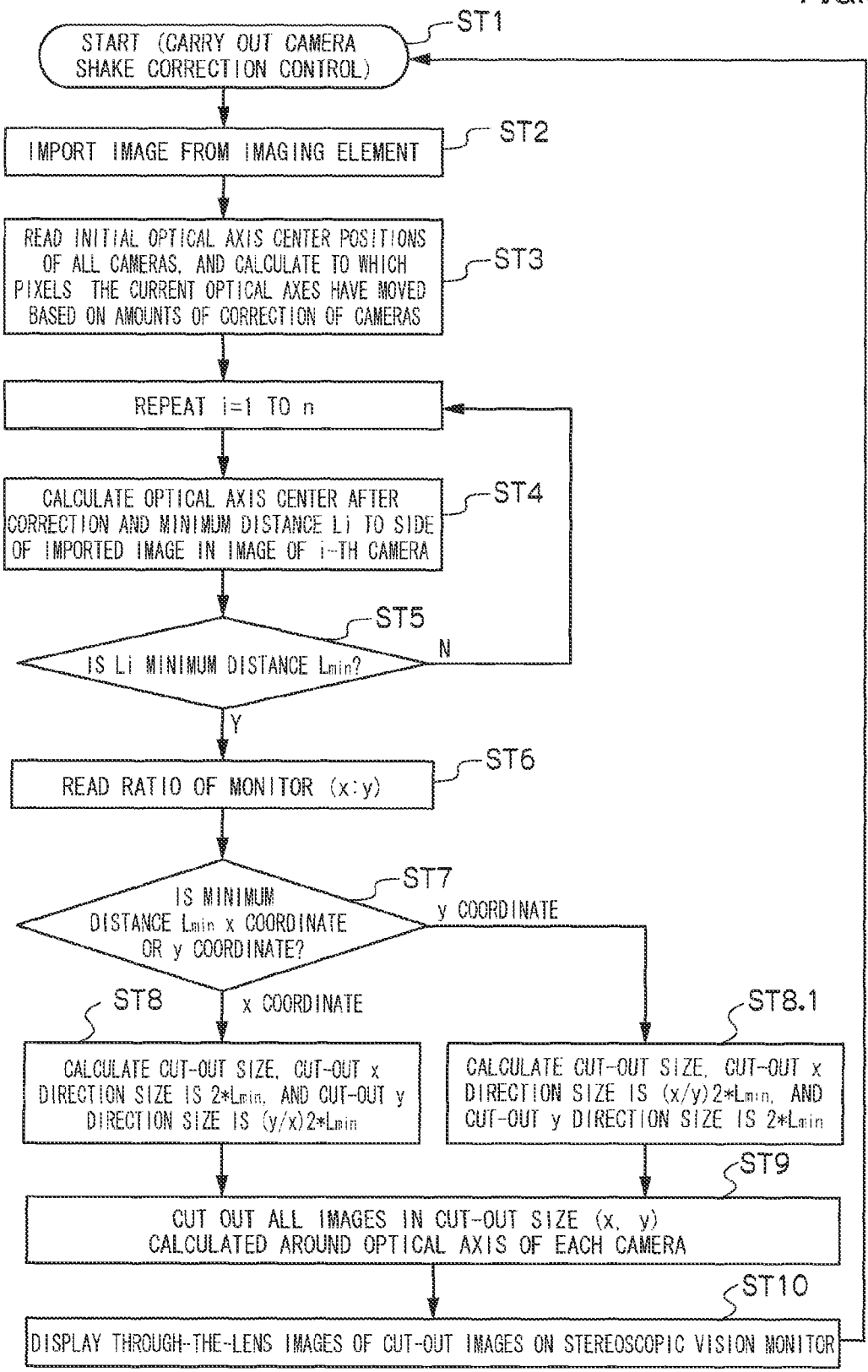

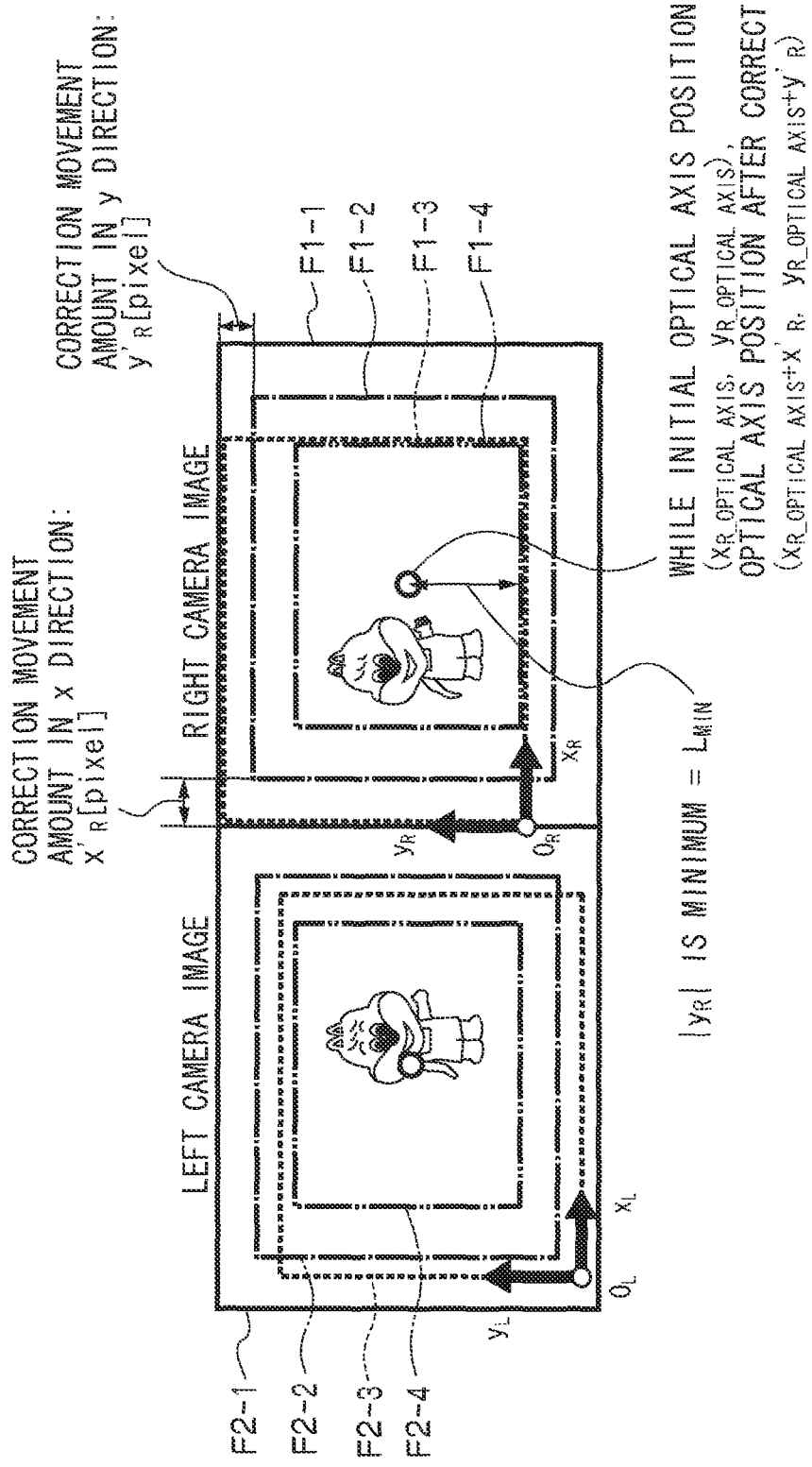

EXAMPLE OF IMAGE CUT OUT WITHOUT IMAGE INFORMATION

EXAMPLE OF IMAGE IN WHICH AREA PIXEL INFORMATION CUT OFF IN THE MIDDLE OF IMAGE PROCESSING IS INPUTTED TO PIXEL PART WITHOUT PIXEL INFORMATION

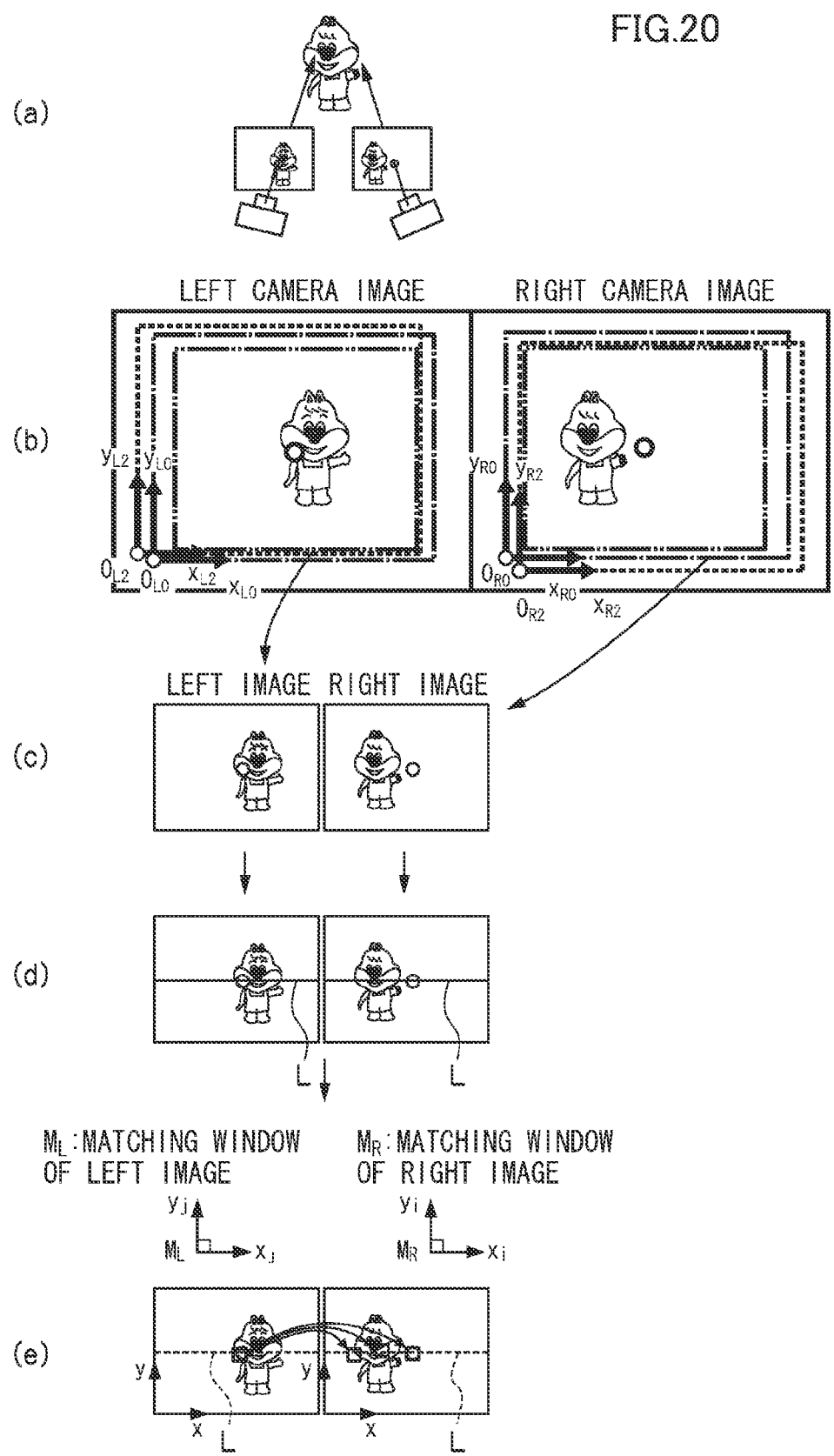

FIG.23A
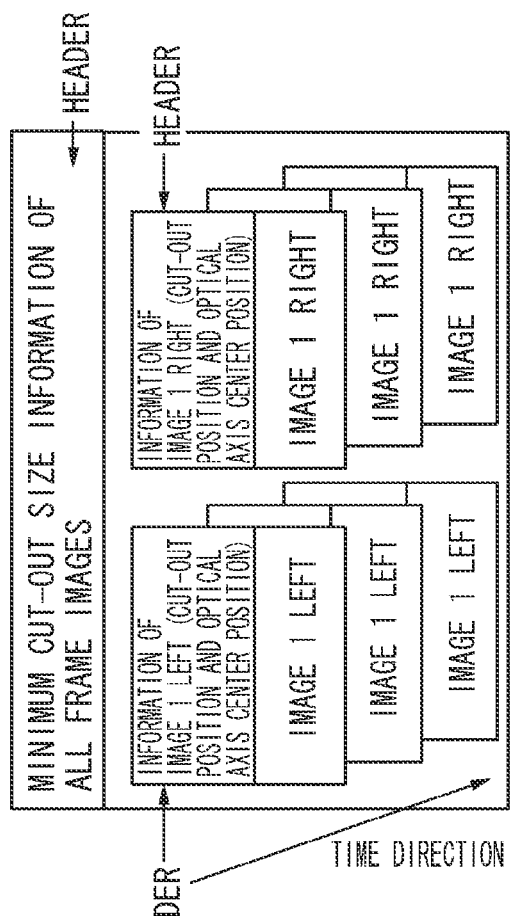
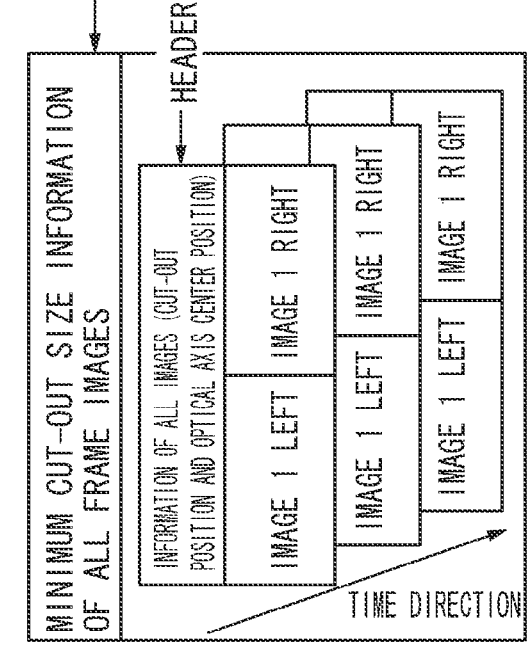

FIG.23B
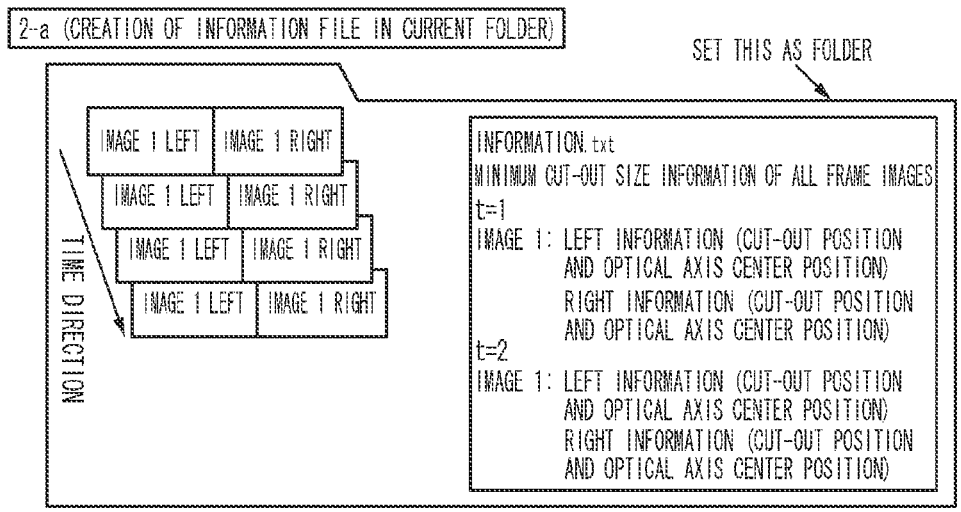
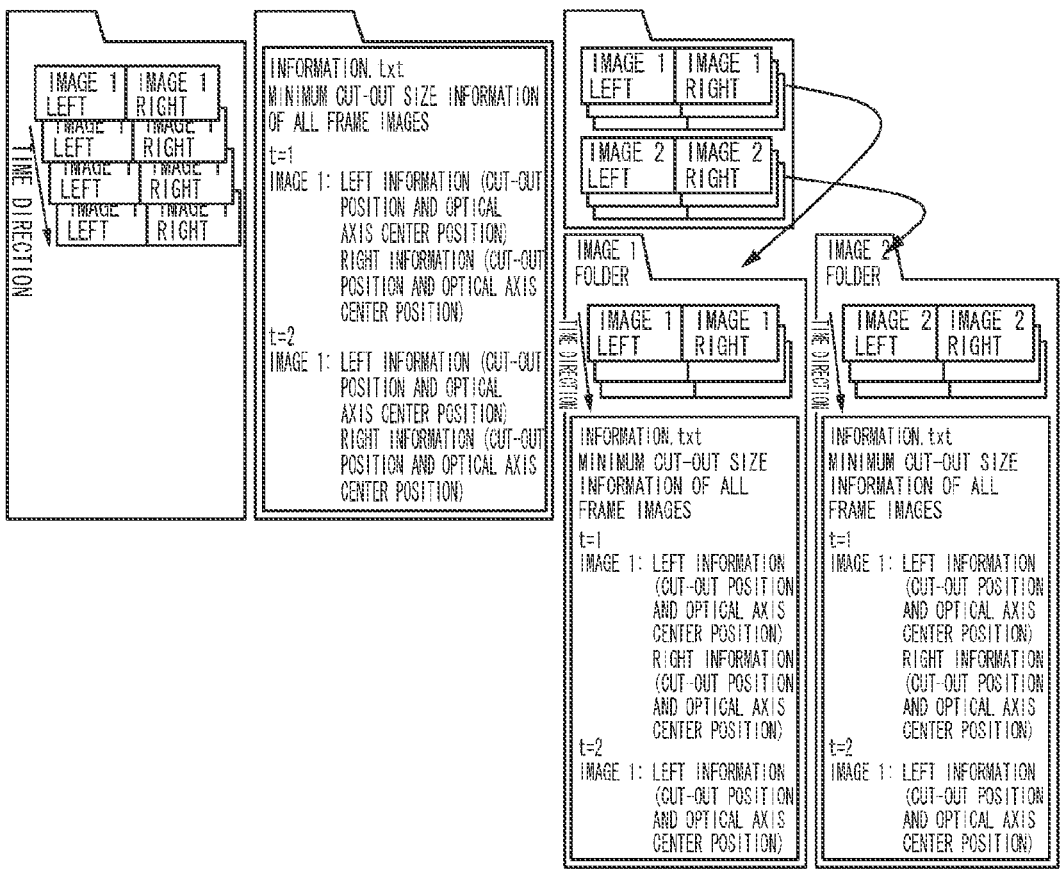

FIG.26B
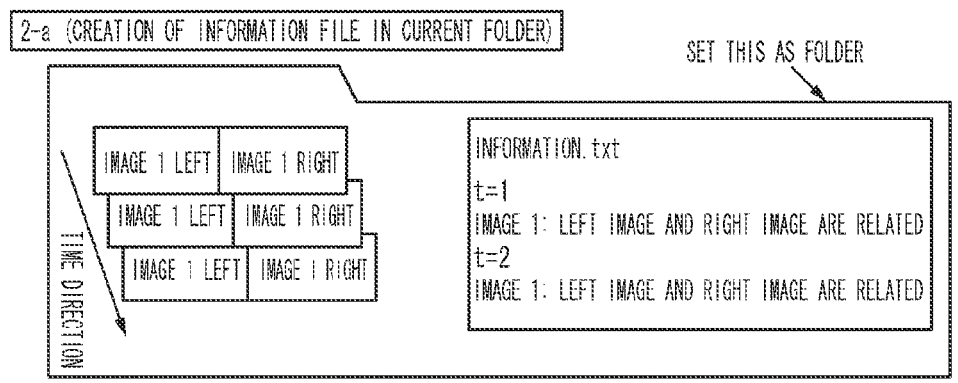
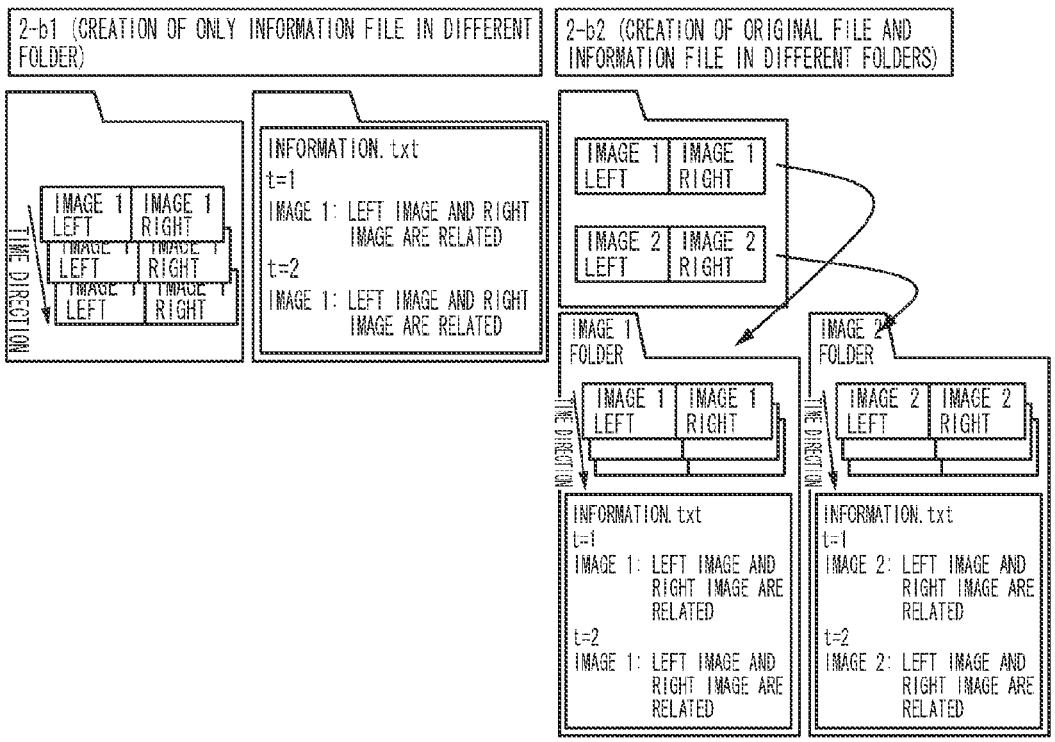

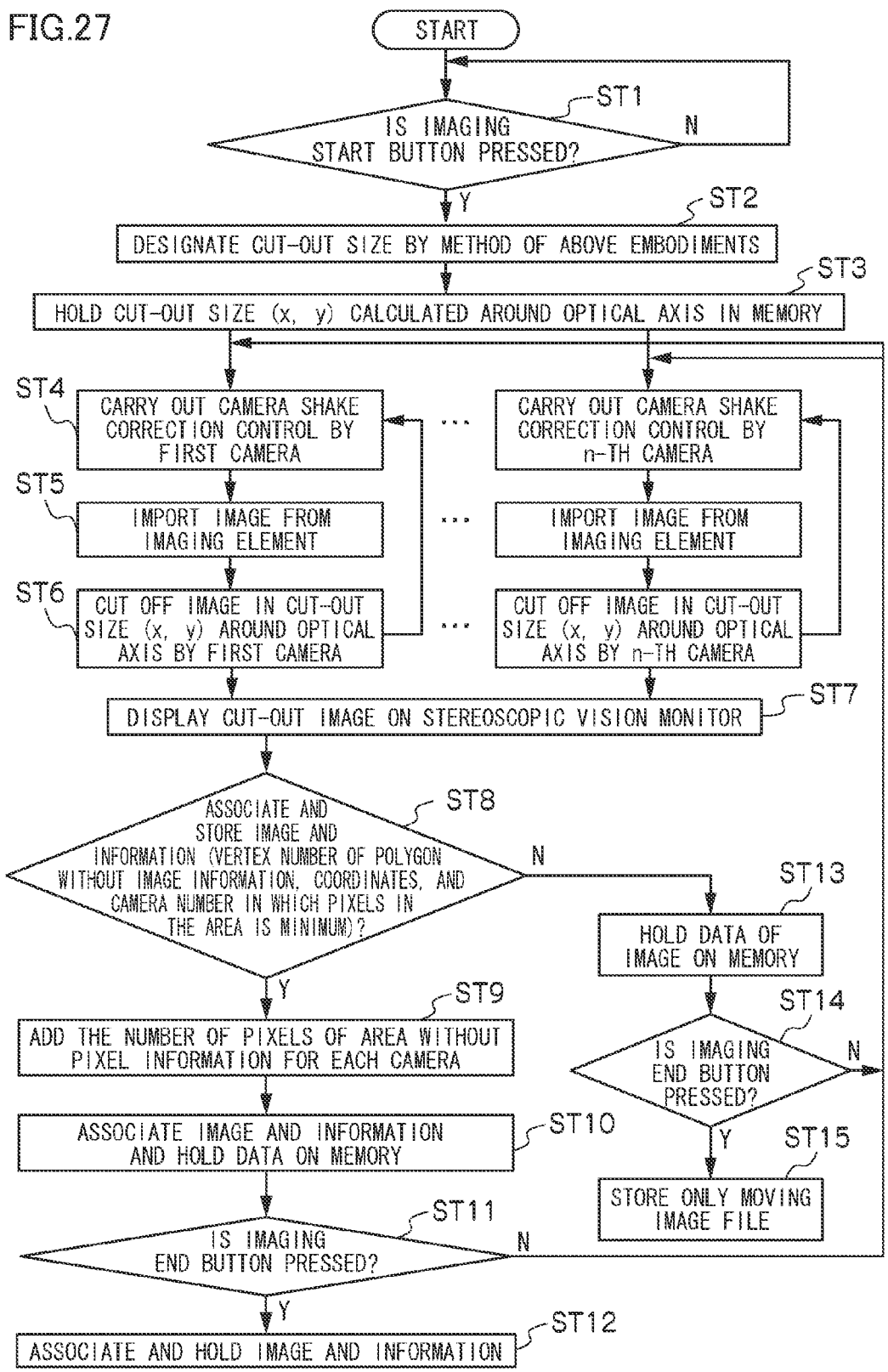

FIG.28A
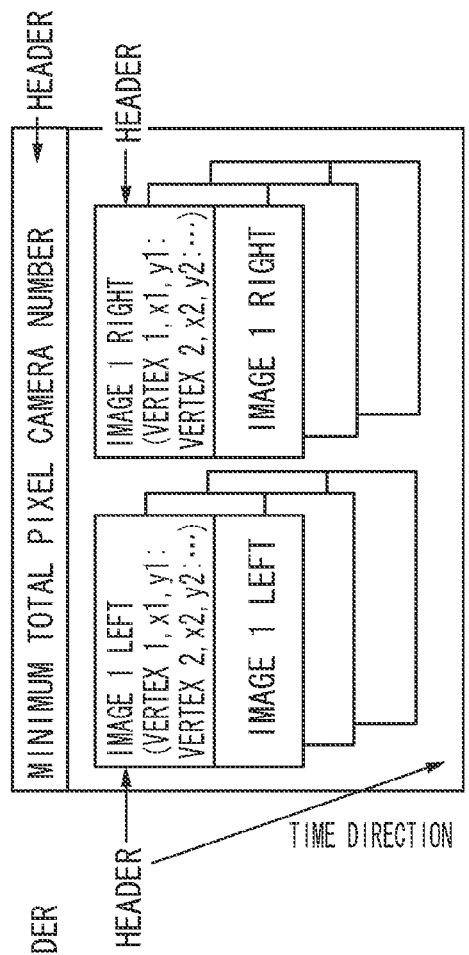
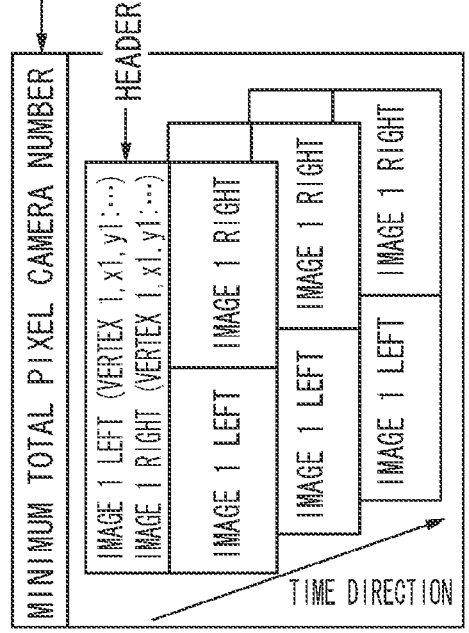

FIG.28B
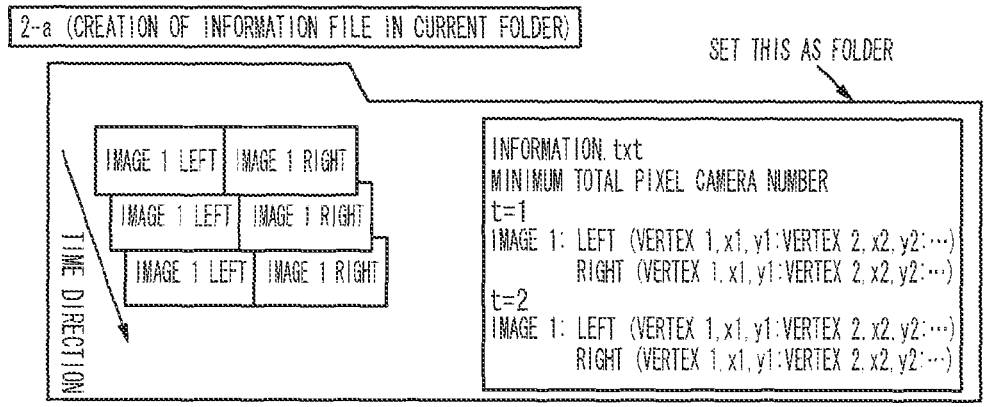
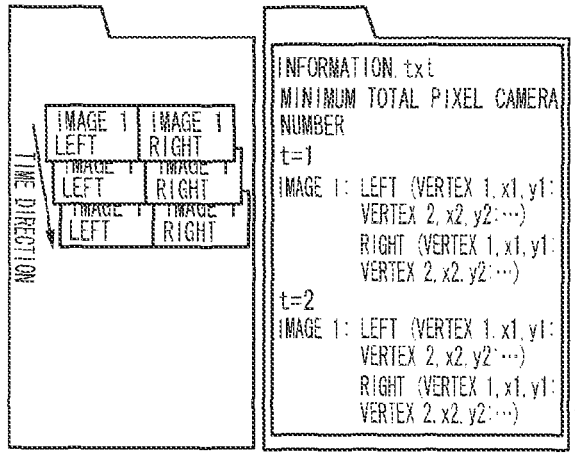
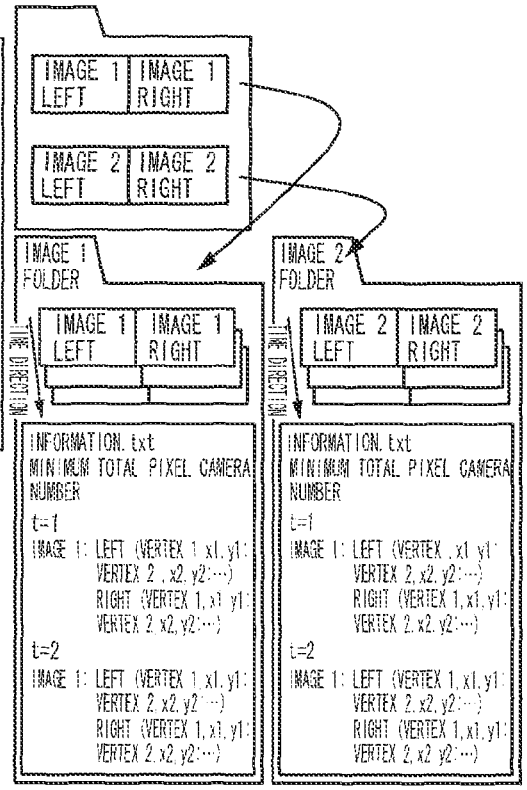

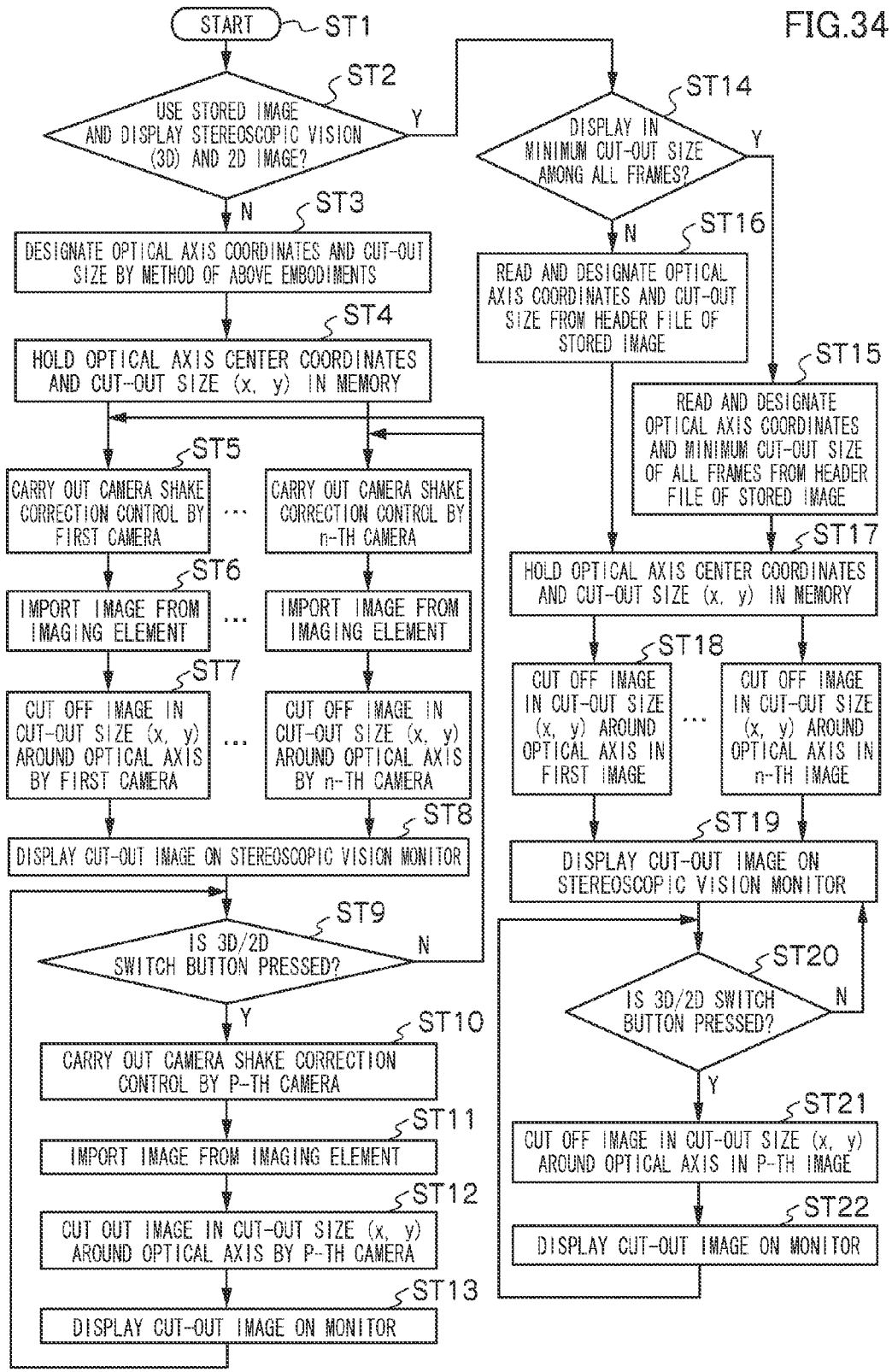

LEFT IMAGE  RIGHT IMAGE

LEFT IMAGE   RIGHT IMAGE

EXAMPLE OF IMAGE AFTER PANORAMIC SYNTHESIS

IMAGING APPARATUS, METHOD, PROGRAM, AND RECORDING MEDIUM USED IN THE PROGRAM

TECHNICAL FIELD

The present invention relates to camera shake correction of a compound-eye imaging apparatus.

BACKGROUND ART

In Patent Literature 1, a pair of imaging elements take an image of light entered through a pair of objective lenses of digital binoculars to acquire a pair of images (stereo images) with a difference equivalent to a binocular parallax, a geometric difference in image structure equivalent to the binocular parallax is recognized for the pair of images stored in a memory after various corrections, and a noise reduction process of reducing a difference (for example, difference in random noise superimposed on the pair of images by the imaging elements) other than the recognized geometric difference in image structure is executed. An image after the noise reduction process is displayed on a display device. The user views (stereoscopic vision) the image displayed on the display device through an eyepiece.

Patent Literature 2 discloses a three-dimensional image pickup apparatus including: imaging units that take images of a subject and that generate two image data of a left-eye imaging area and a right-eye imaging area by a stereo adapter; a camera shake correction unit that calculates an amount of position correction based on camera shake; a zoom control unit that controls zooming of the imaging units; a size determination unit; a position determination unit; a cut-out unit that cuts out left and right image areas for generating appropriate stereoscopic vision; an enlargement/reduction unit; and a combining unit and a recording unit that combine the left and right image areas for generating the stereoscopic vision from the left and right eyes.

As described in Patent Literature 3, systems of camera shake correction in an imaging apparatus include an electronic system, an optical system, and a sensor (imaging element) shift system.

As described in Patent Literature 4, two or more cameras arranged at different positions are used to image a subject, corresponding points as corresponding pixels between a plurality of images (a base image taken by a base camera and a reference image taken by a reference camera) acquired by the imaging are searched (stereo matching), differences in positions (parallax) between the corresponding pixels on the base image and pixels on the reference image are calculated, a principle of triangulation is applied to the parallax to measure distances from the base camera or the reference camera to the points on the subject corresponding to the pixels, and a distance image indicating a stereoscopic shape of the subject can be generated. In the stereo matching, there are a plurality of points on a real space mapped to the pixels on the base image, and therefore, based on the fact that pixels' on the reference image corresponding to the pixels exist on a straight line (epipolar line) as a map of the points on the real space, corresponding points as the pixels on the reference image corresponding to the pixels are searched. In the stereo matching, a correlation window including the pixels as targets of the corresponding point search is set on the base image, the same correlation window as the correlation window set to the base image is moved along the epipolar line on the reference image, a correlation of each pixel in the correlation window on each image is calculated for each movement position, and pixels at the central position of the correlation window in which the correlation on the reference image is greater than a predetermined threshold are obtained as the corresponding points of the pixels.

As described in Patent Literature 5, examples of methods of searching corresponding points between different viewpoint images include Sum of Absolute Difference (SAD method) and Phase-Only Correlation (POC method).

As described in Patent Literature 6, measurement target images in the pair of images always exist on corresponding straight lines in the pair of images even if the distance and the position are different as long as there is no optical distortion or the like. The straight lines are called epipolar lines, and the optical distortion or the like is corrected in advance to form straight lines. Correlations on the straight lines are calculated in the calculation of the correlations, and the positional relationship between the images obtained by the left and right cameras is calculated. If the camera is formed so that the epipolar lines are at horizontally equal positions in both images, the amount of calculation in the image processing is reduced, and the process improves.

CITATION LIST

Patent Literature

PTL 1 Japanese Patent Application Laid-Open No. 2004-120600
PTL 2 Japanese Patent Application Laid-Open No. 2005-45328
PTL 3 Japanese Patent Application Laid-Open No. 2008-64863
PTL 4 Japanese Patent Application Laid-Open No. 2009-205193
PTL 5 Japanese Patent Application Laid-Open No. 2009-14445
PTL 6 Japanese Patent Application Laid-Open No. 2008-164338

SUMMARY OF INVENTION

Technical Problem

The compound-eye camera is adjusted so that the optical axis centers coincide in the horizontal direction to enable stereoscopic vision. Therefore, if there is a difference in the amount of correction between individual cameras after camera shake correction by the individual cameras, the initial center positions of the lenses are displaced, and the stereoscopic vision is not possible.

The present invention enables stereoscopic vision even if camera shake is corrected by individual cameras of a compound-eye camera.

Solution to Problem

The present invention provides an imaging apparatus including: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging apparatus including: a size determination unit that determines a cut-out size for cutting out an image for output from an image acquired from each of the plurality of imaging units, the size determination unit determining the cut-out size with a predetermined aspect ratio common to a plurality of images acquired from each of the plurality of imaging units based on a possible area in a minimum size among sizes of possible areas around an initial optical axis center included in areas common to prescribed imaging areas based on the initial optical axis center before each vibration correction by the plurality of imaging units and imaging areas after each vibration correction by the plurality of imaging units; and a cut-out unit that cuts out the image for output from each of the plurality of images in the common cut-out size determined by the size determination unit based on the initial optical axis center before each vibration correction by the plurality of imaging units.

The present invention provides an imaging apparatus including: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging apparatus including: a size determination unit that determines a cut-out size for cutting out an image for output from an image acquired from each of the plurality of imaging units, the size determination unit determining, for each of the plurality of imaging units, a possible cut-out area around an initial optical axis center included in an invariant imaging area independent of vibration correction by the vibration correction unit for each of the plurality of imaging units and then determining the cut-out size with a predetermined aspect ratio common to the images from each of the plurality of imaging units based on a minimum value of sizes of the possible cut-out areas corresponding to the plurality of imaging units; and a cut-out unit that cuts out the image for output from each of the plurality of imaging units in the common cut-out size determined by the size determination unit based on the initial optical axis center before each vibration correction by the plurality of imaging units.

Preferably, the size determination unit determines, for each of the plurality of imaging units, the invariant imaging area based on a common area between two different imaging areas displaced to the maximum extent in a vertical direction and/or a horizontal direction by the vibration correction by the vibration correction unit for each of the plurality of imaging units.

Preferably, the size determination unit determines, for each of the plurality of imaging units, the common area between two different imaging areas displaced to the maximum extent in the vertical direction and/or the horizontal direction obtained by the vibration correction carried out at least twice by the vibration correction unit for each of the plurality of imaging units and sets the common area determined for each of the plurality of imaging units as the invariant imaging area corresponding to each imaging unit.

Preferably, the size determination unit determines, for each of the plurality of imaging units, the invariant imaging area based on a common area between two different imaging areas displaced to the maximum extent in a vertical direction and/or a horizontal direction by the vibration correction by the vibration correction unit for each of the plurality of imaging units.

Preferably, the size determination unit determines, for each of the plurality of imaging units, the common area between two different imaging areas displaced to the maximum extent in the vertical direction and/or the horizontal direction obtained by the vibration correction carried out at least twice by the vibration correction unit for each of the plurality of imaging units and sets the common area determined for each of the plurality of imaging units as the invariant imaging area corresponding to each imaging unit.

Preferably, the imaging apparatus includes an image complement unit that complements a complement target area, which is beyond a prescribed cut-out range, by an image of an effective pixel area of the imaging units equivalent to the complement target area if the image for output cut out by the cut-out unit includes the complement target area.

Preferably, the imaging apparatus includes a color complement unit that complements a complement target area, which is beyond a prescribed cut-out range of the imaging units, by a predetermined color if the image for output cut-out by the cut-out unit includes the complement target area.

Preferably, the imaging apparatus includes a panoramic image creation unit that creates a panoramic image by combining each image based on the initial optical axis center of each image for output cut out by the cut-out unit.

Preferably, the imaging apparatus includes a stereo matching calculation unit that performs stereo matching by setting an epipolar line based on the initial optical axis center of each image for output cut out by the cut-out unit and by calculating a correlation of each image for output along the epipolar line.

Preferably, the imaging apparatus includes a storage unit that associates and stores each image from each of the plurality of imaging units and the initial optical axis center position as well as the cut-out size of each image.

Preferably, the imaging apparatus includes a storage unit that associates and stores each image for output corresponding to each image acquired at the same imaging time from each of the plurality of imaging units in chronological order of imaging.

Preferably, the imaging apparatus includes a storage unit that associates, with the image for output, coordinates of the complement target area of the image for output and identification information of the image for output including the minimum complement target area to store the coordinates and the identification information.

Preferably, the imaging apparatus includes a parallax adjustment unit that determines the cut-out positions of the images for output so that a parallax between the images for output becomes a predetermined parallax amount while the cut-out size of the images for output is maintained.

Preferably, the imaging apparatus includes an output unit that outputs a plane image or a stereoscopic image based on the images cut out by the cut-out unit.

Preferably, the imaging apparatus includes a designation unit that receives a designation of an enlargement position, wherein the cut-out unit changes the position of cutting out the image for output in accordance with the enlargement position if the enlargement position received by the designation unit reaches a borderline of cutting out the image for output from the image.

Preferably, the imaging apparatus includes a plane image output unit that outputs the image with the minimum complement target area as a plane image based on the identification information stored in the storage unit.

Preferably, the imaging apparatus includes: a color complement unit that complements the complement target area stored in the storage unit by a predetermined color; and an output unit that outputs a plane image or a stereoscopic image based on the image for which the color complement unit has complemented the color.

Preferably, the imaging apparatus includes a panoramic image creation unit that cuts out each image for output based on the initial optical axis center position and the cut-out size corresponding to each image stored in the storage unit and then combines each output image to create a panoramic image.

Preferably, the imaging apparatus includes a stereo matching calculation unit that cuts out each output image based on the initial optical axis center position and the cut-out size corresponding to each image stored in the storage unit and then sets the epipolar line to each image for output based on the initial optical axis center to calculate the correlation of each image for output along the epipolar line to perform the stereo matching.

The present invention provides an imaging method executed by an imaging apparatus, the imaging apparatus including: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging method including: a step of determining a cut-out size with a predetermined aspect ratio common to a plurality of images acquired from each of the plurality of imaging units based on a possible area in a minimum size among sizes of possible areas around an initial optical axis center included in areas common to prescribed imaging areas based on the initial optical axis center before each vibration correction by the plurality of imaging units and imaging areas after each vibration correction by the plurality of imaging units to determine the cut-out size for cutting out an image for output from an image acquired from each of the plurality of imaging units; and a step of cutting out the image for output from each of the plurality of images in the common cut-out size determined by the size determination unit based on the initial optical axis center before each vibration correction by the plurality of imaging units.

The present invention provides an imaging method executed by an imaging apparatus, the imaging apparatus including: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging method including: a step of determining, for each of the plurality of imaging units, a possible cut-out area around an initial optical axis center included in an invariant imaging area independent of vibration correction by the vibration correction unit for each of the plurality of imaging units and then determining a cut-out size with a predetermined aspect ratio common to the images from each of the plurality of imaging units based on a minimum value of sizes of the possible cut-out areas corresponding to the plurality of imaging units to determine the cut-out size for cutting out an image for output from an image acquired from each of the plurality of imaging units; and a step of cutting out the image for output from each of the plurality of imaging units in the common cut-out size determined by the size determination unit based on the initial optical axis center before each vibration correction by the plurality of imaging units.

A program for causing the imaging apparatus to execute the imaging method is also included in the present invention. Furthermore, a recording medium recording a computer-readable code of the program is also included in the present invention. Examples of the recording medium include a semiconductor memory, a hard disk, a CD, a DVD, and various other magneto-optical recording media.

Advantageous Effects of Invention

According to the present invention, a cut-out size with a predetermined aspect ratio common to a plurality of images acquired from each of a plurality of imaging units is determined based on a minimum size among sizes of possible areas around an initial optical axis center, and an image for output is cut out from each of the plurality of images in the common cut-out size determined by a size determination unit based on the initial optical axis center before each vibration correction of the plurality of imaging units.

Alternatively, according to the present invention, a cut-out size with a predetermined aspect ratio common to images from each of a plurality of imaging units is determined based on a minimum value of sizes of possible cut-out areas independent of vibration correction corresponding to the plurality of imaging units, and an image for output is cut out from each of the plurality of imaging units in the common cut-out size determined by the size determination unit based on the initial optical axis center before each vibration correction of the plurality of imaging units.

As a result, output images, in which the optical axis center position is maintained before and after the camera shake correction, can be obtained, and stereoscopic vision is possible using the images for output.

BRIEF DESCRIPTION OF DRAWINGS

FIG. 3 is a flow chart of a process according to the first embodiment.

FIG. 4 is a diagram showing an example of i-th image data and i-th viewpoint images according to the first embodiment.

FIG. 20 is a diagram schematically showing calculation of stereo matching.

FIG. 23A is a diagram showing an example of a method of associating images and various information.

FIG. 23B is a diagram showing another example of the method of associating images and various information.

FIG. 26B is a diagram showing an example of the method of associating images and various information.

FIG. 27 is a flow chart of a process according to a ninth embodiment.

FIG. 28A is a diagram showing an example of a method of associating images.

FIG. 28B is a diagram showing an example of a method of associating images.

FIG. 34 is a flow chart of a process according to the eleventh embodiment.

DESCRIPTION OF EMBODIMENTS

First Embodiment

Figure 1A:
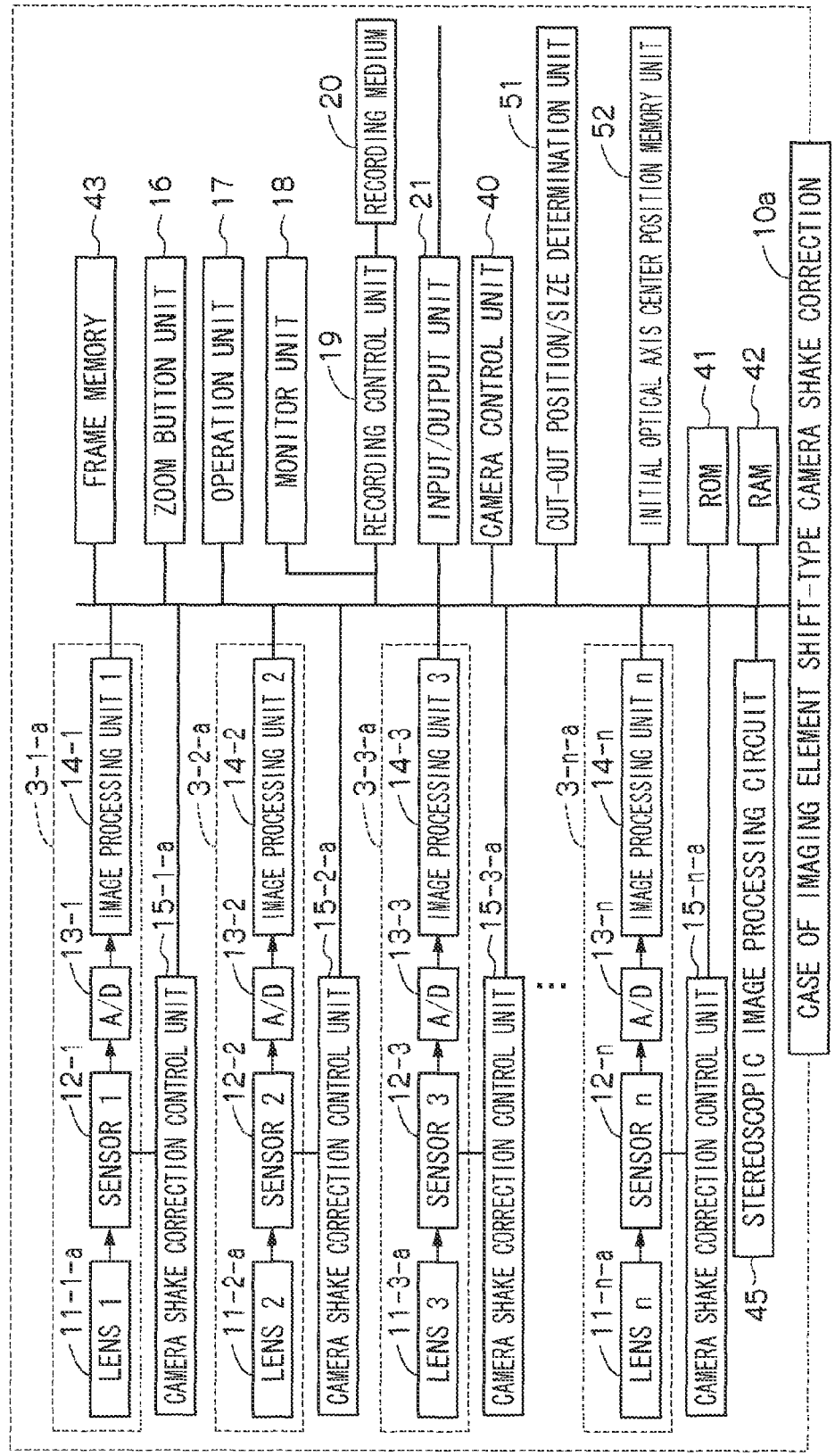
FIG. 1A is a block diagram of an imaging apparatus according to a first embodiment.
Figure 1B:
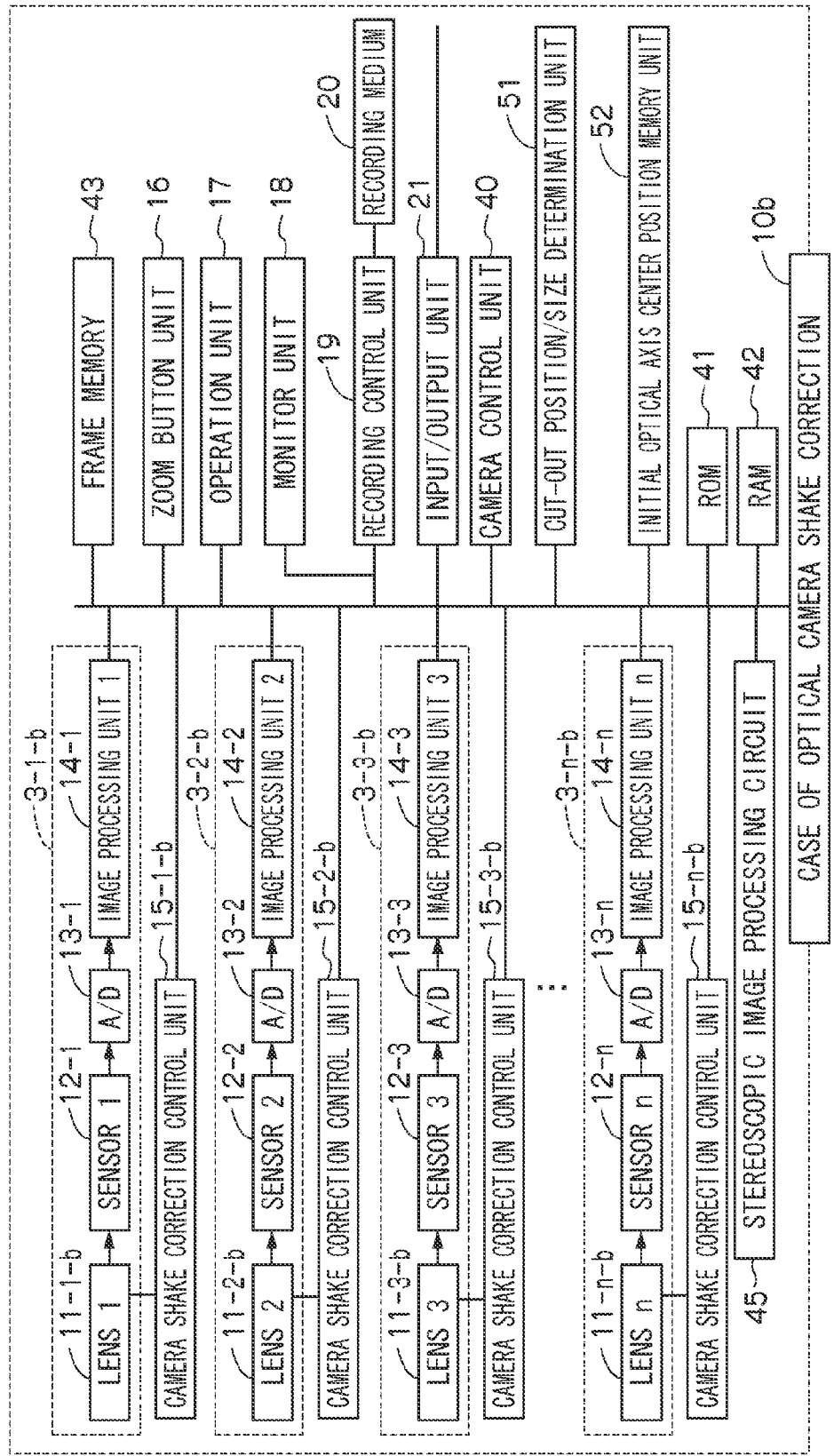
FIG. 1B is another block diagram of an imaging apparatus according to the first embodiment.

FIG. 1A shows a schematic block diagram of an imaging apparatus 10a including an imaging element shift-type camera shake correction control unit according to a first embodiment of the present invention, and FIG. 1B shows a schematic block diagram of an imaging apparatus 10b including an optical camera shake correction control unit according to the first embodiment of the present invention. Blocks with the same functions between the imaging apparatuses 10a/10b of FIG. 1A and FIG. 1B are designated by the same reference numerals except for branch numbers a and b, and hereinafter, the blocks provided with the same reference numerals will be described altogether.

A camera control unit 40 is constituted by a CPU or the like and comprehensively controls the entire operation of the imaging apparatus 10a. To the camera control unit 40, n (n is an integer 2 or greater) imaging units 3, n camera shake correction control units 15, a zoom button unit 16, an operation unit 17, a monitor unit 18, a recording control unit 19, a recording medium 20, an input/output unit 21, a cut-out position/size determination unit 51, and an initial optical axis center position memory unit 52, as well as a RAM 42 and a ROM 41 are connected. The ROM 41 stores various programs executed by the camera control unit 40, such as programs for executing an imaging method according to the present invention, and the RAM 42 serves as a buffer when the programs are executed. The ROM 41 may be a rewritable non-volatile recording medium such as a flash memory. A program for executing the imaging method according to the present invention may be recorded in advance in a recording medium, such as a hard disk, a CD, and a DVD, or in a server on a network, and may be read out to the imaging apparatus for use.

An i-th (i=an integer from 1 to n, n is 2 or greater) imaging unit 3a includes lenses 11-i, an image sensor 12-i, an A/D converter 13-i, and an image signal processing unit 14-i arranged along a lens optical axis Li. First to n-th imaging units 11-1 to n have the same configuration.

The lenses 11 are fixed inside a lens barrel and include a variable power lens and a focus lens. The camera control unit 40 controls drive means, such as a camera lens motor, in accordance with an input operation of telephoto or wide zoom direction information for the zoom button unit 16 (however, a ring-shaped operation member is also possible, instead of the button) and moves the variable power lens to the telephoto side (draw-out side)/wide side (draw-in side) along the lens optical axis direction to change the focal distance (imaging magnification).

The focus lens of the lenses 11 is moved along the lens optical axis to adjust the focus. The position of the focus lens is automatically adjusted along with the movement of the variable power lens to prevent the out-of-focus.

The image sensor 12 receives subject light formed by the lenses 11 and accumulates photoelectric charges in light receiving elements according to the amount of received light. The photoelectric charge accumulation and a transfer operation of the image sensor 12 is controlled by a timing signal (clock pulse) inputted from a timing generator (not shown), and the image sensor 12 acquires an image signal of one screen at each predetermined period in an imaging mode to sequentially input the signals in a correlated double sampling circuit (CDS) not shown. A CCD or MOS solid-state imaging device is used as the image sensor 12.

The correlated double sampling circuit (CDS) receives the imaging signal of one screen inputted from the image sensor 12 and inputs, to an amplifier (AMP) not shown, R, G, and B image data accurately corresponding to the amount of accumulated charge of each light receiving element. The AMP amplifies the inputted image data and inputs the image data in the A/D converter 13. The A/D converter 13 converts the inputted image data from analog to digital. If n=2, the imaging signal of a first image sensor 23 can become first image data (image data for right eye) through the CDS, the AMP, and the A/D converter 13.

Image data, or i-th images, outputted from each of the A/D converters 13-i are inputted to the image signal processing units 14-i, respectively. The image signal processing units 14-i apply various image processes, such as gradation conversion, white balance correction, and γ correction process, to the image data. The i-th image data outputted from the image signal processing units 14-i is inputted to the frame memory 43. The frame memory 43 is a working memory that temporarily stores the i-th image data.

A stereoscopic image processing circuit 455 combines i-th viewpoint images cut out from the i-th image data stored in the frame memory 43 into stereoscopic image data for the monitor unit 18 to perform stereoscopic display. In the imaging mode, the monitor unit 18 displays the stereoscopic image data combined by the stereoscopic image processing circuit 455 as through-the-lens images (continuously updated stereoscopic images, hereinafter may be called through-the-lens stereoscopic images).

The recording control unit 19 applies a compression process to the i-th image data or the i-th viewpoint images stored in the frame memory 43 based on a compression format such as a JPEG system. The recording control unit 19 records the compressed image data in the recording medium 20 such as a memory card.

To reproduce and display the i-th image data recorded in the recording medium 20 on the monitor unit 18, the recording control unit 19 reads out the i-th image data recorded in the recording medium 20 to execute an expansion process and stores the i-th image data in the frame memory 43. The i-th image data stored in the frame memory 43 is converted to stereoscopic image data by the stereoscopic image processing circuit 455 and is reproduced and displayed on the monitor unit 18.

Although not illustrated, the monitor unit 18 includes a parallax barrier display layer on the surface. The monitor unit 18 generates, on the parallax barrier display layer, a parallax barrier made of a pattern of light transmission units and light shielding units alternately lined up at a predetermined pitch and alternately arranges and displays strip-shaped image pieces indicating left and right images on an image display surface of the layer below to allow the observer to feel the stereoscopic effect of the images.

The monitor unit 18 can output the same i-th image data acquired from a desired i-th imaging unit 11 to the frame memory 43 to display a two-dimensional image to the observer.

The cut-out position/size determination unit 51 can be constituted by an arithmetic processing apparatus such as a CPU, and the initial optical axis center position memory unit 52 can be constituted by a storage medium such as a ROM.

The vibration correction control unit 15-i-a of the imaging apparatus 10a shown in FIG. 1A includes a drive unit and a vibration detection unit corresponding to the image sensor 12-i. The drive unit can be constituted by a plunger, a piezo-electric element, or the like. The vibration detection unit can be constituted by a gyro sensor, an acceleration sensor, a speed sensor, or the like that detects an amount and direction of vibration generated in a three-dimensional direction. The vibration correction control unit 15-*i*-*a* controls the drive unit to correct the vibration by swinging the image sensor 12-*i* so as to cancel the vibration of each imaging unit 3-*i*, for which the amount and direction are detected by the vibration detection unit, on an XY plane parallel to image forming surface of the image sensor 12-*i* orthogonal to the optical axis of the lenses 11-*i*-*a*.

The lenses 11-*i*-*b* of the imaging apparatus 10*b* shown in FIG. 1B include a vibration detection unit, a correction optical system (vibration reduction lenses) that corrects camera shake, and a drive unit of the correction optical system. The vibration reduction lenses are supported freely movable in the XY plane parallel to the image forming surfaces of the image sensors 12 orthogonal to the imaging optical axis of the corresponding lenses 11-*i*-*b*. The camera shake correction control unit 15-*i*-*b* includes a vibration detection unit corresponding to the image sensor 12-*i*. As the drive unit drives the correction optical system to cancel the vibration of each imaging unit 3-*i* for which the amount and direction are detected by the vibration detection unit, the camera shake correction control unit 15-*i*-*b* prevents the camera shake on the image forming surfaces of the image sensors 12-*i*.

Figure 2A:
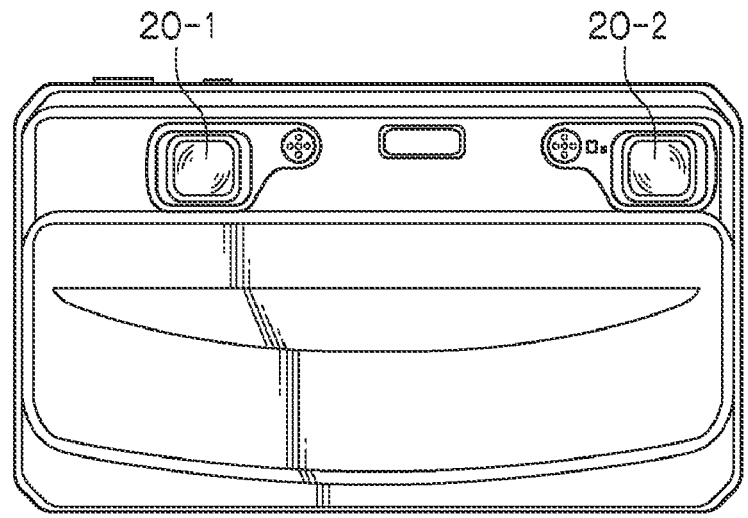
FIG. 2A is a front view of the imaging apparatus.
Figure 2B:
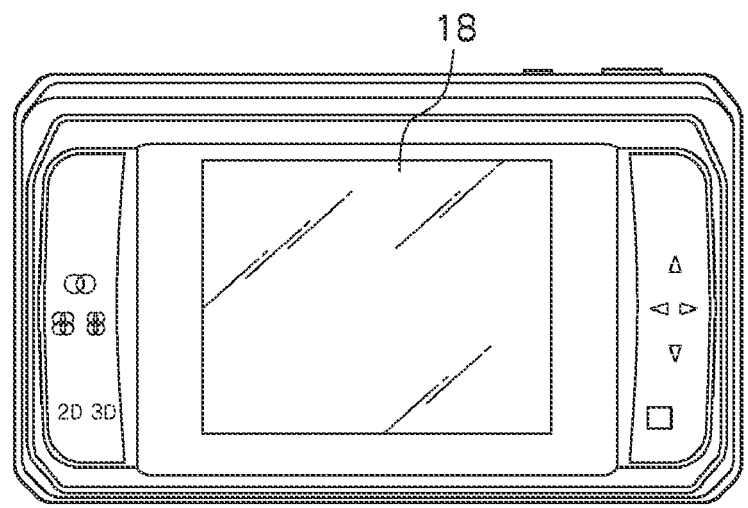
FIG. 2B is a back view of the imaging apparatus.

FIG. 2A shows a front view of the imaging apparatus 10*a* or 10*b* when n=2, and FIG. 2B shows a back view of the imaging apparatus 10*a* or 10*b* when n=2.

FIG. 3 shows a flow chart of a process executed by the imaging apparatus 10*a* or 10*b* according to the first embodiment. A program according to the first embodiment for causing the camera control unit 40*a* or 40*b* to execute the process is stored in the ROM 41. Although the camera control unit 40*a* or 40*b* may be expressed as the camera control unit 40 as a whole for simplification, the subject of executing the following process is the camera control unit 40*a* in the case of the imaging apparatus 10*a* and is the camera control unit 40*b* in the case of the imaging apparatus 10*b*. Control targets of the camera control unit 40*a* and the camera control unit 40*b* are blocks of the imaging apparatus 10*a* and blocks of the imaging apparatus 10*b*, respectively.

In ST1, the camera control unit 40 performs normal vibration correction in response to an instruction of imaging mode setting from the operation unit 17. In the normal vibration correction, the vibrations are corrected by swinging the image sensors 12-*i* or the vibration reduction lenses so as to cancel the vibrations of the imaging units 3-1 to n for which the amount and direction are detected by the vibration detection unit.

In ST2, the camera control unit 40 imports, to the frame memory 43, multi-view i-th image data outputted synchronously from the imaging units 3-*i* during the normal vibration correction.

In ST3, the camera control unit 40 reads out an initial optical axis center position of the lenses 11-*i* stored in the initial optical axis center position memory unit 52. Based on the initial optical axis center position, the amount of vibration correction by the drive unit, and the correction direction, the camera control unit 40 calculates a position after correction as a position of pixels in the i-th image data after the vibration correction corresponding to the initial optical axis center position before the vibration correction. It is assumed that the camera control unit 40 has converted the amount of vibration correction by the drive unit and the correction direction into pixels on the XY plane of the image sensors 12-*i*.

In ST4, the camera control unit 40 sets, as a possible area, a maximum common area included in both the imaging pixel area, in which the optical axis center position after the correction is the center, in which an aspect ratio (x:y) of the monitor unit 18 stored in the ROM 41 is included, and in which there is no vibration, and the i-th image data after the vibration correction. The camera control unit 40 calculates a length of a perpendicular line from the optical axis center position after the correction to each side in a periphery XY direction of the possible area to calculate a shortest distance Li as a minimum value among the distances to the sides in the XY direction.

In ST5, the camera control unit 40 determines whether the shortest distance Li is obtained from each i-th image data and repeats ST4 if the camera control unit 40 determines that the shortest distance Li is not obtained from each i-th image data. If the camera control unit 40 determines that the shortest distance Li is obtained from each i-th image data, the camera control unit 40 finds a minimum value Lmin from the shortest distances Li.

In ST6, the camera control unit 40 reads the aspect ratio (x:y) of the monitor unit 18 from the ROM 41.

In ST7, the camera control unit 40 determines whether the minimum value Lmin obtained in ST5 is a distance from the position after correction to the horizontal side parallel to the X direction or a distance from the position after correction to the vertical side parallel to the Y direction. The process proceeds to ST8 if Lmin is the distance to the horizontal side and proceeds to ST8.1 if Lmin is the distance to the vertical side.

In ST8, the camera control unit 40 controls the cut-out position/size determination unit 51 to calculate the cut-out size of the image for stereoscopic display. More specifically, the cut-out position/size determination unit 51 determines that the cut-out size in the x direction is 2×Lmin and the cut-out size in the y direction is (y/x)×(2×Lmin).

In ST8.1, the camera control unit 40 controls the cut-out position/size determination unit 51 to calculate the cut-out size of the image for stereoscopic display. More specifically, the cut-out position/size determination unit 51 determines that the cut-out size in the x direction is (x/y)×(2×Lmin) and the cut-out size in the y direction is 2×Lmin.

In ST9, the camera control unit 40 obtains the i-th viewpoint image by cutting out, from each i-th image data, a rectangular area that includes the initial optical axis center position as the center and that is in the size calculated in ST8 or 8.1.

In ST10, the stereoscopic image processing circuit 455 outputs a stereoscopic image to the monitor unit 18 based on the i-th viewpoint image. The process of ST1 to 10 is repeated by an imaging instruction based on pressing of a shutter button or the like. The images continuously outputted to the monitor unit 18 by the repetition of the process of ST1 to 10 until the pressing of the shutter button are called through-the-lens images, a live view, or the like.

FIG. 4 shows an example of each i-th image data and the i-th viewpoint images when n=2. Reference character Fi-1 designates a real space, Fi-2 designates an imaging pixel area when there is no vibration, Fi-3 designates an imaging pixel area after vibration correction, and Fi-4 designates an i-th viewpoint image cut out based on the initial optical axis center position. The XY coordinate system is defined based on the real space Fi-1, X indicating the horizontal direction, Y indicating the vertical direction.

For example, it is assumed that the amount of vibration correction in the X direction between F1-*i* and F1-3 is x'R pixels, the amount of vibration correction in the Y direction between F1-1 and F1-3 is y'R pixels, and |x'R|>|y'R|. It is also assumed that the aspect ratio of the monitor unit 18 is 3:4. In this case, since Lmin=|y'R|, the cut-out size in the x direction of the first and second image data is (8/3)×(2×Lmin), and the cut-out size in the y direction is 2×Lmin.

As a result of the process, the viewpoint images are cut out in the common size and aspect ratio from a plurality of image data with different amounts of vibration correction so that the position of the optical axis center is not displaced. Therefore, the stereoscopic image can be generated after the camera shake correction in the same quality as before the vibration correction.

Second Embodiment

Figure 5A:
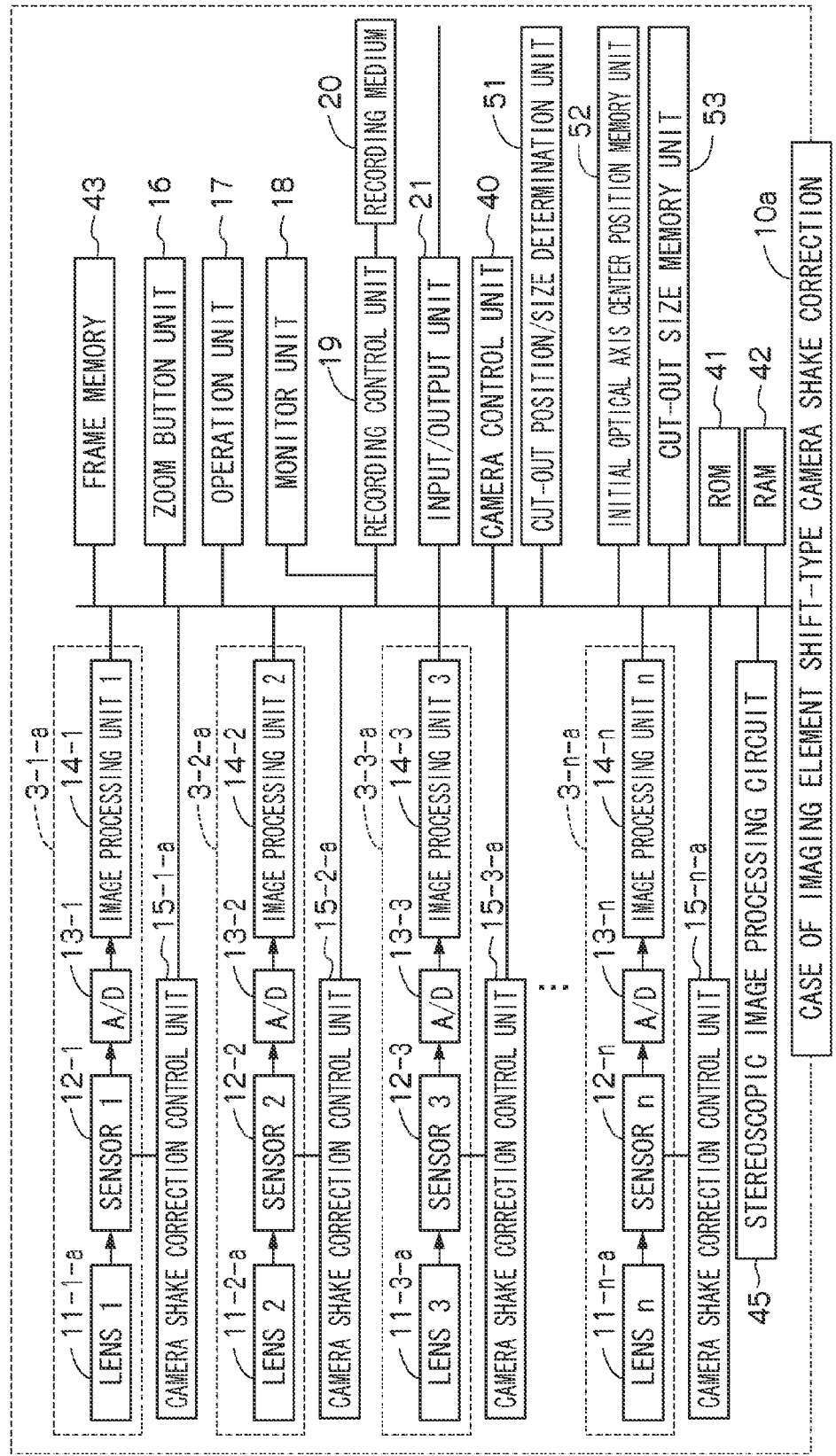
FIG. 5A is a block diagram of the imaging apparatus according to a second embodiment.
Figure 5B:
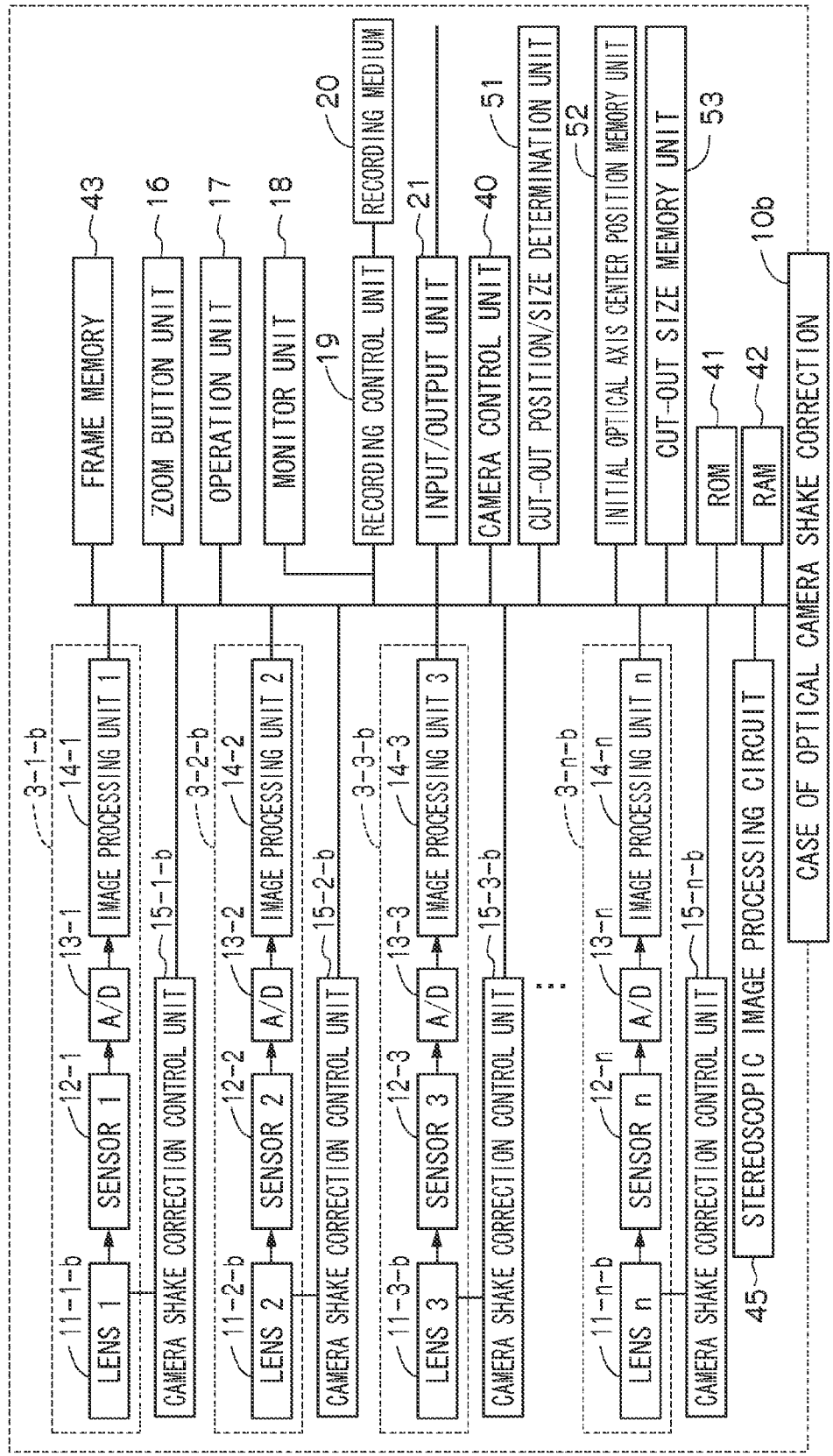
FIG. 5B is another block diagram of the imaging apparatus according to the second embodiment.

FIG. 5A shows a schematic block diagram of the imaging apparatus 10a including an imaging element shift-type camera shake correction control unit according to a second embodiment of the present invention, and FIG. 5B shows a schematic block diagram of the imaging apparatus 10b including an optical camera shake correction control unit according to the second embodiment of the present invention. Blocks with the same functions between the imaging apparatuses 10a/10b in FIGS. 5A and 5B or in the described embodiment are designated with the same reference numerals except for the branch numbers, and hereinafter, the blocks provided with reference numerals other than the same reference numerals will be described.

The imaging apparatuses 10a/10b include cut-out size memory units 53 constituted by rewritable storage media such as RAMs.

Figure 6:
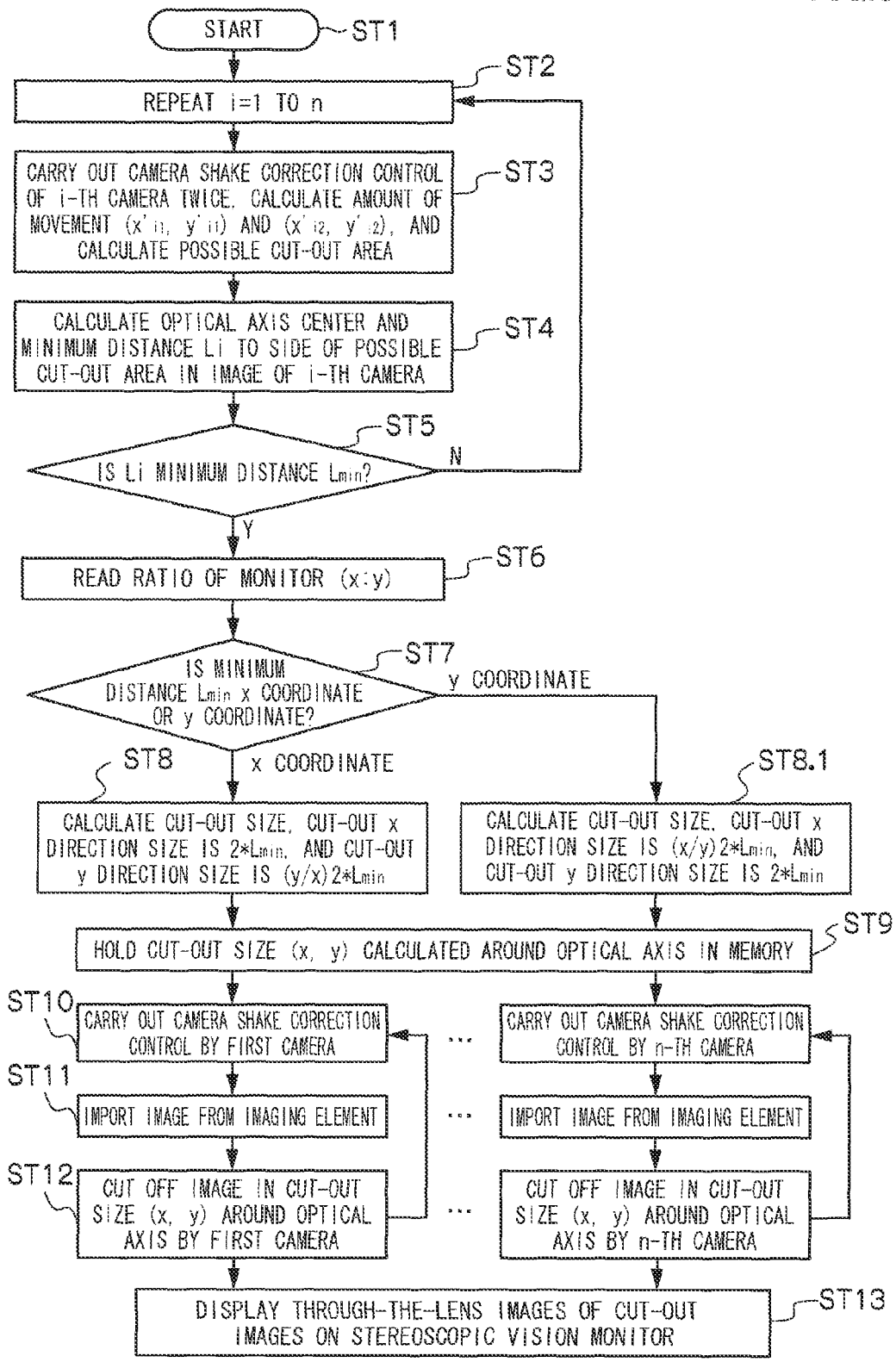
FIG. 6 is a flow chart of a process according to the second embodiment.

FIG. 6 shows a flow chart of a correction process executed by the imaging apparatus 10a or 10b according to the second embodiment. A program according to the second embodiment for causing the camera control unit 40a or 40b to execute the process is stored in the ROM 41.

In ST1, the camera control unit 40 proceeds to ST2 in response to an instruction of imaging mode setting from the operation unit 17.

In ST2, the following ST3 to ST5 are repeated for i=1 to n.

In ST3, the camera control unit 40a or 40b controls the corresponding camera shake correction control unit 15-i-a or 40b to perform vibration correction twice (or more) and imports, to the frame memory 43, multi-view i-th image data outputted synchronously from each imaging unit 3-i during the vibration correction. The vibration correction is performed throughout the maximum drive range in the X direction and the Y direction of each drive unit regardless of the detection of vibration by the vibration detection unit. The timing to start and end the execution of the vibration correction is arbitrary. For example, the vibration correction may be performed at a predetermined time, such as until a predetermined time after the activation of the imaging apparatus 10.

The camera control unit 40 reads out the initial optical axis center position of the lenses 11-i-a or b stored in the initial optical axis center position memory unit 52. The camera control unit 40 also reads the aspect ratio (x:y) of the monitor unit 18 from the ROM 41.

The camera control unit 40 determines the possible cut-out area based on the i-th image data after two vibration corrections, based on the initial optical axis center position of the lenses 11-i-a or b, and based on the aspect ratio of the monitor unit 18.

More specifically, the camera control unit 40 calculates an intersection of the sides of the periphery of the i-th image data after two vibration corrections, and for each i-th image data, determines a common area Rc(i) as a rectangular area including the intersection as the diagonal point. The camera control unit 40 determines the maximum rectangular area, which is included in the common area Rc(i) and which has the aspect ratio of the monitor unit 18, as the possible cut-out area of the i-th image data. The common area Rc(i) is a common part of different maximum drive ranges corresponding to different vibration corrections. Therefore, the common area Rc(i) is a invariant imaging area in which image data can always be obtained after any vibration correction. More specifically, image data can be obtained in the common area Rc(i) without depending on the vibration correction.

In ST4, the camera control unit 40a or 40b reads out the initial optical axis center position of the lenses 11-i-a or b stored in the initial optical axis center position memory unit 52. The camera control unit 40a or 40b calculates the distances between the initial optical axis center position and the sides in the periphery XY direction of the possible cut-out area and calculates the shortest distance Li from the distances.

In ST5, the camera control unit 40 determines whether the shortest distances Li are obtained from the possible cut-out areas and repeats ST3 and 4 if the camera control unit 40 determines that the shortest distances Li are not obtained. The camera control unit 40 calculates the minimum value Lmin from the shortest distances Li if the camera control unit 40 determines that the shortest distances Li are obtained.

In ST6, the camera control unit 40 reads the aspect ratio (x:y) of the monitor unit 18 from the ROM 41.

In ST7, the camera control unit 40 determines whether the minimum value Lmin is the distance from the initial optical axis center position to the horizontal side parallel to the X direction or is the distance from the initial optical axis center position to the vertical side parallel to the Y direction. The process proceeds to ST8 if the minimum value Lmin is the distance to the horizontal side and proceeds to ST8.1 if the minimum value Lmin is the distance to the vertical side.

In ST8, the camera control unit 40 calculates the cut-out size of the image for stereoscopic display. More specifically, the cut-out size in the x direction is set to 2×Lmin, and the cut-out size in the y direction is set to (y/x)×(2×Lmin).

In ST8.1, the camera control unit 40 calculates the cut-out size of the image for stereoscopic display. More specifically, the cut-out size in the x direction is set to (x/y)×(2×Lmin), and the cut-out size in the y direction is set to 2×Lmin.

In ST9, the camera control unit 40 stores, in the cut-out size memory unit 53, a rectangular area that includes the initial optical axis center position as the center and that has the size calculated in ST8 or 8.1.

In ST10 to S13, the camera control unit 40 first performs vibration correction in relation to the first to n-th imaging units 11-1 to n. The vibration correction here denotes normal vibration correction which is an act of correcting the vibration by swinging the image sensors 12-i or the vibration reduction lenses so as to cancel the vibrations of the imaging units 3-i to n for which the amount and direction are detected by the vibration detection unit. The camera control unit 40 imports, to the frame memory 43, the multi-view first to n-th image data synchronously outputted from the imaging units 3-1 to n after the correction.

The camera control unit 40 cuts out the rectangular areas with the center positions and sizes stored in the cut-out size memory unit 53 from the first to n-th image data after the vibration correction to obtain first to n-th viewpoint images. The stereoscopic image processing circuit 45 outputs a stereoscopic image to the monitor unit 18 based on the first to n-th viewpoint images. The process ST1 to 10 is repeated until there is an imaging instruction or until the imaging mode is canceled. As a result, the monitor unit 18 continuously displays the through-the-lens images based on the sequentially taken image data.

Figure 7:
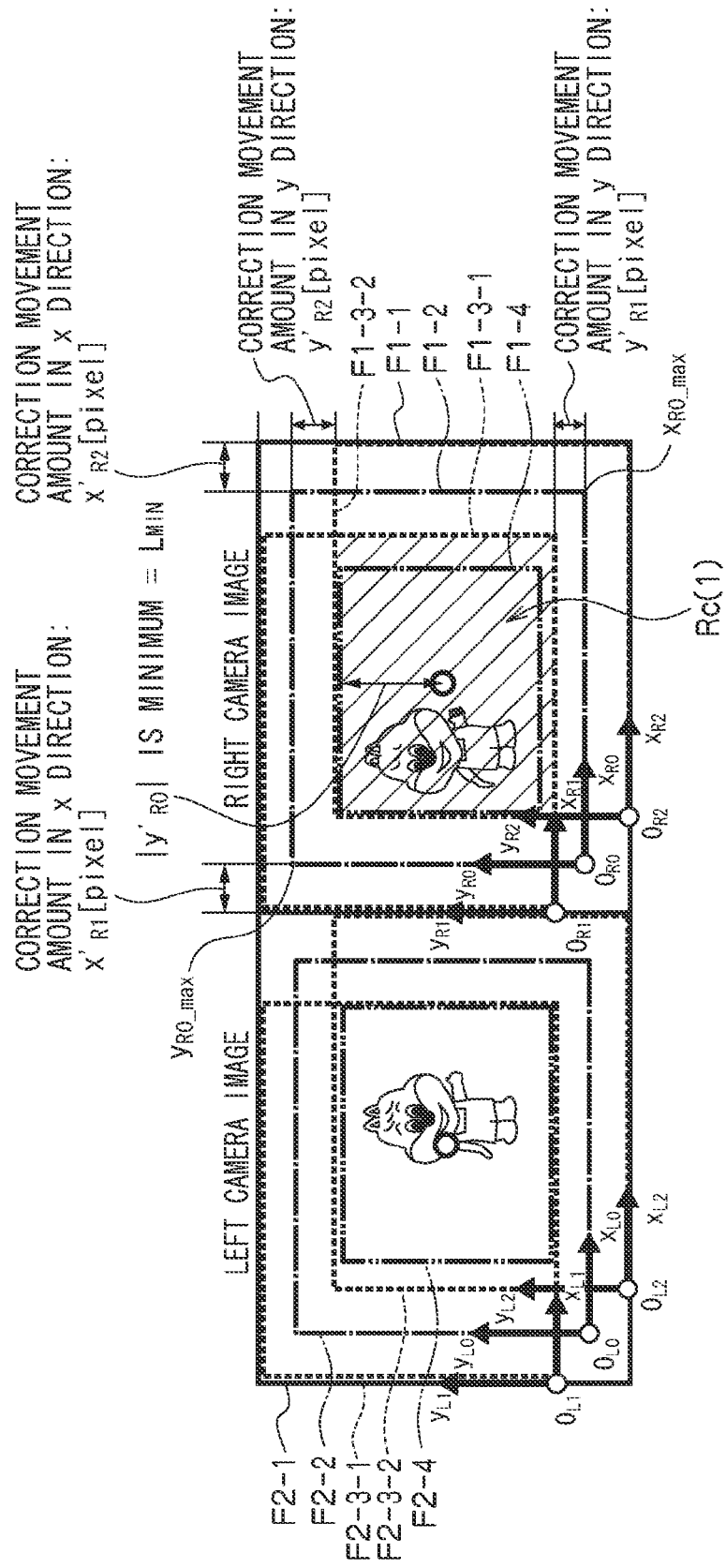
FIG. 7 is a diagram showing an example of the i-th image data and the i-th viewpoint images according to the second embodiment.

FIG. 7 shows an example of each i-th image data and the i-th viewpoint images when n=2. Reference character Fi-1 designates a real space, Fi-2 designates an imaging pixel area when there is no vibration, Fi-3-1 designates the imaging pixel area after an I-th (I=1, 2) vibration correction, and Fi-4 designates an i-th viewpoint image cut out based on the initial optical axis center position. The XY coordinate system is defined based on the real space Fi-1.

For example, it is assumed that the amount of displacement (in pixels) in the X/Y direction between the imaging pixel area F1-3-1 after the first vibration correction and the imaging pixel area F1-2 without vibration is (x'R1, y'R1). It is also assumed that the amount of displacement (in pixels) in the X/Y direction between the imaging pixel area F1-3-2 after the second vibration correction and the imaging pixel area F1-2 without vibration is (x'R2, y'R2). It is further assumed that the X coordinate of the lower right diagonal point of the imaging pixel area F1-2 without vibration is xR0_max and that the Y coordinate of the upper left diagonal point of F1-2 is YR0_max. It is further assumed that Lmin=|y'R0|.

Based on the foregoing, the lower left intersection coordinates of F1-3-1 and F1-3-2 are (x'R2, y'R1), and the upper right intersection coordinates are (xR0_max-x'R1, yR0_max-y'R2). The two intersections are determined as the diagonal points in the common area Rc(1). It is assumed that the aspect ratio of the monitor unit 18 is 3:4. If Lmin=|y'R0|, the cut-out size in the x direction of the first and second image data is (8/3)×(2×Lmin), and the cut-out size in the y direction is 2'Lmin.

In the first embodiment, Lmin depends on the change in the size of the individual vibration corrections in ST1. Therefore, the cut-out size of the i-th viewpoint image may change every time the vibration is corrected, and displayed pixels of the stereoscopic image on the monitor unit 18 may change. On the other hand, in the second embodiment, the cut-out size calculated based on Lmin determined by the vibration correction carried out in advance is stored in the size memory unit 53, and the i-th viewpoint image with the common stored center position and size is outputted to the monitor unit 18. Therefore, the displayed pixels of the through-the-lens image do not change regardless of the extent of the vibration correction by an arbitrary i-th imaging unit 3.

In the description above, the vibration correction is controlled to be performed twice (or more), and the multi-view i-th image data synchronously outputted from the imaging units 3-*i* during the vibration corrections is imported to the frame memory 43. However, this is performed only to acquire the maximum drive range (maximum amount of vibration correction) related to up and down (Y direction) as well as left and right (X direction).

More specifically, if the maximum drive range in the X direction and Y direction of each i-th imaging unit 3-1-*i* is stored as a given value in the ROM 41 or in a rewritable non-volatile storage medium, such as an EEPROM and a flash memory, instead of a non-rewritable storage medium such as the ROM 41, the common area Rc(i) of each i-th imaging unit 3-1-*i* can be determined based on the value, and the possible cut-out area of each i-th imaging unit 3-1-*i* can be determined. In that case, the vibration correction does not have to be performed twice.

Alternatively, twice or more vibration corrections may be performed once at arbitrary timing or period, such as upon the activation of the imaging apparatus 10, and the resultant maximum drive range of each imaging unit 3-*i* may be stored in a rewritable non-volatile storage medium. Once the range is stored, the common area Rc(i) of each i-th imaging unit 3-1-*i* can be subsequently determined in accordance with the maximum drive range of each imaging unit 3-*i* in the non-volatile storage medium, and the possible cut-out area of each i-th imaging unit 3-1-*i* can be determined.

Alternatively, the common area Rc(i) of each i-th imaging unit 3-1-*i* may be stored as a given value in the ROM 41, an EEPROM, or the like, and the possible cut-out area of each i-th imaging unit 3-1-*i* may be determined based on the value.

Third Embodiment

Figure 8:
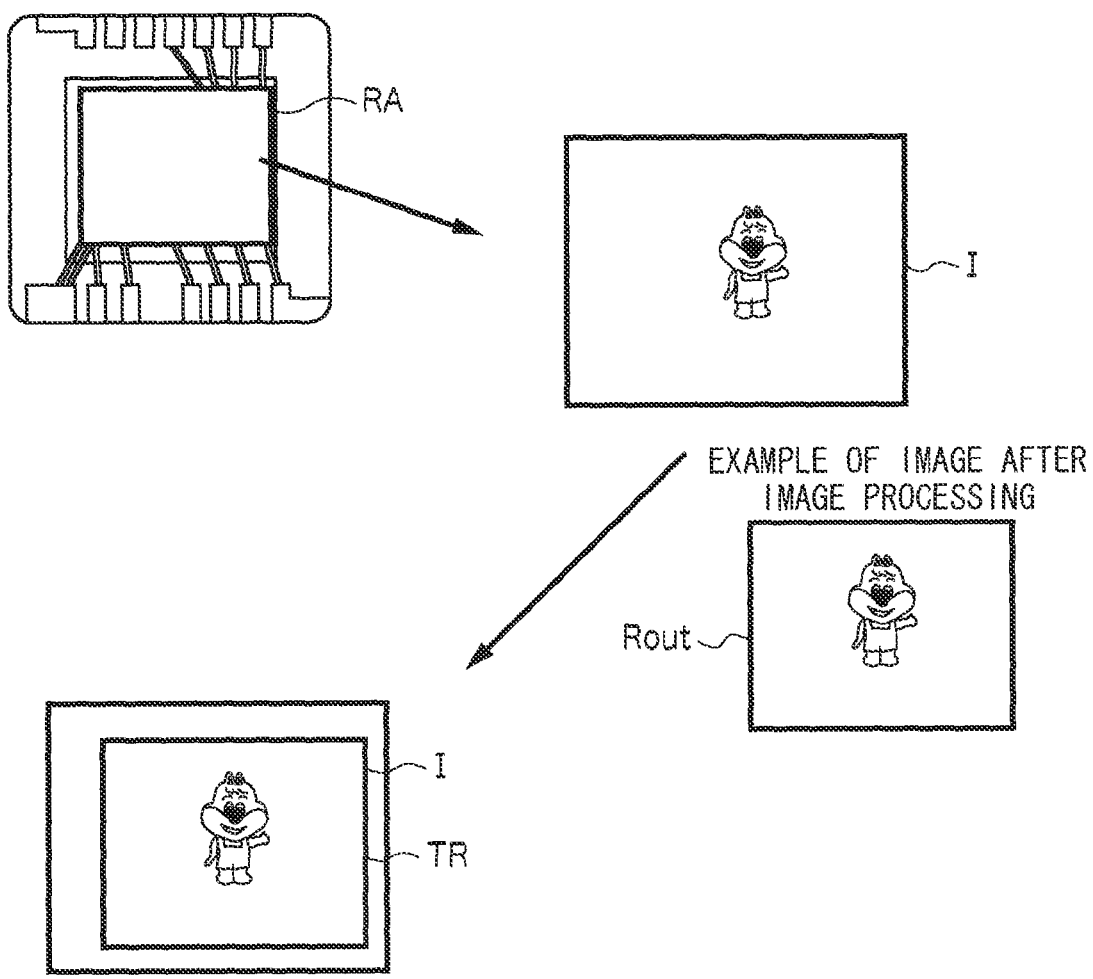
FIG. 8 is a diagram showing acquisition of a cut-off area Rout convenient for the process from an effective pixel area RA.

If an image I in the maximum size is read out from an entire effective pixel area RA of the sensor 12 during imaging as illustrated in FIG. 8, significantly fast signal processing is necessary to generate a video signal for sequentially outputting taken images to the monitor unit 18 or the like, and the circuit scale is enlarged. Therefore, default cut-off range information TR is stored in advance in the ROM 41 or the like in a normal camera, and during imaging, control is performed to select and read out a cut-off area Rout convenient for the process from the effective pixel area RA in accordance with the default cut-off range information.

If the cut-out size and position of the i-th viewpoint images calculated as in the second embodiment are stored in the cut-out size memory unit 53, and the i-th viewpoint images with the stored common center position and size are outputted to the monitor unit 18, the i-th viewpoint images may include an area without image information that does not fall within the default cut-off range TR. Therefore, in the present embodiment, the part without the image information in the i-th viewpoint image is imported and complemented from an effective pixel area outside the default cut-off range TR.

Figure 9A:
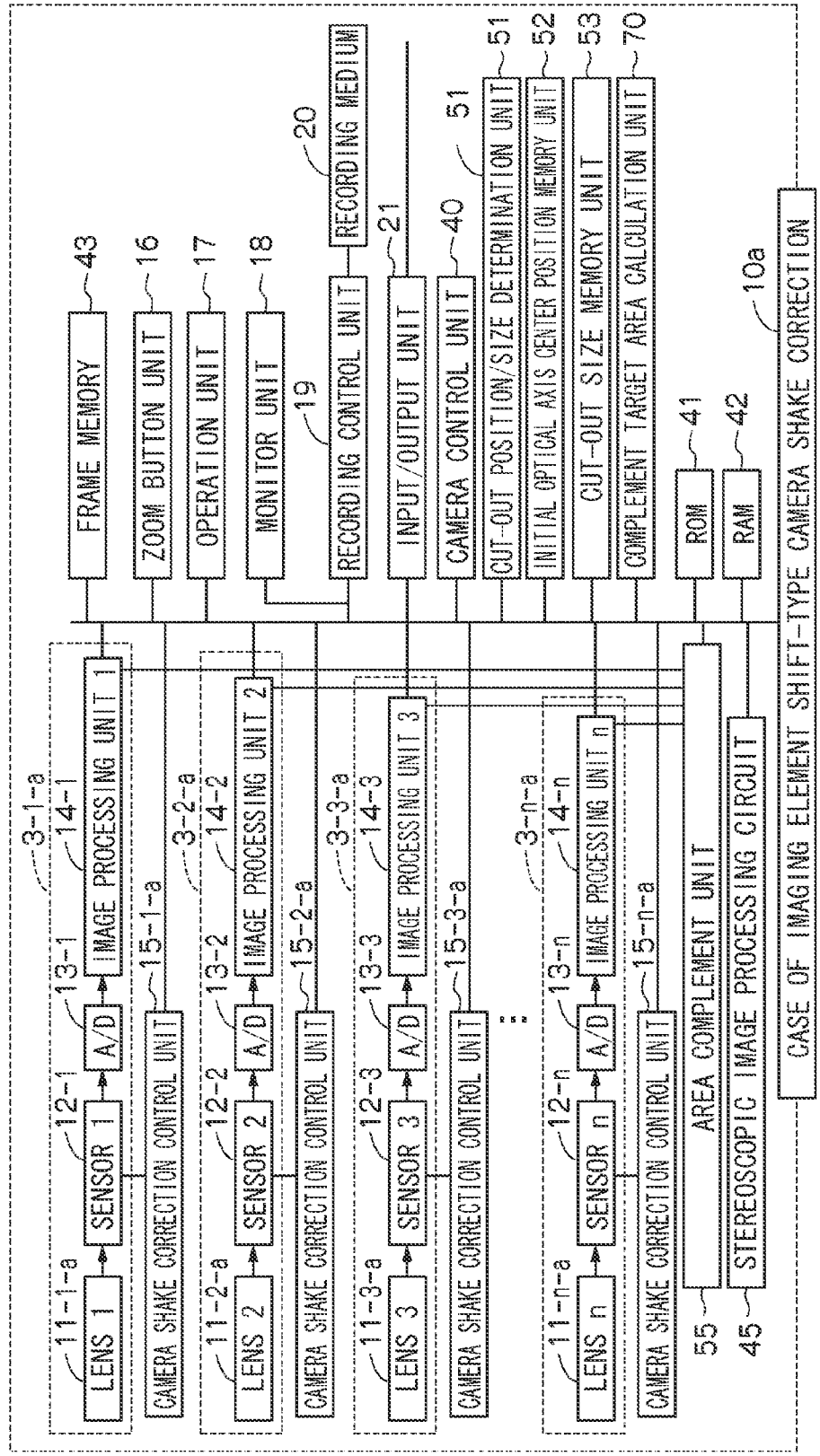
FIG. 9A is a block diagram of the imaging apparatus according to a third embodiment.
Figure 9B:
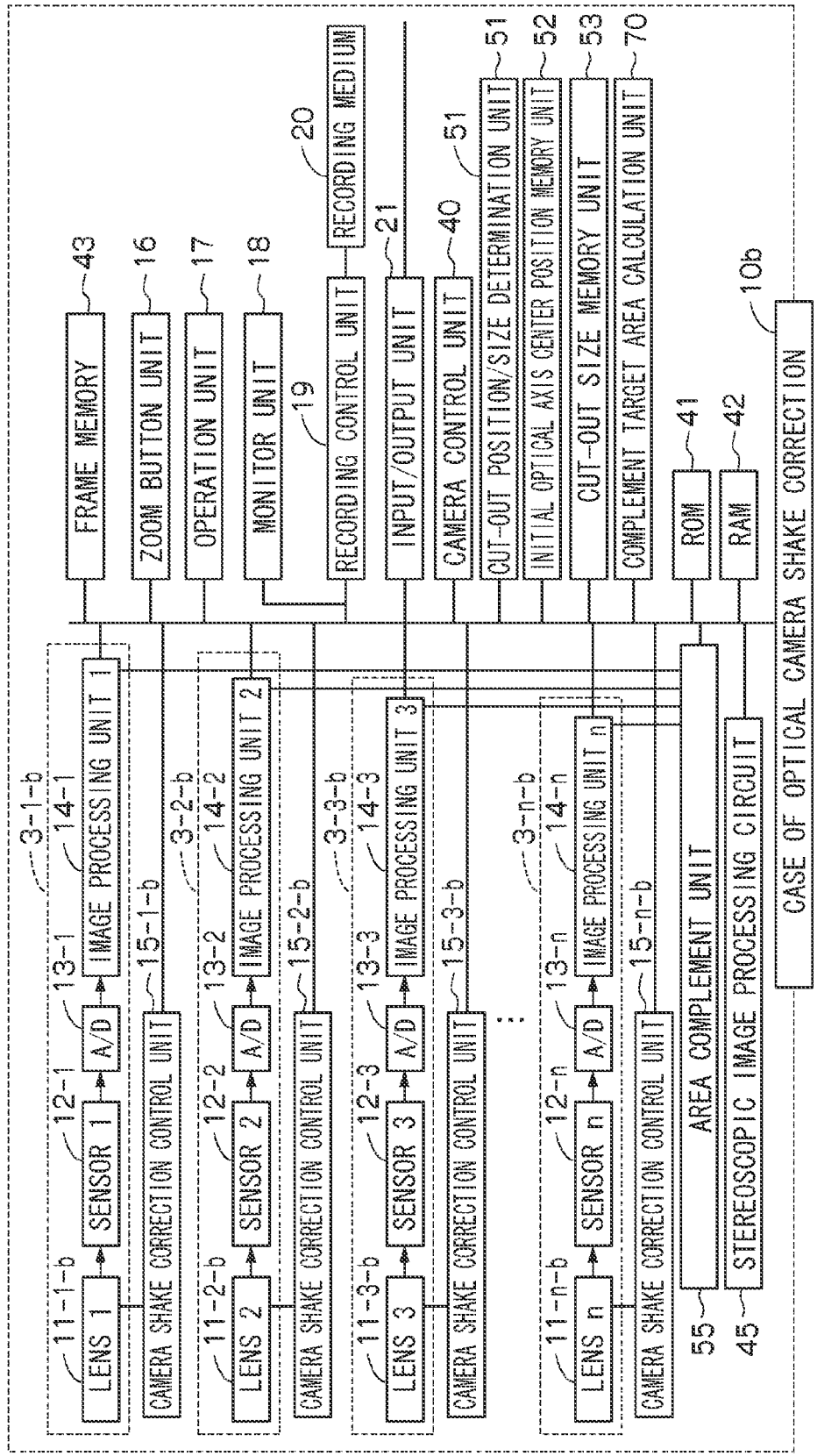
FIG. 9B is another block diagram of the imaging apparatus according to the third embodiment.

FIG. 9A shows a schematic block diagram of the imaging apparatus 10*a* including an imaging element shift-type camera shake correction control unit according to a third embodiment of the present invention, and FIG. 9B shows a schematic block diagram of the imaging apparatus 10*b* including the optical camera shake correction control unit according to the third embodiment of the present invention. Blocks with the same functions between the imaging apparatuses 10*a*/10*b* of FIGS. 9A and 9B or in the described embodiments are designated with the same reference numerals except for the branch numbers.

The imaging apparatuses 10*a*/10*b* include complement target area calculation units 70 and area complement units 55 constituted by arithmetic apparatuses such as CPUs.

Figure 10:
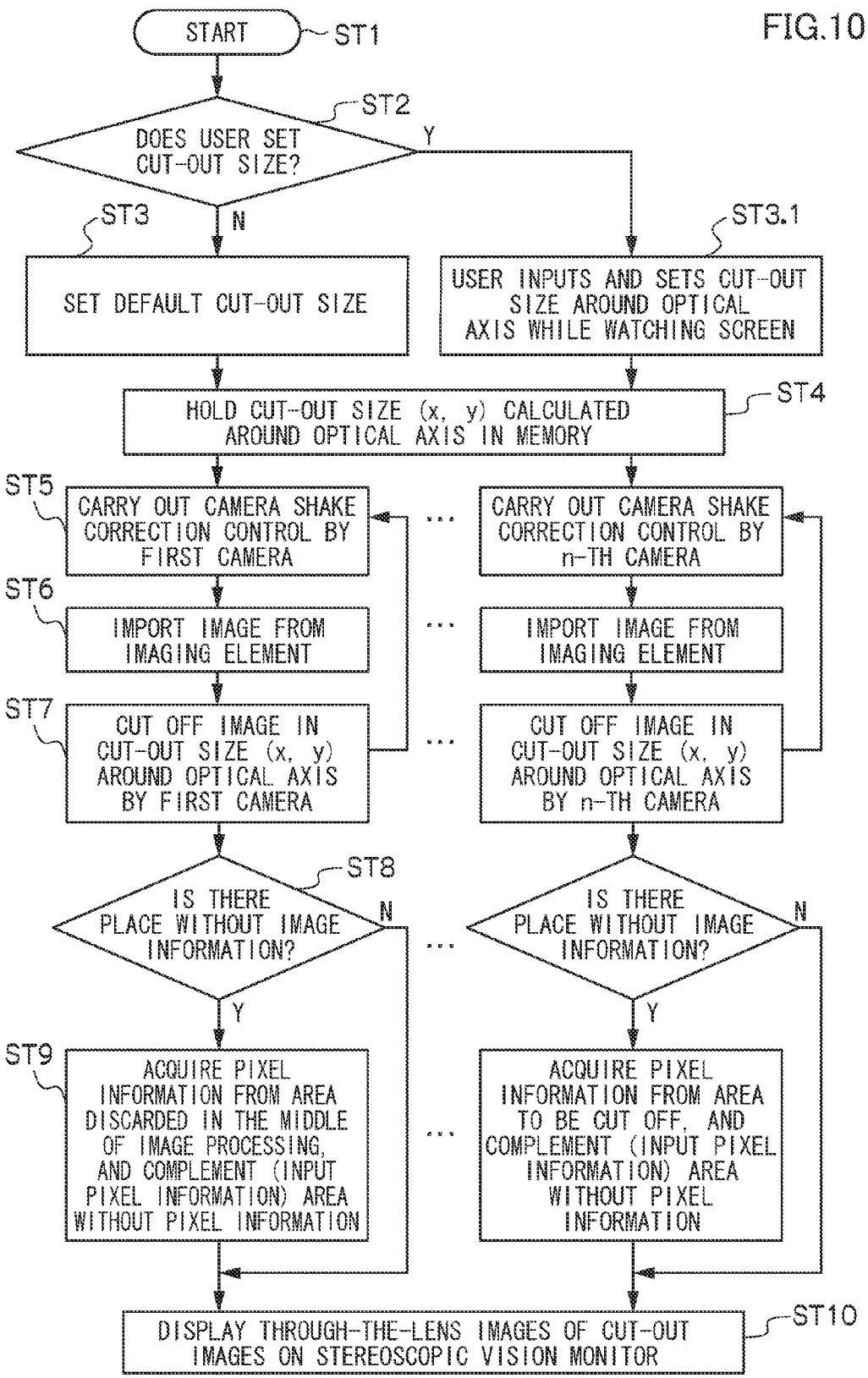
FIG. 10 is a flow chart of a process according to the third embodiment.

FIG. 10 is a flow chart of a process executed by the imaging apparatus 10*a* or 10*b* according to the third embodiment. A program according to the third embodiment for causing the camera control unit 40*a* or 40*b* to execute the process is stored in the ROM 41.

In ST1, the camera control unit 40 proceeds to ST2 in response to the reception of the start of imaging from the operation unit 17.

In ST2, the camera control unit 40 receives, from the operation unit 17, a selection of whether the user sets the cut-out size. The process proceeds to ST3.1 if a selection that the user sets the cut-out size is received and proceeds to ST3 if a selection that the user does not set the cut-out size is received.

In ST3, the camera control unit 40 sets the cut-out size stored in the cut-out size memory unit 53 in ST9 of the second embodiment as the cut-out size of the i-th viewpoint images.

In ST3.1, the camera control unit 40 receives, from the operation unit 17, a desired cut-out size of the i-th viewpoint images including the initial optical axis center position of the lenses 11-*i*-*a* or b stored in the initial optical axis center position memory unit 52 as the center of the cut-out area.

In ST4, the camera control unit 40 determines the possible cut-out area from the initial optical axis center position of the lenses 11-*i*-*a* or b and from the cut-out size set in ST3 or ST3.1 and stores the coordinates in the cut-out size memory unit 53.

ST5 to ST7 are the same as ST10 to ST12 of the second embodiment. More specifically, the camera control unit 40 cuts out rectangular areas with the center position and size stored in the cut-out size memory unit 53 from the first to n-th image data after the vibration correction to obtain the first to n-th viewpoint images. However, in the present embodiment, cut-out sources of the first to n-th viewpoint images are included in a default cut-off range in the first to n-th image data. Thus, there may be a loss of pixel information at a part not included in the default cut-off range in the cut-out areas corresponding to the first to n-th viewpoint images. Therefore, the camera control unit 40 stores, in the frame memory 43 or the RAM 42, i-th remaining data as remaining image data after the i-th viewpoint images are cut out from the i-th image data.

Figure 11A:
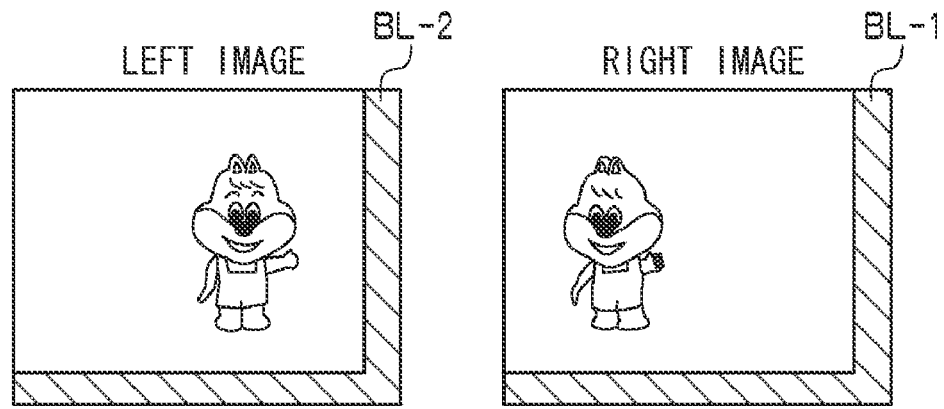
FIG. 11A is a diagram showing an example of complement target areas of first and second viewpoint images.

In ST8, the camera control unit 40 determines whether there is a complement target area, which is an area without pixel information, for each of the first to n-th viewpoint images. This can be determined by whether the complement target area calculation unit 70 has extracted an area without color information from each i-th viewpoint image. The process proceeds to ST9 if there is a complement target area in an i-th viewpoint image and proceeds to ST10 instead of to ST9 if there is no complement target area. Reference characters BL-1/2 of FIG. 11A designate an example of the complement target areas of the first and second viewpoint images, respectively.

Figure 11B:
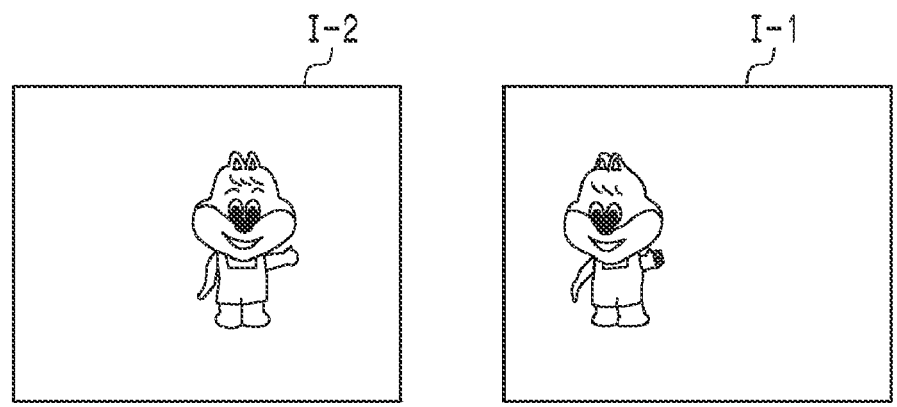
FIG. 11B is a diagram showing another example of the complement target areas of the first and second viewpoint images.

In ST9, the camera control unit 40 cuts out an image area equivalent to the complement target area from the i-th remaining data and superimposes the cut out image area on the complement target area of each i-th viewpoint image to control the area complement unit 55 to complement the area without the pixel information. Reference characters I-1/2 of FIG. 11B show an example of the first and second viewpoint images in which the first and second remaining data is combined with the complement target areas.

In ST10, the stereoscopic image processing circuit 45 the camera control unit 40 continuously outputs the through-the-lens images to the monitor unit 18 based on the i-th viewpoint image in which the area without the pixel information is complemented.

As a result of the process, even if there is an area without pixel information in the viewpoint image because the amount of camera shake correction is large or because the cut-out size is not selected in accordance with the amount of camera shake correction, the area is complemented based on the pixel information of the area that has been discarded in the middle of image processing in the past. Therefore, a surplus (margin) of the cut-out range that allows handling the shift in the cut-out range due to a large camera shake correction can be secured, and the display resolution of the stereoscopic image improves. Moreover, the optical axis center of the image does not change before and after the camera shake correction, and the stereoscopic image can be outputted in the same quality as when there is no camera shake correction.

Fourth Embodiment

Figure 12A:
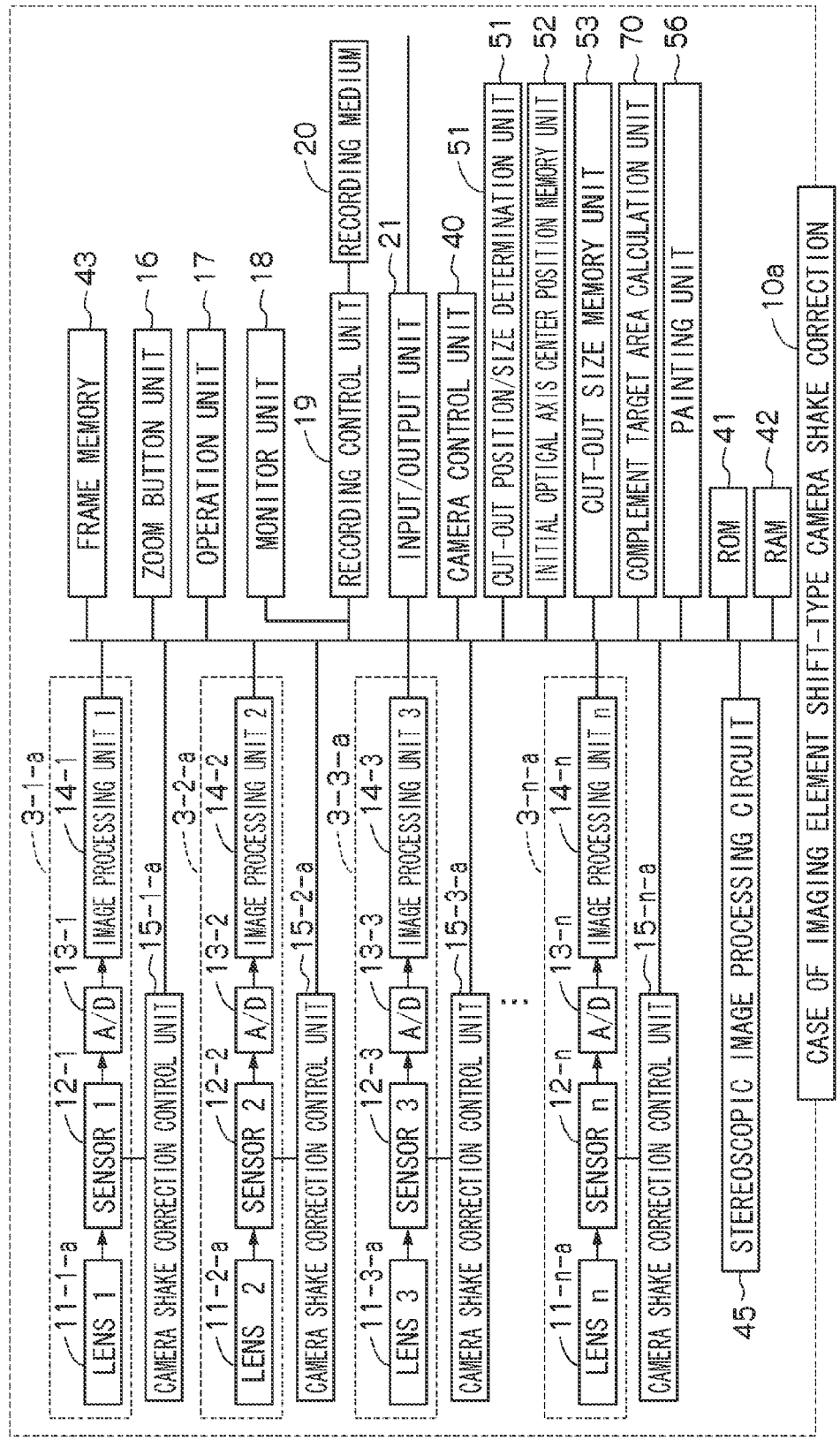
FIG. 12A is a block diagram of the imaging apparatus according to a fourth embodiment.
Figure 12B:
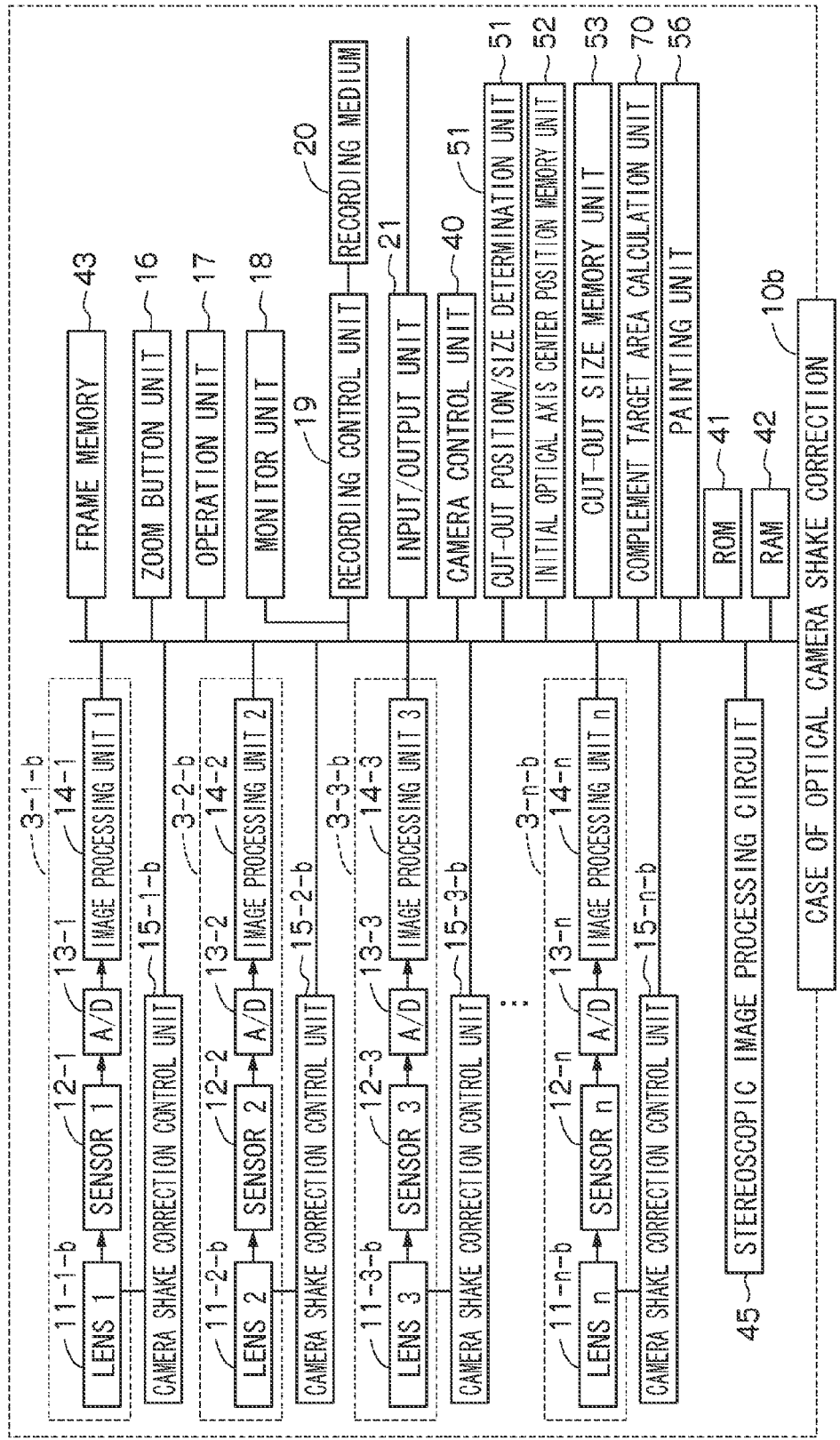
FIG. 12B is another block diagram of the imaging apparatus according to the fourth embodiment.

FIG. 12A shows a schematic block diagram of the imaging apparatus 10a including an imaging element shift-type camera shake correction control unit according to a fourth embodiment of the present invention, and FIG. 12B shows a schematic block diagram of the imaging apparatus 10b including an optical camera shake correction control unit according to the fourth embodiment of the present invention. Blocks with the same functions between the imaging apparatuses 10a/10b of FIGS. 12A and 12B or in the described embodiments are designated with the same reference numerals except for the branch numbers.

The imaging apparatuses 10a/10b include the complement target area calculation units 70 and painting units 56 constituted by arithmetic apparatuses such as CPUs.

Figure 13:
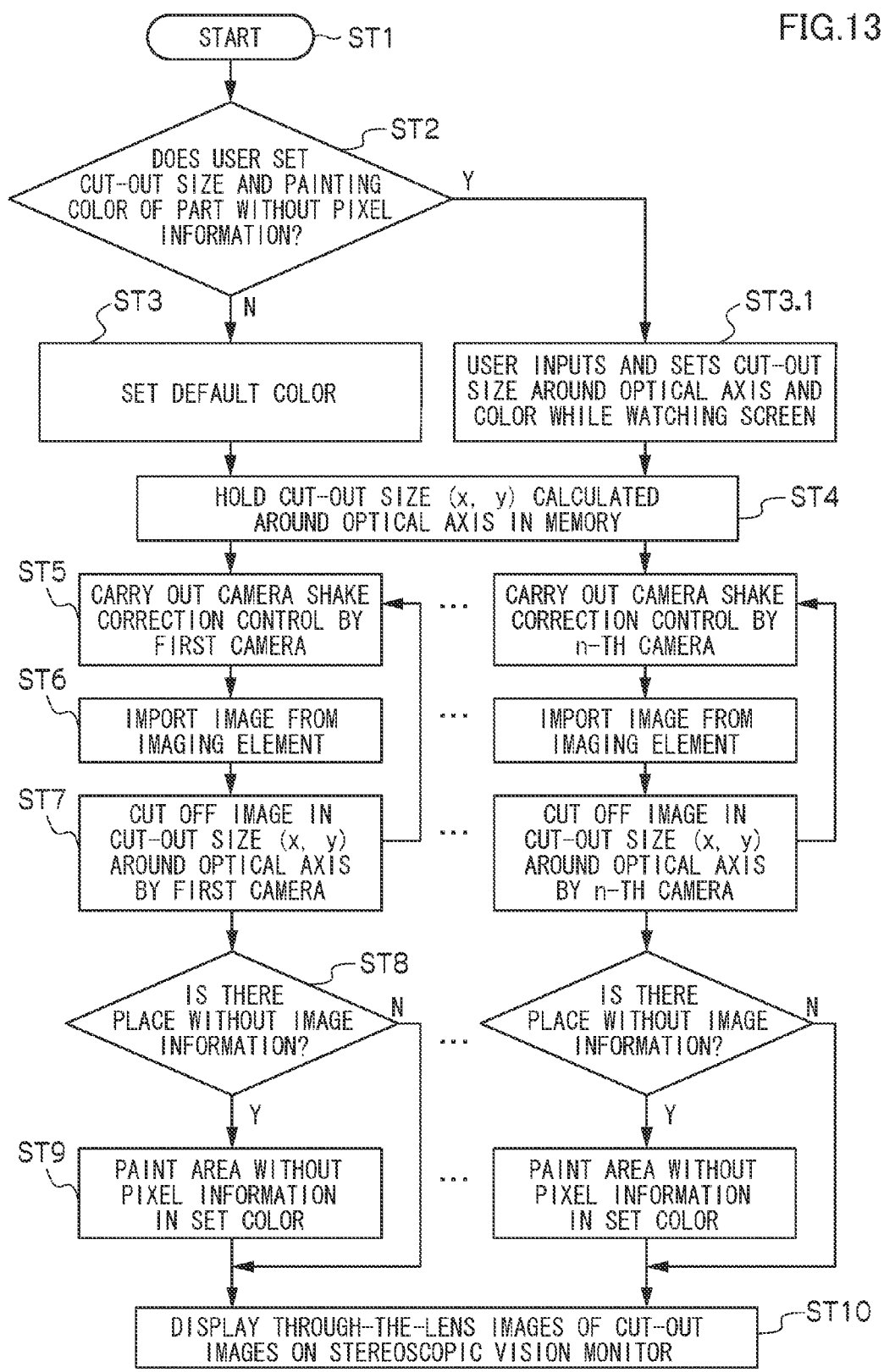
FIG. 13 is a flow chart of a process according to the fourth embodiment.

FIG. 13 shows a flow chart of a correction process executed by the imaging apparatus 10a or 10b according to the fourth embodiment. A program according to the fourth embodiment for causing the camera control unit 40a or 40b to execute the process is stored in the ROM 41.

In ST1, the camera control unit 40 proceeds to ST2 in response to the reception of the start of imaging from the operation unit 17.

In ST2, the camera control unit 40 receives, from the operation unit 17, a selection of whether the user sets a painting color of a part where there is no cut-out size and pixel information. The process proceeds to ST3.1 if a selection that the user performs the setting is received and proceeds to ST3 if a selection that the user does not perform the setting is received.

In ST3, the camera control unit 40 sets a default painting color stored in advance in the ROM 41 as the painting color of the i-th viewpoint image.

In ST3.1, the camera control unit 40 receives a selection of a painting color of a complement target area from the operation unit 17. A color palette of color samples may be displayed on the monitor unit 18, and a desired color may be designated from the color palette.

ST4 to ST8 are the same as ST4 to ST8 of the third embodiment.

In ST9, the camera control unit 40 superimposes the painting color set in ST3 or ST3.1 on the complement target area of each i-th viewpoint image to control the painting unit 56 to complement the area without the pixel information.

In S10, the camera control unit 40 controls the stereoscopic image processing circuit 455 to continuously output the through-the-lens images to the monitor unit 18 based on the i-th viewpoint images on which the painting color is superimposed.

Figure 14:
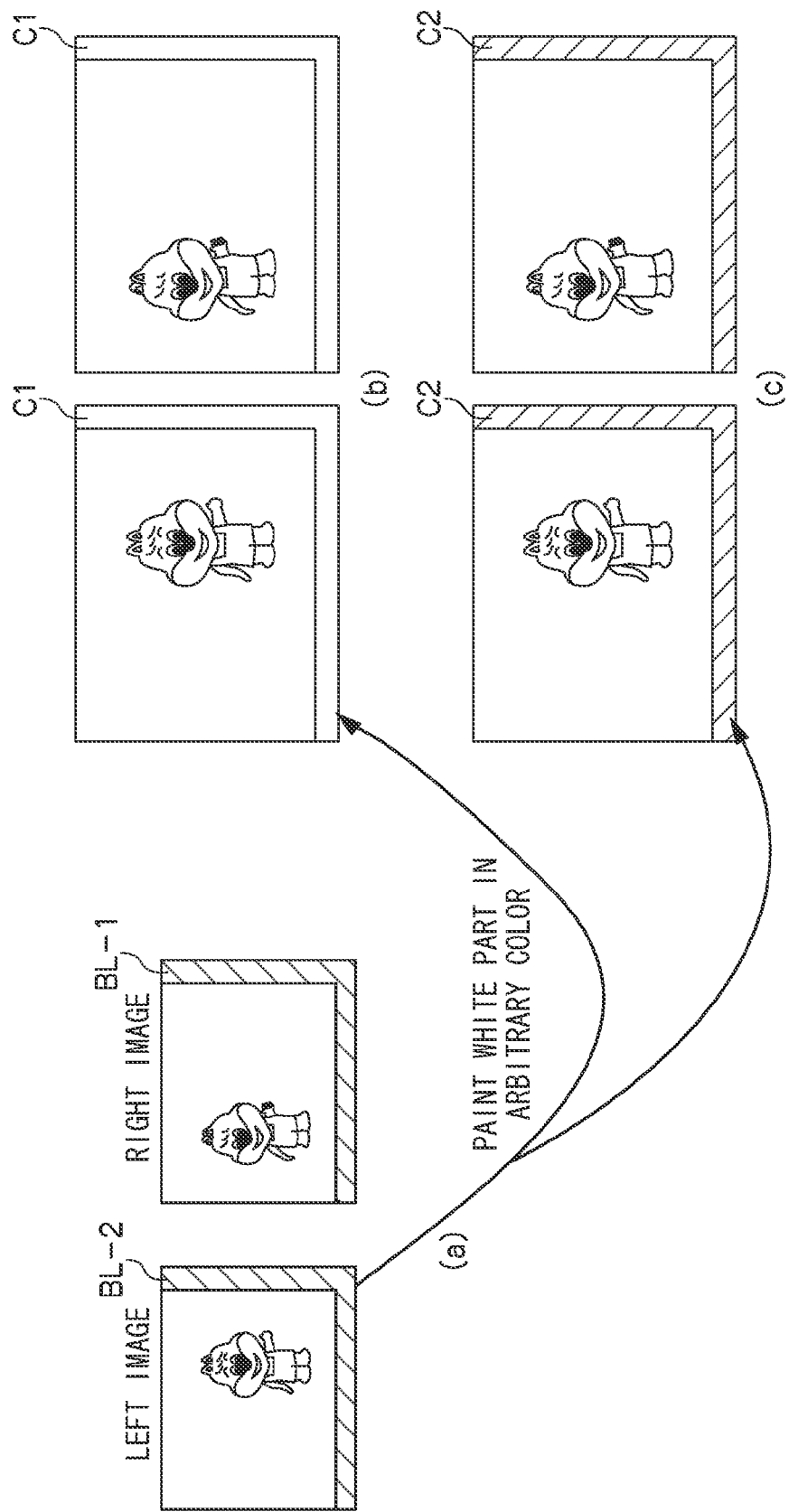
FIG. 14 is a diagram showing an example of painted complement target areas.

A part (a) of FIG. 14 shows the complement target areas BL-1/2 of the first and second viewpoint images, a part (b) of FIG. 14 shows an example in which the complement target areas BL-1/2 are painted by a default color or a selected color C1, and a part (c) of FIG. 14 shows an example in which the complement target areas BL-1/2 are painted by a color C2.

According to the process, even if there is an area without the pixel information in the viewpoint image, the area without the pixel information is painted in the default color or an arbitrary color selected by the user. Therefore, a surplus (margin) of the cut-out range that allows handling the shift in the cut-out range due to a large camera shake correction can be secured, and the display resolution of the stereoscopic image improves. Furthermore, the optical axis center of the image does not change before and after the camera shake correction, and the stereoscopic image can be outputted in the same quality as when there is no camera shake correction. Moreover, as the painted area is displayed on the monitor unit 18, the user can recognize that the camera shake correction has been performed to the limit.

Fifth Embodiment

The optical axis center positions of the i-th viewpoint images cut out in the first to fourth embodiments, particularly the optical axis center positions in the Y axis direction, coincide. Therefore, a horizontally long panoramic image can be easily created by connecting the i-th viewpoint images so as to match the optical axis center positions in the Y axis direction of the i-th viewpoint images.

Figure 15A:
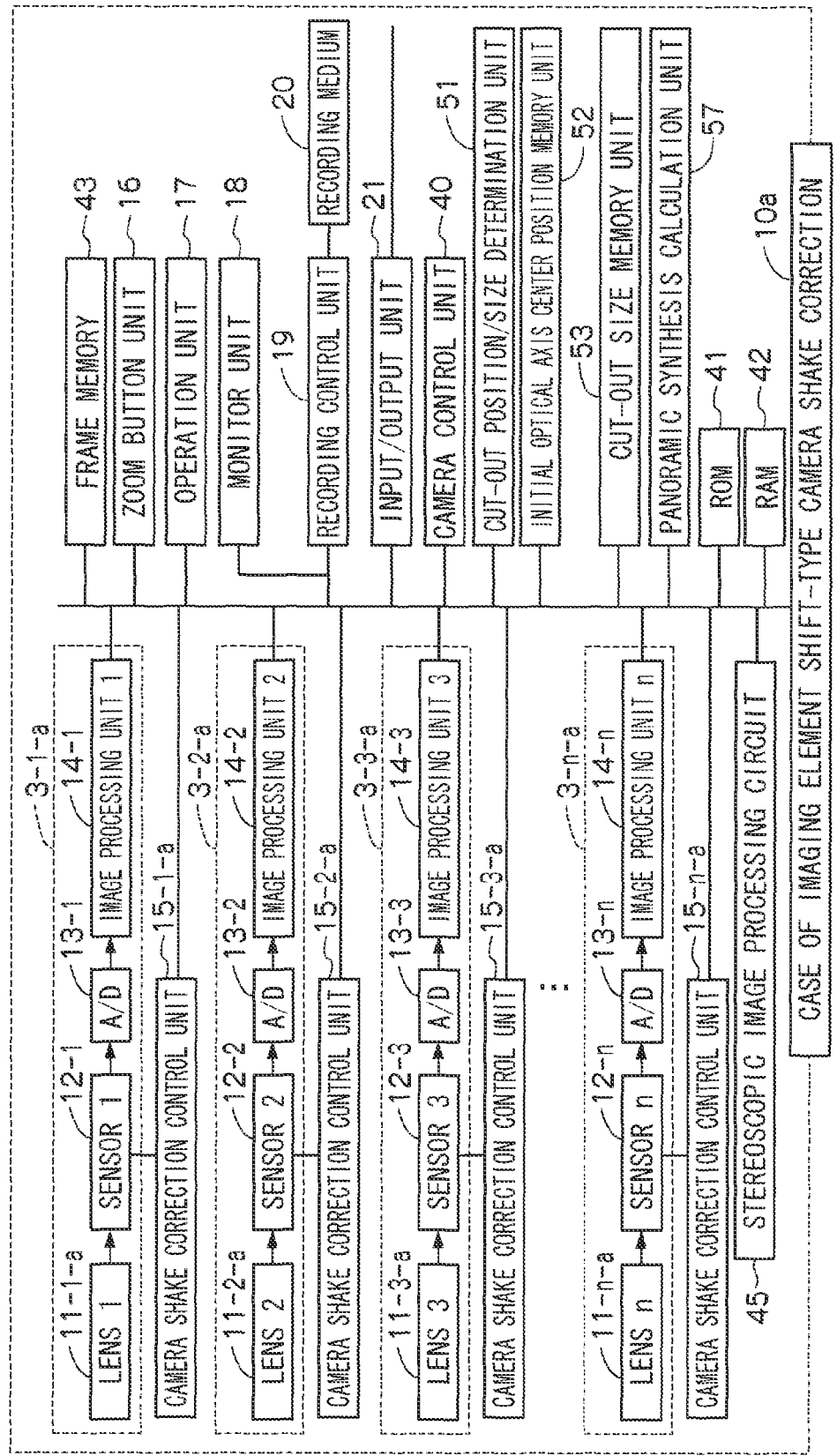
FIG. 15A is a block diagram of the imaging apparatus according to a fifth embodiment.
Figure 15B:
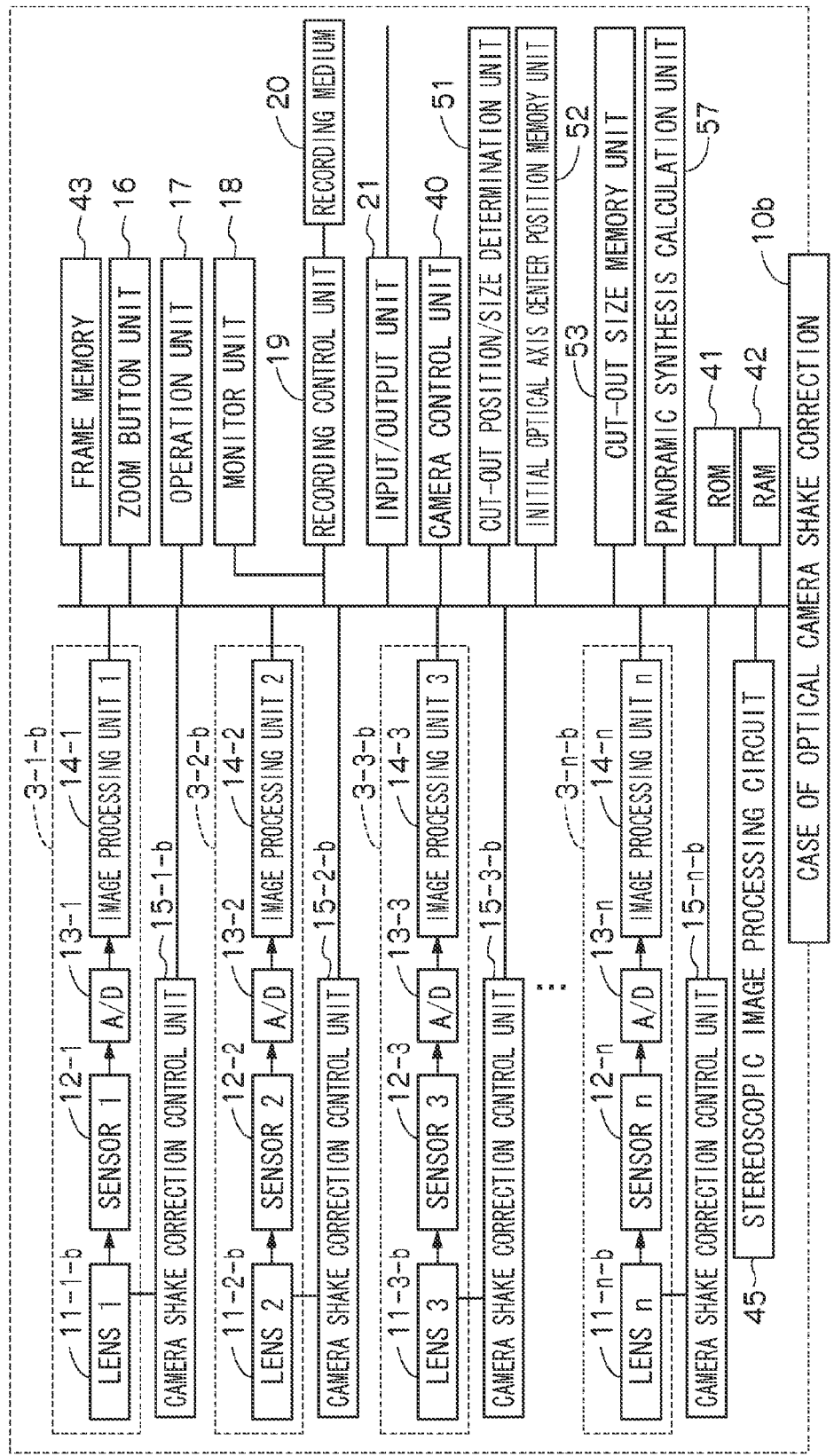
FIG. 15B is another block diagram of the imaging apparatus according to the fifth embodiment.

FIG. 15A shows a schematic block diagram of the imaging apparatus 10a including an imaging element shift-type camera shake correction control unit according to a fifth embodiment of the present invention, and FIG. 15B shows a schematic block diagram of the imaging apparatus 10b including an optical camera shake correction control unit according to the fifth embodiment of the present invention. Blocks with the same functions between the imaging apparatuses 10a/10b of FIGS. 12A and 12B or in the described embodiments are designated with the same reference numerals except for the branch numbers.

The imaging apparatuses 10a/10b include panoramic synthesis calculation units 57 constituted by arithmetic apparatuses such as CPUs.

Figure 16:
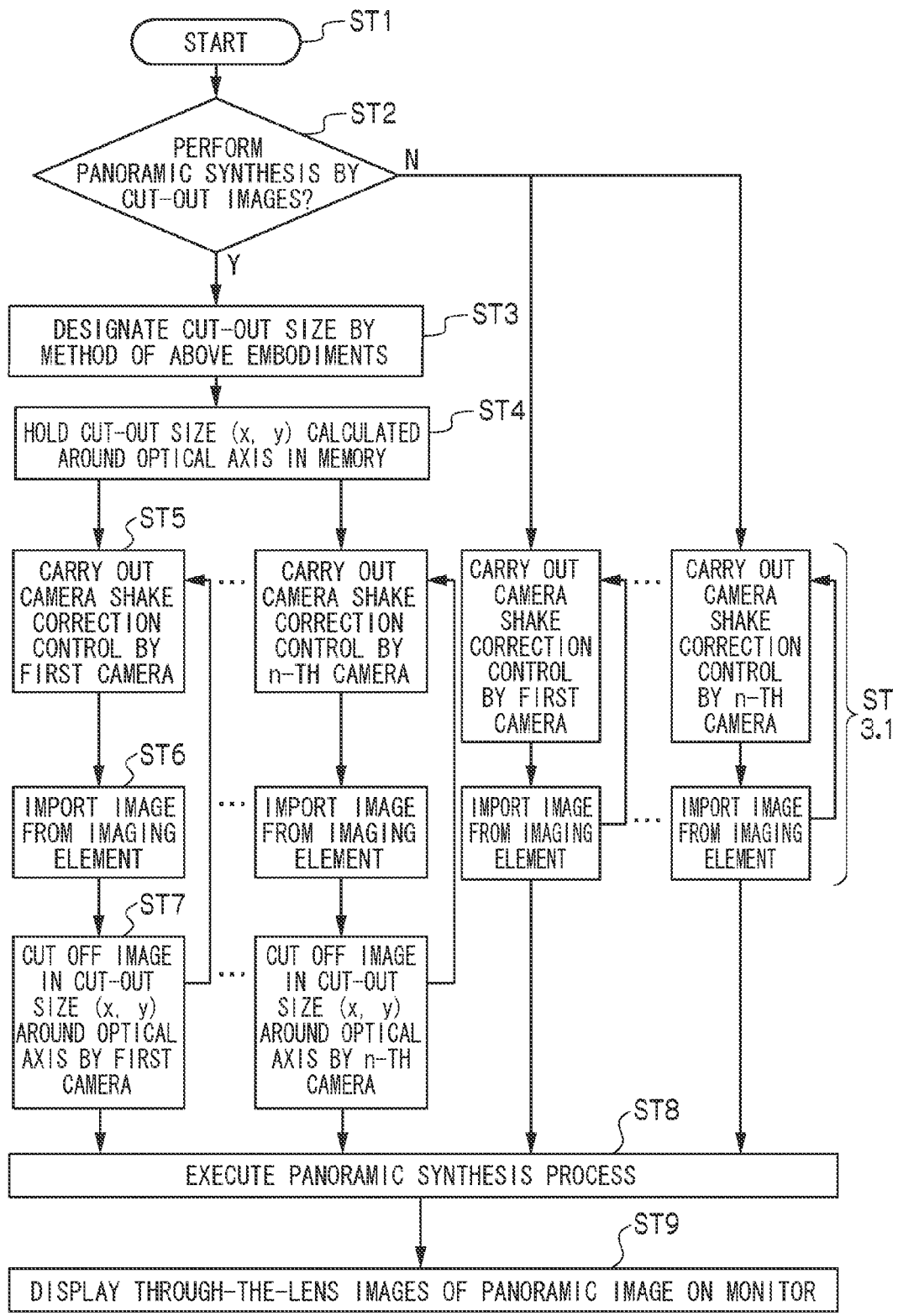
FIG. 16 is a flow chart of a process according to the fifth embodiment.

FIG. 16 shows a flow chart of a process executed by the imaging apparatus 10a or 10b according to the fifth embodiment. A program according to the fifth embodiment for causing the camera control unit 40a or 40b to execute the process is stored in the ROM 41.

In ST1, the camera control unit proceeds to ST2 in response to the reception of the start of operation from the operation unit 17.

In ST2, the camera control unit 40 receives, from the operation unit 17, a selection of whether to create a panoramic image from the cut out i-th viewpoint images. The process proceeds to ST3 if a selection for creating a panoramic image from the cut out i-th viewpoint images is received and proceeds to ST3.1 if a selection for not creating a panoramic image from the i-th image data that is not cut out is received.

In ST3 and 4, the camera control unit 40 determines the cut-out size as in the second to fourth embodiments and stores the cut-out size in the cut-out size memory unit 53.

In ST3.1, the camera control unit 40 performs the camera shake correction as in ST10 and ST11 of the second embodiment or ST5 and 6 of the third and fourth embodiments and then outputs, to the frame memory 43, the i-th image data of the i-th imaging unit 3a after the camera shake correction.

In ST5 to ST7, the i-th viewpoint images are cut out from the i-th image data as in ST12 of the second embodiment or ST5 to ST7 of the third embodiment or the fourth embodiment.

Figure 17:
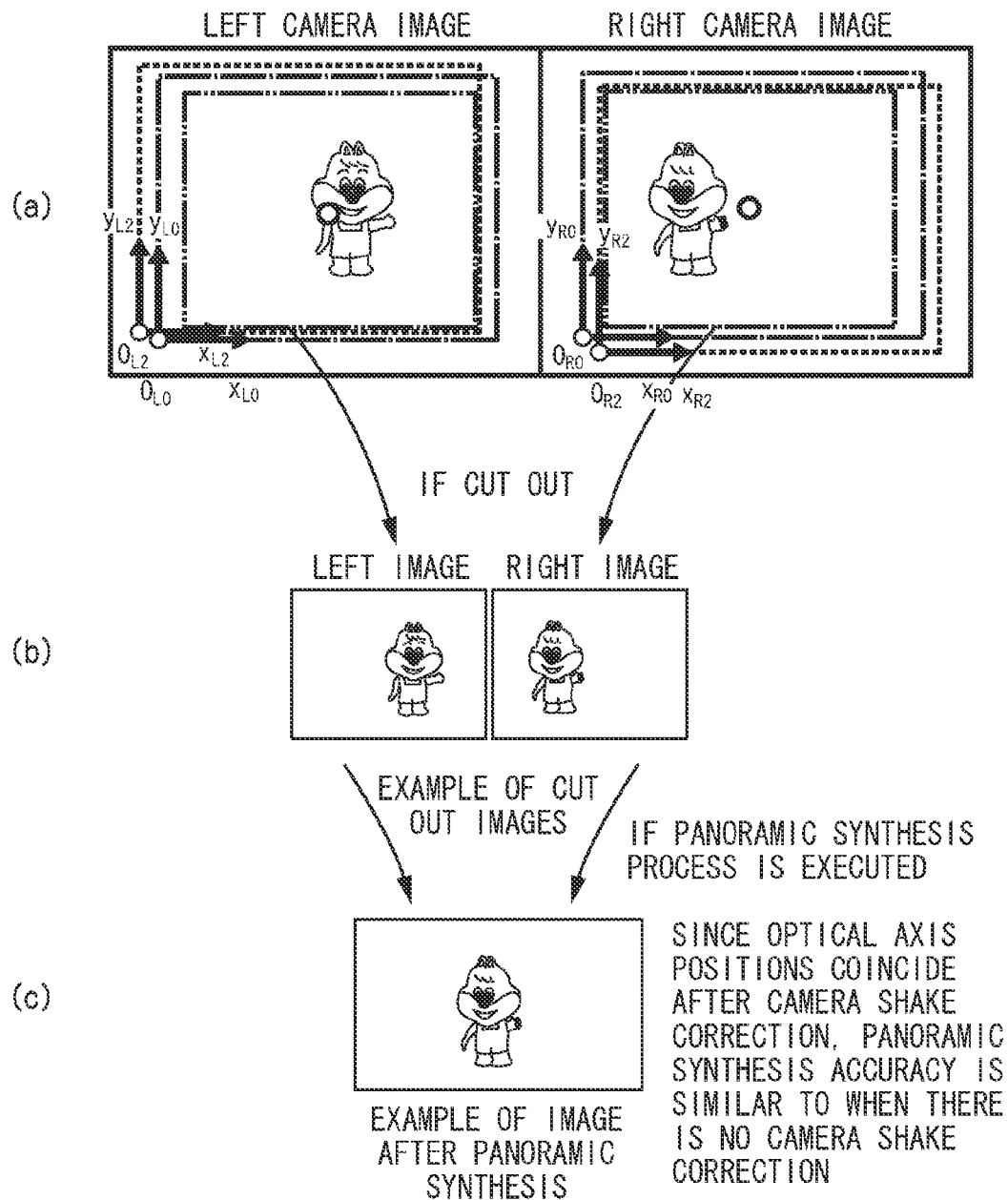
FIG. 17 is a diagram showing an example of a panoramic image.

A part (a) of FIG. 17 shows an example of the first and second image data, and a part (b) of FIG. 17 shows an example of the first and second viewpoint images cut out from the first and second image data.

In ST8, if the selection for creating a panoramic image from the cut out i-th viewpoint images is received in ST2, the camera control unit 40 controls the panoramic synthesis calculation unit 57 to synthesize a panoramic image by connecting the i-th viewpoint images so that the optical axis center positions in the Y axis direction of the i-th viewpoint images cut out in ST7 coincide. On the other hand, if the selection for creating a panoramic image from the i-th image data that is not cut out is received in ST2, the camera control unit 40 controls the panoramic synthesis calculation unit 57 to synthesize a panoramic image by connecting the i-th viewpoint images so that the subjects of the i-th image data acquired in ST3.1 coincide. The panoramic synthesis calculation unit 57 outputs the synthesized panoramic image on the monitor unit 18. If the i-th image data is sequentially and continuously acquired, the panoramic images are also continuously outputted to the monitor unit 18 (through-the-lens panoramic images).

A part (c) of FIG. 17 shows an example of the panoramic image synthesized from the first and second viewpoint images.

If the lenses 11-i are vertically lined up unlike FIG. 2, a vertically long panoramic image can be easily created by connecting the i-th viewpoint images so that the optical axis center positions in the X axis direction of the i-th viewpoint images coincide, because the optical axis center positions in the X axis direction of the i-th viewpoint images cut out in the first to fourth embodiments also coincide.

In ST9, the camera control unit 40 continuously outputs, to the monitor unit 18, the panoramic images combined by the panoramic synthesis calculation unit 57 based on the sequentially acquired i-th viewpoint images.

As a result of the process, a panoramic image is created so that the optical axis centers of the images after the camera shake correction coincide. Therefore, the accuracy of the synthesis of the panoramic image from the i-th viewpoint images after the camera shake correction can be about the same as the accuracy of the synthesis of the panoramic image from the i-th image data without the camera shake correction (the optical axis center is not displaced from the beginning). The panoramic image can be created just by matching the optical axis centers, and only a small amount of calculation is required.

Sixth Embodiment

Figure 18A:
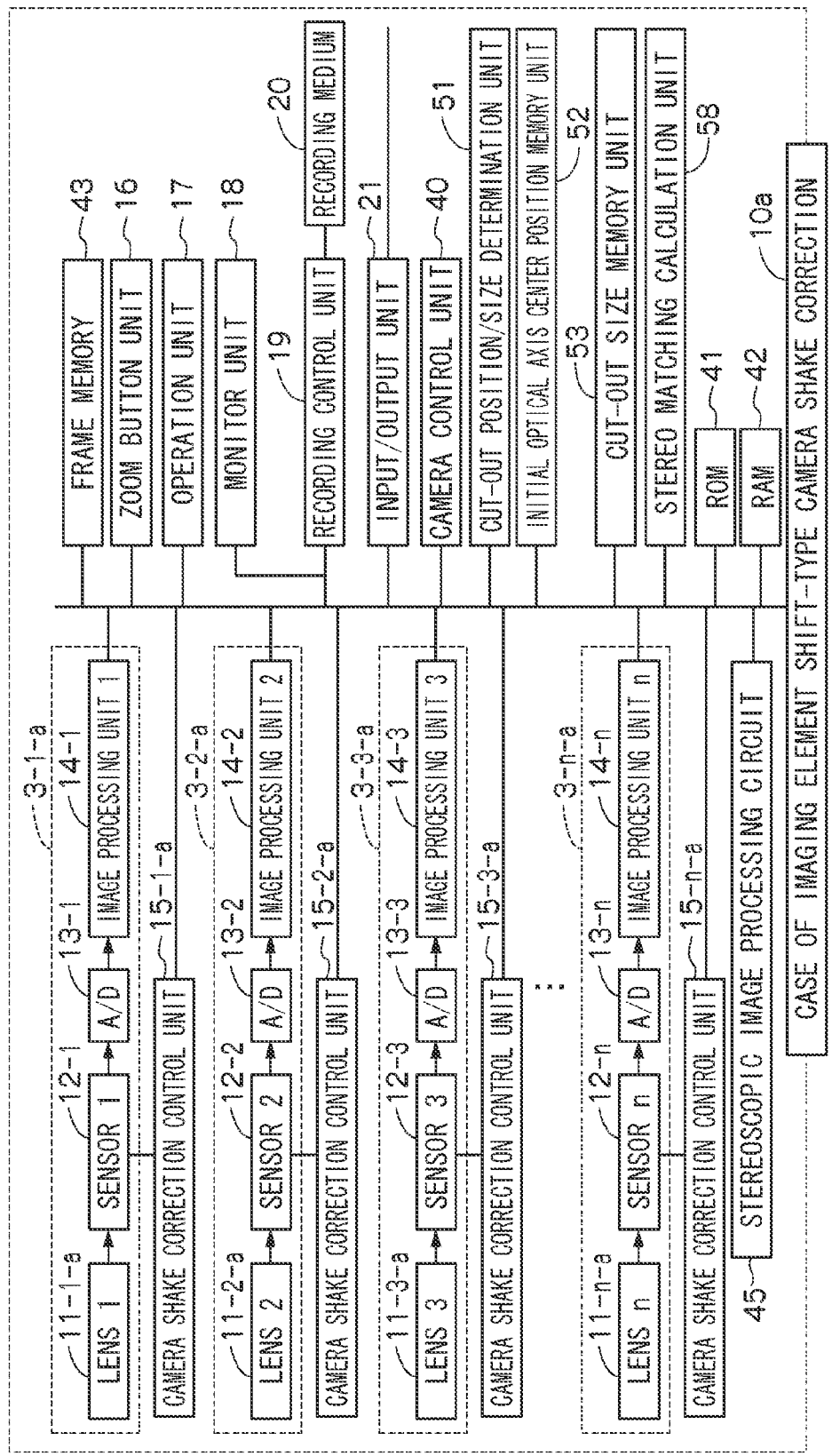
FIG. 18A is a block diagram of the imaging apparatus according to a sixth embodiment.
Figure 18B:
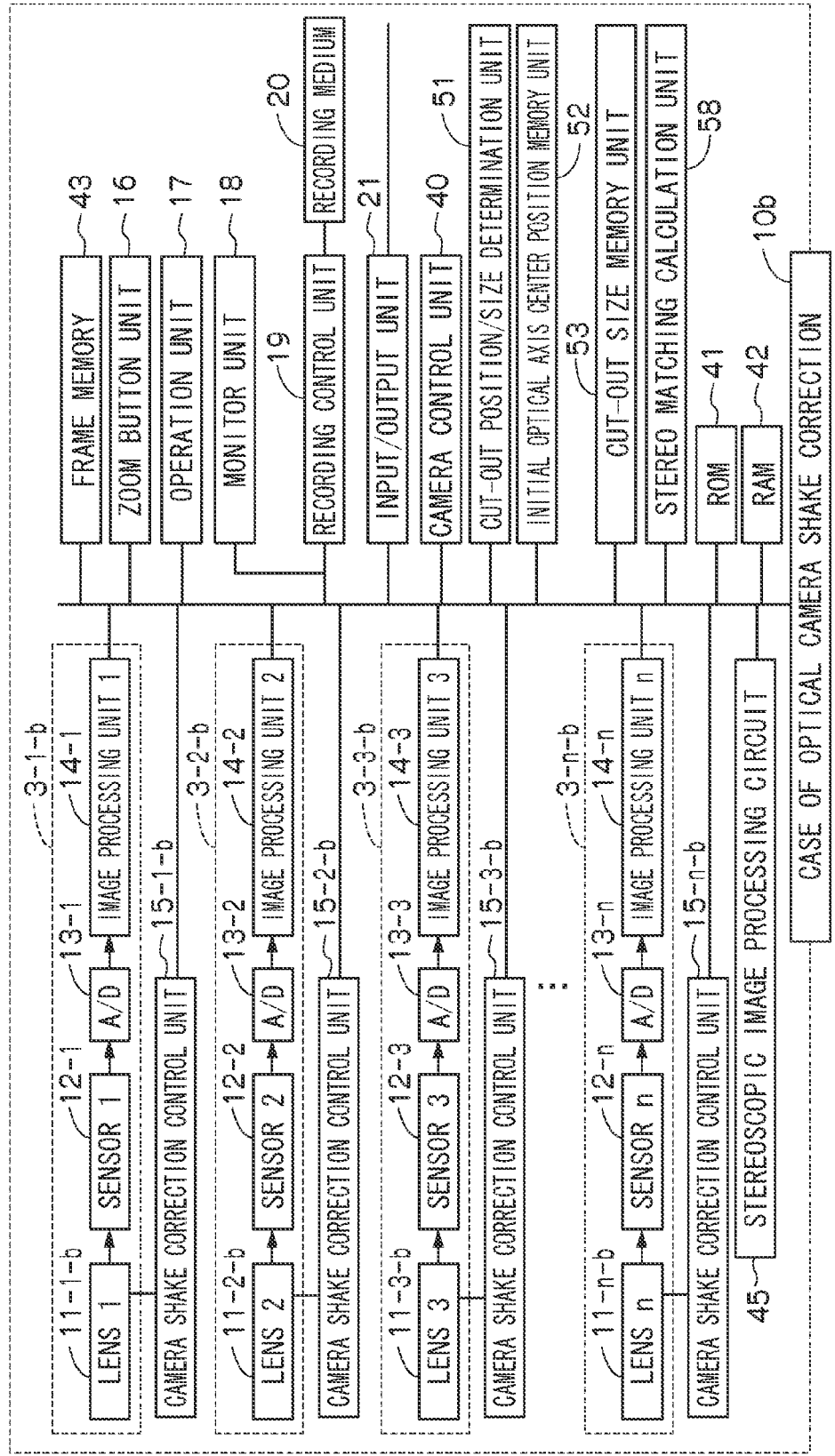
FIG. 18B is another block diagram of the imaging apparatus according to the sixth embodiment.

FIG. 18A shows a schematic block diagram of the imaging apparatus 10a including an imaging element shift-type camera shake correction control unit according to a sixth embodiment of the present invention, and FIG. 18B shows a schematic block diagram of the imaging apparatus 10b including an optical camera shake correction control unit according to the sixth embodiment of the present invention. Blocks with the same functions between the imaging apparatuses 10a/10b of FIGS. 18A and 18B or in the described embodiments are designated with the same reference numerals except for the branch numbers.

The imaging apparatuses 10a/10b include stereo matching calculation units 58 constituted by arithmetic apparatuses such as CPUs. The stereo matching carried out by the stereo matching calculation unit 58 is as in Patent Literatures 4 and 5. More specifically, the stereo matching calculation unit 58 moves the same correlation window as the correlation window set to the base image (for example, the first viewpoint image or the first image data) along the epipolar line on the reference image (for example, the second viewpoint image or the second image data), calculates the correlation of each pixel in the correlation window on each image at each movement position, and calculates, as the corresponding points of pixels, the pixels at the central position of the correlation window where the correlation on the reference image is greater than a predetermined threshold.

Figure 19:
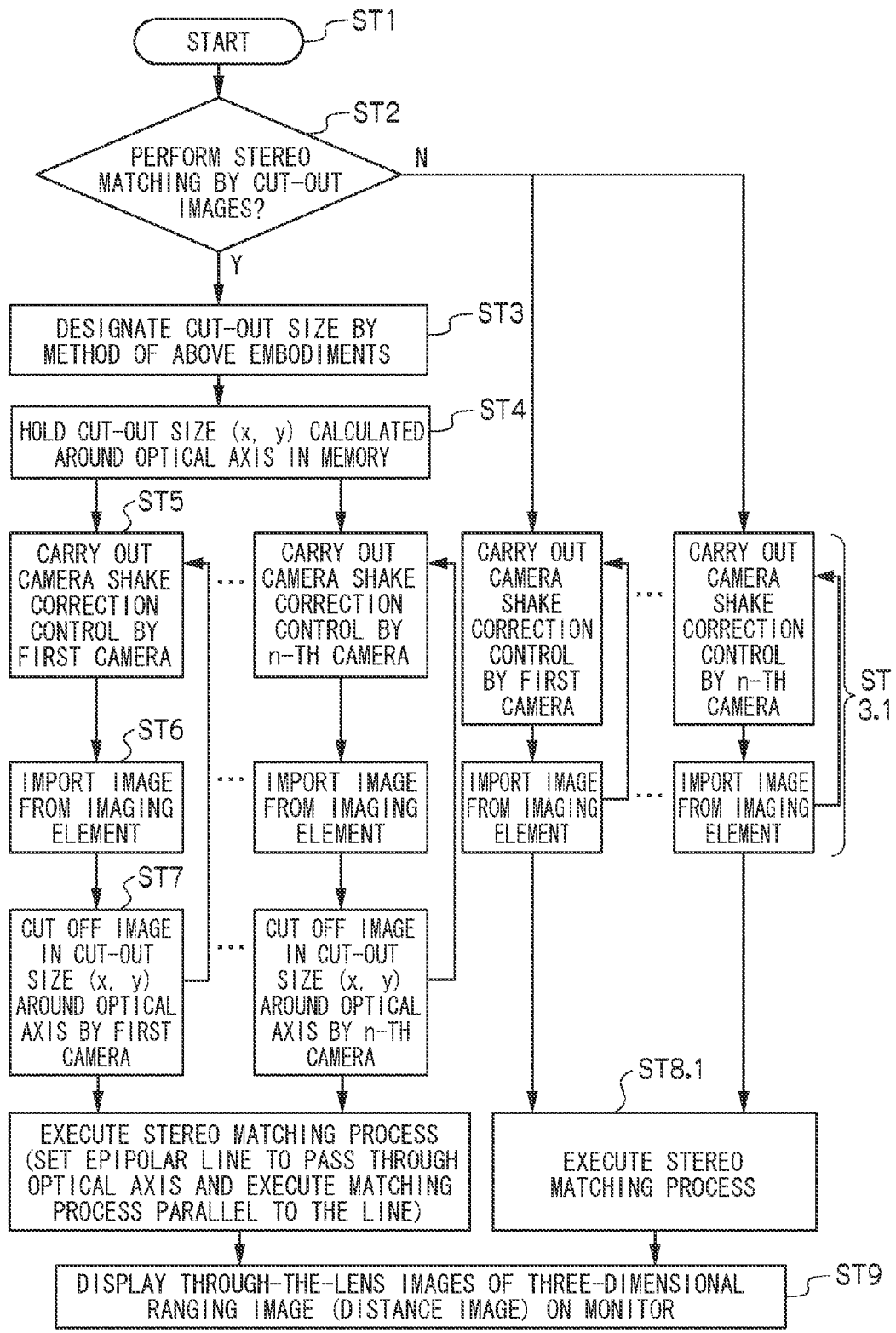
FIG. 19 is a flow chart of a process according to the sixth embodiment.

FIG. 19 shows a flow chart of a process executed by the imaging apparatus 10a or 10b according to the sixth embodiment. A program according to the sixth embodiment for causing the camera control unit 40a or 40b to execute the process is stored in the ROM 41.

In ST1, the camera control unit 40 proceeds to ST2 in response to the reception of the start of stereo matching from the operation unit 17.

In ST2, the camera control unit 40 receives, from the operation unit 17, a selection of whether to carry out the stereo matching from the cut out i-th viewpoint images. The process proceeds to ST3 if a selection for carrying out the stereo matching from the cut out i-th viewpoint images is received and proceeds to ST3.1 if a selection for carrying out the stereo matching from the i-th image data that is not cut out is received.

ST3 to ST7 are the same as ST3 to ST7 of the fifth embodiment, respectively.

In ST8, the camera control unit 40 controls the stereo matching calculation unit 58 to carry out the stereo matching from the cut out i-th viewpoint images. In accordance with the control, the stereo matching calculation unit 58 first sets, as an epipolar line, a line that horizontally passes through the optical axis center coordinates of an ibase-th (ibase is arbitrarily fixed from among 1 to n) viewpoint image as a base image and of an iref-th (iref is an integer from 1 to n, iref ibase) viewpoint image as a reference image. The stereo matching calculation unit 58 then moves the same correlation window as the correlation window set to the ibase-th viewpoint image along the set epipolar line on the iref-th viewpoint image, calculates the correlation of each pixel in the correlation window on each image at each movement position, and obtains, as the corresponding points of pixels, the pixels at the central position of the correlation window in which the correlation on the reference image is greater than the predetermined threshold.

In ST8.1, the camera control unit 40 controls the stereo matching calculation unit 58 to carry out the stereo matching from the i-th image data. Since the displacement of the optical axis position between the i-th viewpoint images due to camera shake is not corrected, the epipolar line for the stereo matching may not be set along the optical axis.

In ST9, the camera control unit 40 controls the stereoscopic image processing circuit 455 to apply a principle of triangulation to the difference (parallax) in the position between the corresponding pixel on the base image and pixel on the reference image that are determined as a result of the stereo matching to measure the distance from the base camera or the reference camera to the point on the subject corresponding to the pixel to generate a distance image indicating a three-dimensional shape of the subject. The stereoscopic image processing circuit 455 outputs the generated distance image to the monitor unit 18.

FIG. 20 schematically shows calculation of the stereo matching when base image is the second viewpoint image (left image), and the reference image is the first viewpoint image (right image). A part (a) of FIG. 20 schematically shows a relationship between the subject, the cameras, the optical axes, and the images of the real space, a part (b) of FIG. 20 schematically shows the first and second image data before cutting out, a part (c) of FIG. 20 schematically shows the first and second viewpoint images after cutting out, a part (d) of FIG. 20 schematically shows an epipolar line L horizontally passing through the optical axis center coordinates of the first and second viewpoint images, and a part (e) of FIG. 20 schematically shows calculation of the corresponding points by moving the correlation window along the epipolar line L.

According to the present process, the viewpoint images cut out around the optical axis are the target of calculation of the stereo matching. More specifically, since the stereo matching is performed along the epipolar line horizontally passing through the optical axis of each cut-out image, the calculation accuracy of the stereo matching improves compared to when the stereo matching is applied to the i-the image data before cutting out, and the amount of calculation is reduced. Furthermore, the same level of calculation accuracy of stereo matching can be secured before and after the camera shake correction.

Seventh Embodiment

Figure 21A:
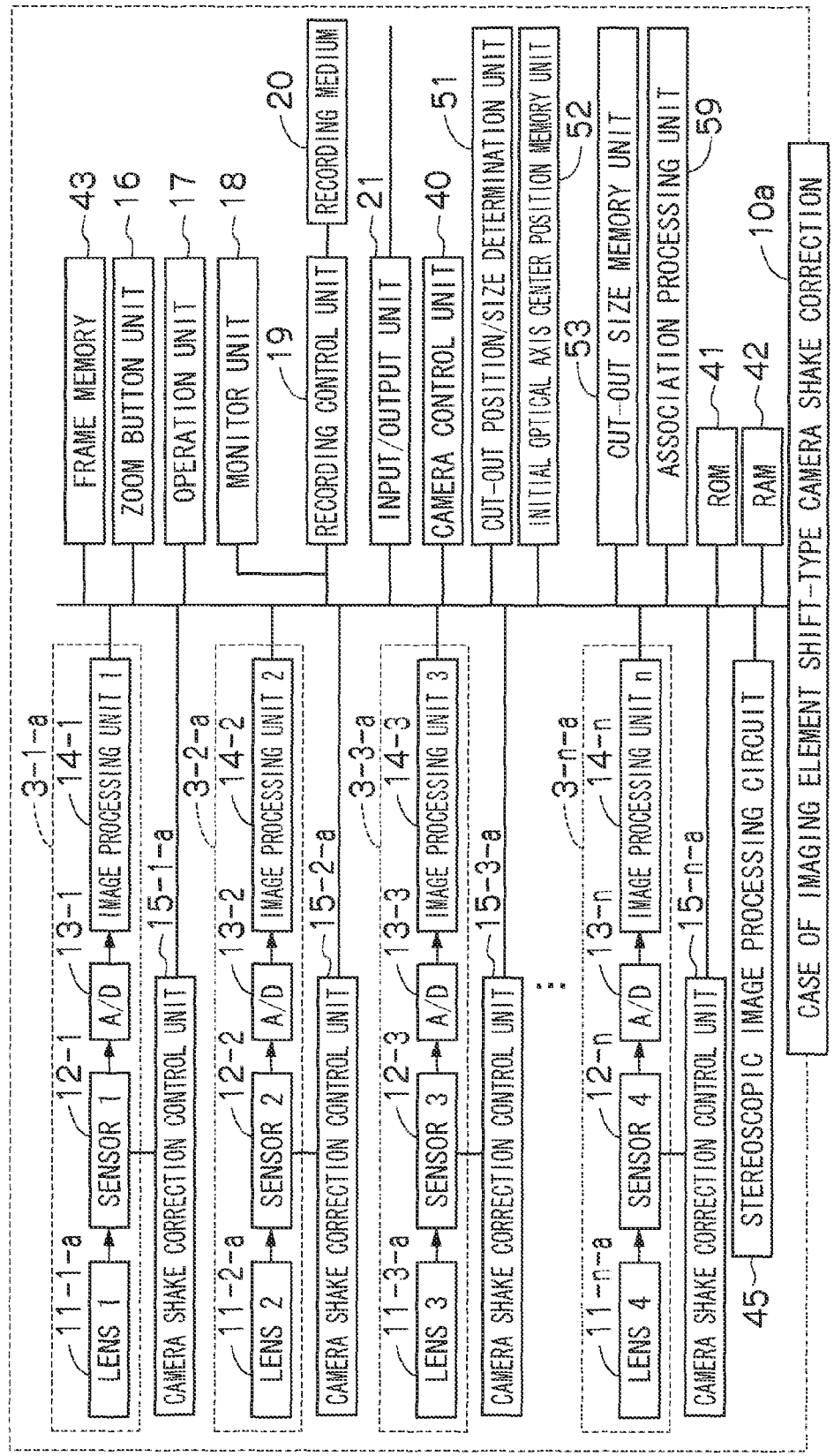
FIG. 21A is a block diagram of the imaging apparatus according to a seventh embodiment.
Figure 21B:
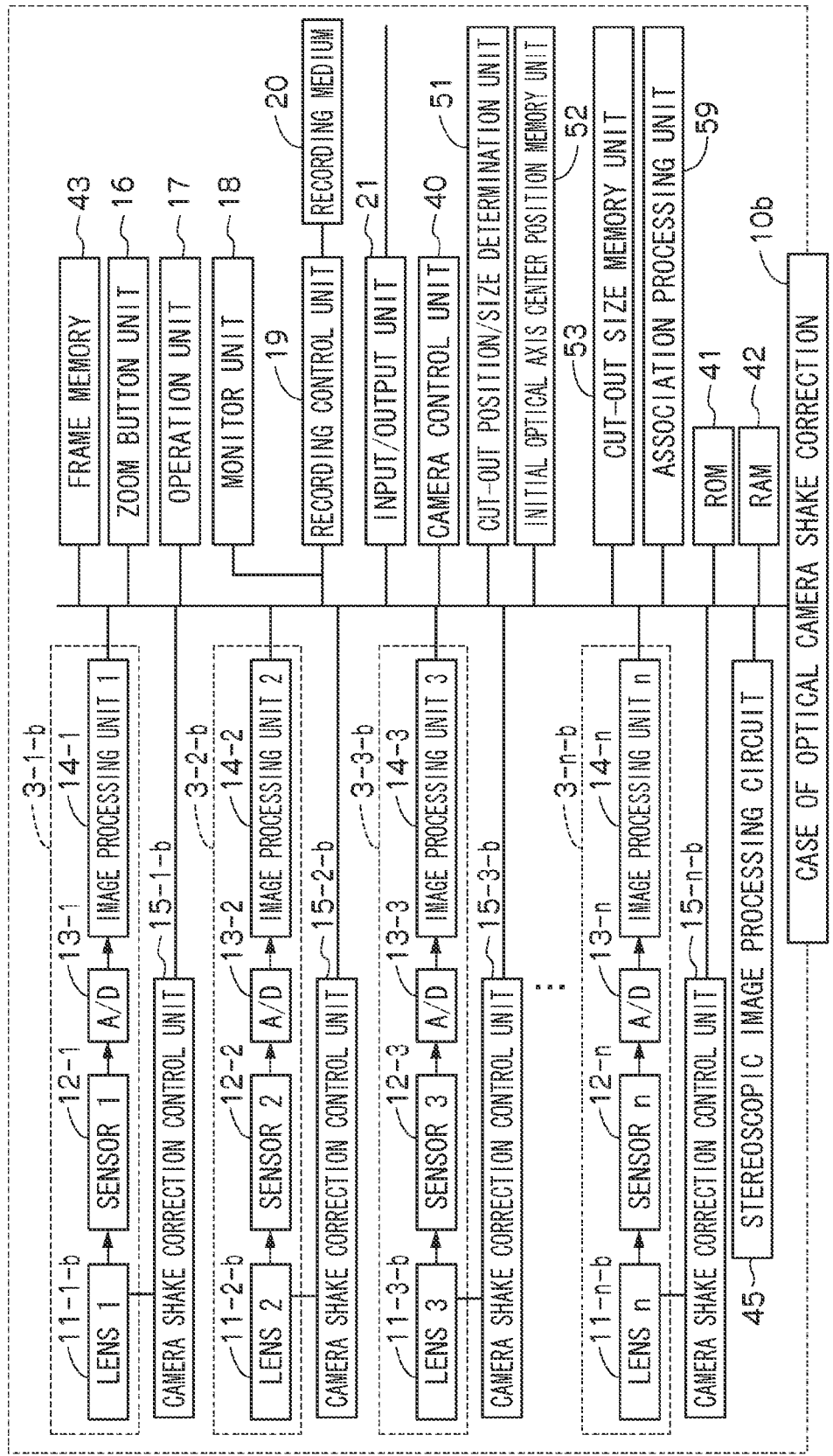
FIG. 21B is another block diagram of the imaging apparatus according to the seventh embodiment.

FIG. 21A shows a schematic block diagram of the imaging apparatus 10a including an imaging element shift-type camera shake correction control unit according to a seventh embodiment of the present invention, and FIG. 21B shows a schematic block diagram of the imaging apparatus 10b including an optical camera shake correction control unit according to the seventh embodiment of the present invention. Blocks with the same functions between the imaging apparatuses 10a/10b of FIGS. 21A and 21B or in the described embodiments are designated with the same reference numerals except for the branch numbers.

The imaging apparatuses 10a/10b include association processing units 59 constituted by arithmetic apparatuses such as CPUs. The association processing unit 59 associates the image data after camera shake correction with various related information (such as the minimum cut-out size of the viewpoint image, the cut-out position coordinates of the viewpoint image, the initial optical axis center position, and the position after correction) and stores the data and information in the predetermined recording medium 20.

Figure 22:
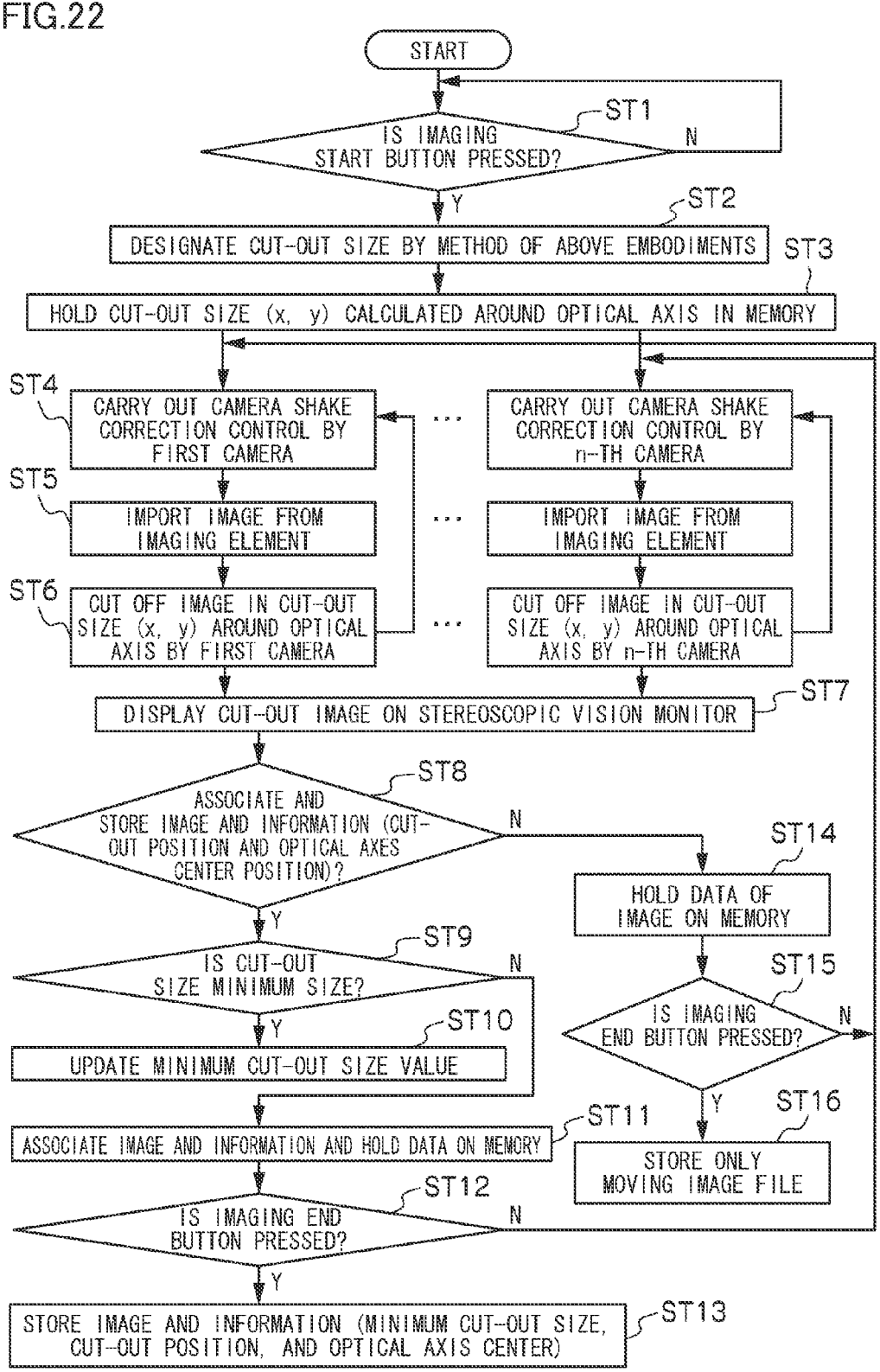
FIG. 22 is a flow chart of a process according to the seventh embodiment.

FIG. 22 shows a flow chart of a correction process executed by the imaging apparatus 10a or 10b according to the seventh embodiment. A program according to the seventh embodiment for causing the camera control unit 40a or 40b to execute the process is stored in the ROM 41.

In ST1, the camera control unit 40 proceeds to ST2 in response to the reception of the start of imaging operation from the operation unit 17.

ST2 to 6 are similar to ST3 to 7 of the sixth embodiment (FIG. 19). However, the point that the process of ST2 to 6 is carried out in response to an instruction of the start of imaging operation is different from the sixth embodiment.

ST7 is similar to ST10 of the first embodiment (FIG. 3). However, the displayed stereoscopic image is a stereoscopic image derived from the i-th viewpoint images acquired in response to the instruction of the start of imaging operation.

In ST8, the camera control unit 40 determines whether a selection of whether to associate and store the images and various information is received from the operation unit 17. The process proceeds to ST9 if a selection for associating and storing the images and various related information is received and proceeds to ST14 if a selection for not associating and storing the images and various related information is received.

In ST9, the camera control unit 40 determines whether the cut-out size stored in ST3 is smaller than the minimum cut-out size stored in the past in the recording medium 20, such as a flash memory. If Yes, the process proceeds to ST10, and if No, the process proceeds to ST11. It is assumed "Yes" if the minimum cut-out size is not stored in the recording medium 20, and the process proceeds to ST10.

In ST10, the camera control unit 40 stores the cut-out size stored in ST3 in the recording medium 20 as the minimum cut-out size.

In ST11, the camera control unit 40 controls the association processing unit 59 to store the storage information including the various related information in the RAM 42. Not only the minimum cut-out size, but also the cut-out size of each i-th viewpoint image designated in ST2 may be stored.

In ST12, the camera control unit 40 determines whether a selection of whether to finish imaging is received from the operation unit 17. The process proceeds to ST13 if a selection for finishing imaging is received and returns to ST4 if a selection for finishing imaging is not received.

In ST13, the camera control unit 40 associates an image group (may be handled as moving images or continuous still images during reproduction), which is constituted by frames of the first to n-th image data continuously and periodically acquired between the instruction of the start of imaging and the instruction of the end of imaging, with the storage information of the RAM 42 and stores the image group in the predetermined recording medium 20. The stored image group may be handled as moving images or continuous still images during reproduction. A still image is stored if there is only one frame.

In ST14, the camera control unit 40 stores, in the RAM 42, the image group constituted by the first to n-th image data continuously and periodically acquired between the instruction of the start of imaging and the instruction of the end of imaging.

In ST15, the same determination as in ST12 is performed. If Yes, the process proceeds to ST16, and if No, the process returns to ST4.

In ST16, the image group of the RAM 42 is recorded in the recording medium 20. The storing method is arbitrary.

FIG. 23A and FIG. 23B show an example of a method of associating the images and the various information. FIG. 23A shows a mode of writing the various information in the header of moving images, and FIG. 23B shows a mode of storing a file that stores the various information together in a storage folder of the moving images.

As shown in FIG. 23A, if a set (frames) of i-th image data at the same acquisition is connected as one image, related information (cut-out position coordinates and optical axis center position coordinates) specific to the i-th image data of the frames is recorded in attached information (such as header and tag) of the file of the connected one image. To separately record the i-th image data constituting the frames at the same acquisition, minimum cut-out size information in relation to all i-th image data corresponding to each imaging time is stored in the attached information of the units of recording (such as file and folder) including all sets of i-th image data corresponding to each imaging time.

If the set (frames) of i-th image data corresponding to the same acquisition time is stored together in one folder as in FIG. 23B, a related information file, such as a text file, that records related information specific to each image and minimum cut-out size information in relation to all i-th image data corresponding to each imaging time is stored in the image storage folder. Although the related information file can be stored in another folder, information indicating the relationship with the image storage folder needs to be stored in the related information file. Alternatively, the related information file may be stored in each of the folders separately storing the i-th image data constituting the frames. The specific methods of associating the images with the various information are not limited to the illustrated methods.

In any case, each frame is associated with the acquisition time of the frame or alternative information (such as chronological order of acquisition of the frame, i.e. frame number).

As a result of the process, the i-th image data before cutting out is stored in the recording medium 20 in association with the relationship information including the minimum cut-out size of the viewpoint images, the cut-out position coordinates of the viewpoint images, the optical axis center position, and the like. Therefore, an information processing apparatus, such as a personal computer, can read out the related information and the i-th image data from the recording medium 20, and stereoscopic image output, three-dimensional ranging, panoramic image output, plane image output, and the like can be performed based on the information and the data.

Eighth Embodiment

Figure 24A:
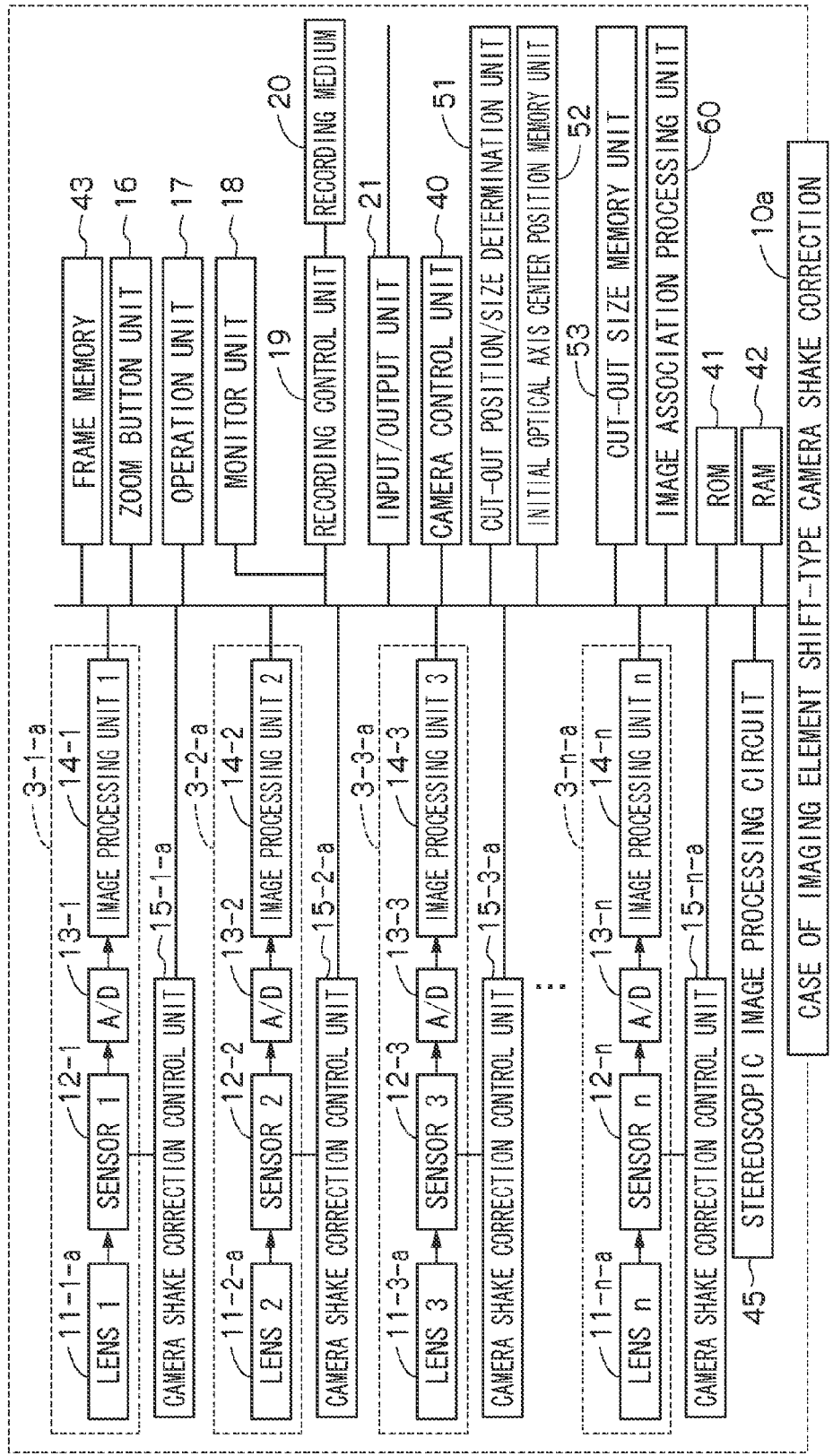
FIG. 24A is a block diagram of the imaging apparatus according to an eighth embodiment.
Figure 24B:
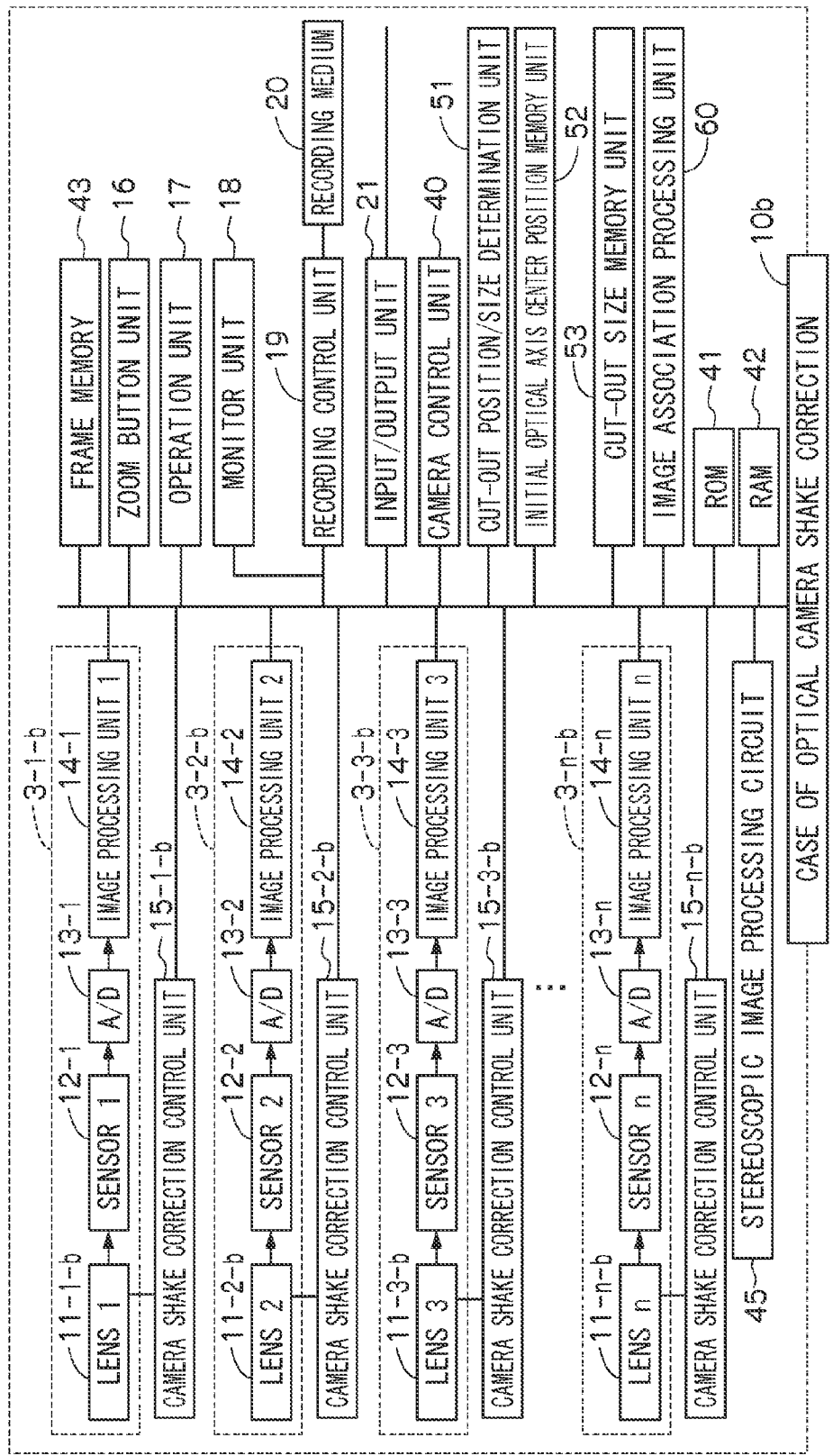
FIG. 24B is a block diagram of the imaging apparatus according to the eighth embodiment.

FIG. 24A shows a schematic block diagram of the imaging apparatus 10a including an imaging element shift-type camera shake correction control unit according to an eighth embodiment of the present invention, and FIG. 24B shows a schematic block diagram of the imaging apparatus 10b including an optical camera shake correction control unit according to the eighth embodiment of the present invention. Blocks with the same functions between the imaging apparatuses 10a/10b of FIGS. 24A and 24B or in the described embodiments are designated with the same reference numerals except for the branch numbers.

The imaging apparatuses 10a/10b include image association processing units 60 constituted by arithmetic apparatuses such as CPUs. The image association processing unit 60 associates the i-th image data after the camera shake correction and stores the data in the predetermined recording medium 20 (such as hard disk and memory card).

Figure 25:
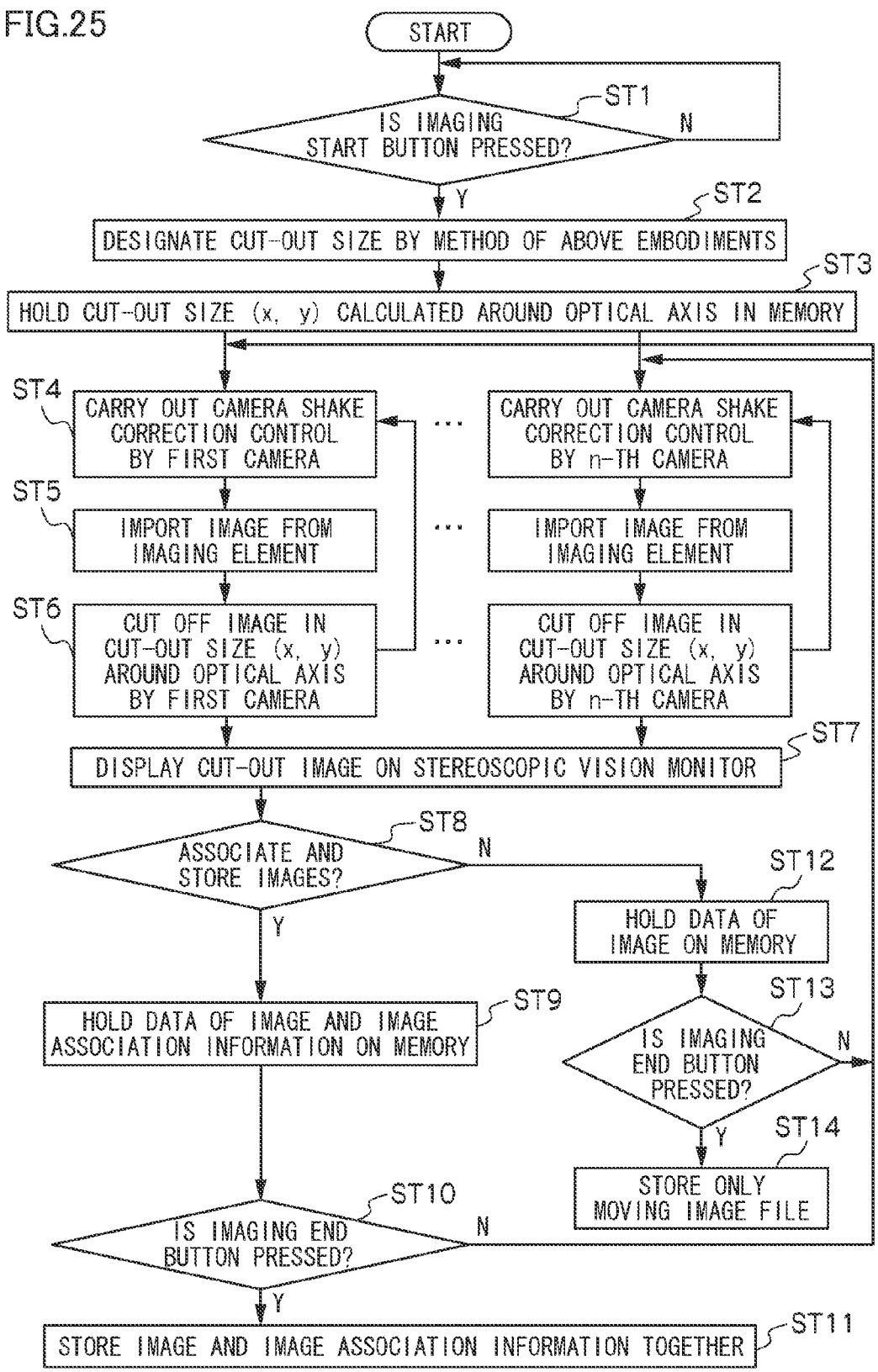
FIG. 25 is a flow chart of a process according to the eighth embodiment.

FIG. 25 shows a flow chart of a process executed by the imaging apparatus 10a or 10b according to the eighth embodiment. A program according to the eighth embodiment for causing the camera control unit 40a or 40b to execute the process is stored in the ROM 41.

ST1 to 7 are the same as ST1 to 7 of the seventh embodiment (FIG. 22).

In ST8, the camera control unit 40 receives, from the operation unit 17, a selection of whether to associate and store the i-th image data corresponding to the same acquisition time. The process proceeds to ST9 if a selection for storage is received and proceeds to ST14 if a selection for storage is not received.

In ST9, the camera control unit 40 controls the image association processing unit 60 to associate the relationship between the i-th viewpoint images constituting the frames at the same imaging as well as the image-related information indicating the chronological order of imaging of the frames with the frames and stores the information in the memory.

In ST10, the same determination as in ST12 of the seventh embodiment is performed. If Yes, the process proceeds to ST11, and if No, the process proceeds to ST12.

ST12 to ST14 are the same as ST14 to ST16 of the seventh embodiment.

Figure 26A:
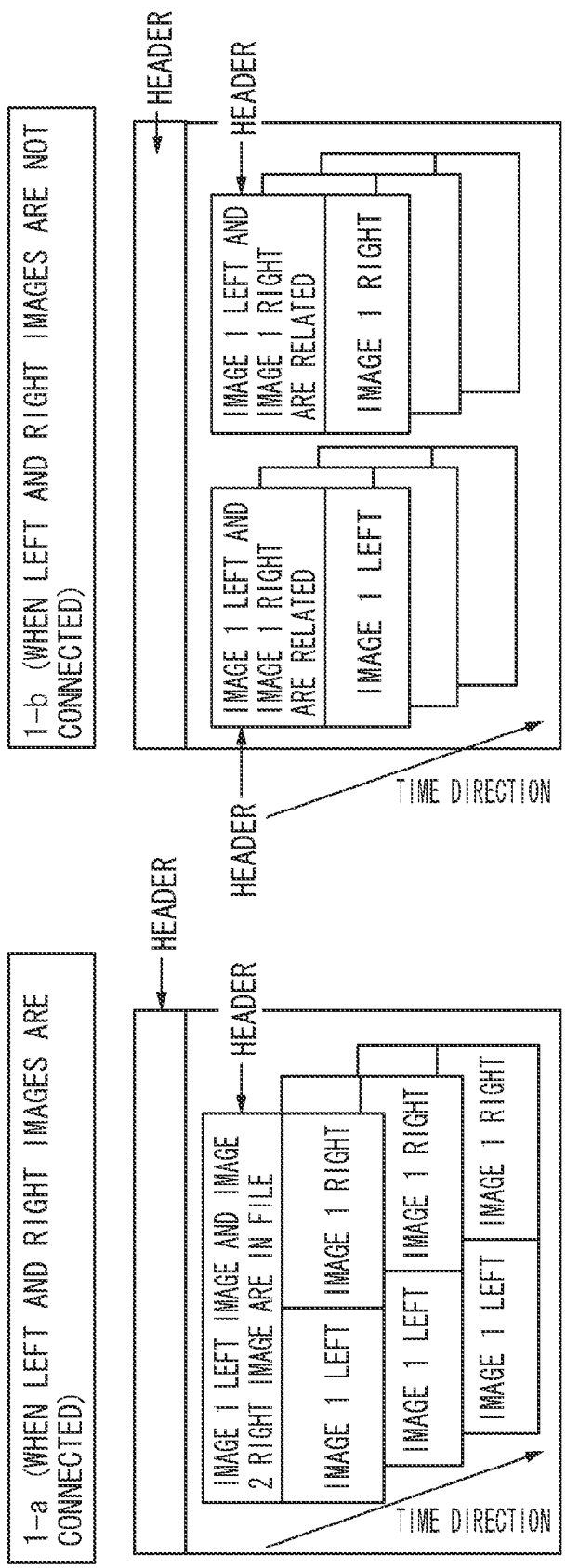
FIG. 26A is a diagram showing an example of the method of associating images and various information.

FIG. 26A and FIG. 26B show an example of a method of associating an image group with various information. FIG. 26A shows a mode of writing image-related information in the header of the frames, and FIG. 26B shows a mode of storing a file that stores the image-related information together in a storage folder of the image group or in another folder.

If the i-th image data at the same acquisition is connected as one image as in FIG. 26A, the image-related information (such as information indicating the viewpoint of each image in the file and frame numbers) is recorded in attached information (such as header and tag) of the file of the connected one image. If the i-th image data constituting the frames at the same acquisition is separately recorded, the image-related information related to all i-th image data corresponding to each acquisition time is stored in information indicating a set of the i-th image data corresponding to the same acquisition time and in attached information of units of recording (such as file and folder) including the entire set.

If the set (frames) of the i-th image data corresponding to the same acquisition time is stored together in one folder as in FIG. 26B, an image-related information file, such as a text file, is stored in the image storage folder. Although the related information file can be stored in another folder, it is desirable to store information indicating the relationship with the image storage folder in the related information file. Alternatively, the image-related information file may be stored in each of the folders separately storing the i-th viewpoint images constituting the frames. The specific methods of associating the images or associating the images with the image-related information are not limited to the illustrated methods.

In any case, each frame is associated with the acquisition time of frame or the alternative information (such as chronological order of acquisition of the frame, i.e. frame number).

As a result of the process, the image-related information indicating the viewpoint position of the i-th viewpoint images at the same acquisition constituting the frames is stored in association with the frames and the i-th viewpoint images. Therefore, reproduction of stereoscopic images and panoramic images as well as three-dimensional ranging can be easily performed based on the stored i-th images without confusion in the viewpoint position.

Ninth Embodiment

FIG. 27 shows a flow chart of a correction process executed by the imaging apparatus 10a or 10b according to a ninth embodiment. A program according to the ninth embodiment for causing the camera control unit 40a or 40b to execute the process is stored in the ROM 41. The process can be executed by the imaging apparatus 10a or 10b of FIG. 21.

ST1 to ST7 are the same as the seventh embodiment (FIG. 22).

In ST8, the camera control unit 40 receives, from the operation unit 17, a selection of whether to associate and store non-pixel area information, which specifies a non-pixel area without pixel information in the i-th image data, and the i-th image data. The process proceeds to ST9 if a selection for storage is received and proceeds to ST13 if a selection for storage is not received. For example, if the non-pixel area is a polygon, the non-pixel area information includes a number of the vertex of the polygon, coordinates, and a number (branch number) of the imaging unit 3 in which the number of pixels of such an area is the minimum.

In ST9, the camera control unit 40 calculates, for each imaging unit 3, the total number of pixels of the non-pixel area without pixel information. An example of the non-pixel area is similar to the complement target areas BL-1 and BL-2 of FIG. 11.

In ST10, the camera control unit 40 controls the association processing unit 59 to associate the i-th image data with the non-pixel area information and store the data in the recording medium 20.

ST11, ST12, and ST13 to ST15 are the same as ST12, ST13, and ST14 to ST16 of the seventh embodiment, respectively.

FIG. 28A and FIG. 28B show an example of a method of associating images with various information. FIG. 28A shows a mode of writing non-pixel area information in the header of frames, and FIG. 28B shows a mode of storing a file that stores the non-pixel area information together in a storage folder of moving images or in another folder.

If the i-th viewpoint images at the same acquisition is connected as one image as in FIG. 28A, the non-pixel area information is recorded in attached information (such as header and tag) of the file of the connected one image. If the i-th viewpoint images constituting the frames at the same acquisition are recorded in separate files, the non-pixel area information related to all i-th viewpoint images corresponding to each acquisition time is stored in attached information of units of recording (such as file and folder) including the entire set of the i-th viewpoint images corresponding to the same acquisition time.

If the set (frames) of i-th image data corresponding to the same acquisition time is stored together in one folder as in FIG. 28B, a non-pixel area information file, such as a text file, is stored in the image storage folder. Although the non-pixel area information file can be stored in another folder, it is desirable to store information indicating the relationship with the image storage folder in the related information file. Alternatively, the non-pixel area information file may be stored in each of the folders separately storing the i-th image data constituting the frames. The specific methods of associating the i-th image data and the image-related information are not limited to the illustrated methods.

The camera control unit 40 can paint the area in a predetermined color based on the related information of the non-pixel area information and the i-th image data stored in the recording medium 20 in the above process and display a stereoscopic image or a panoramic image. Alternatively, the camera control unit 40 can select i-th image data with the minimum area based on the non-pixel area information stored in the recording medium 20 in the above process and display the selected i-th image data as a plane image in the best quality.

Tenth Embodiment

Figure 29A:
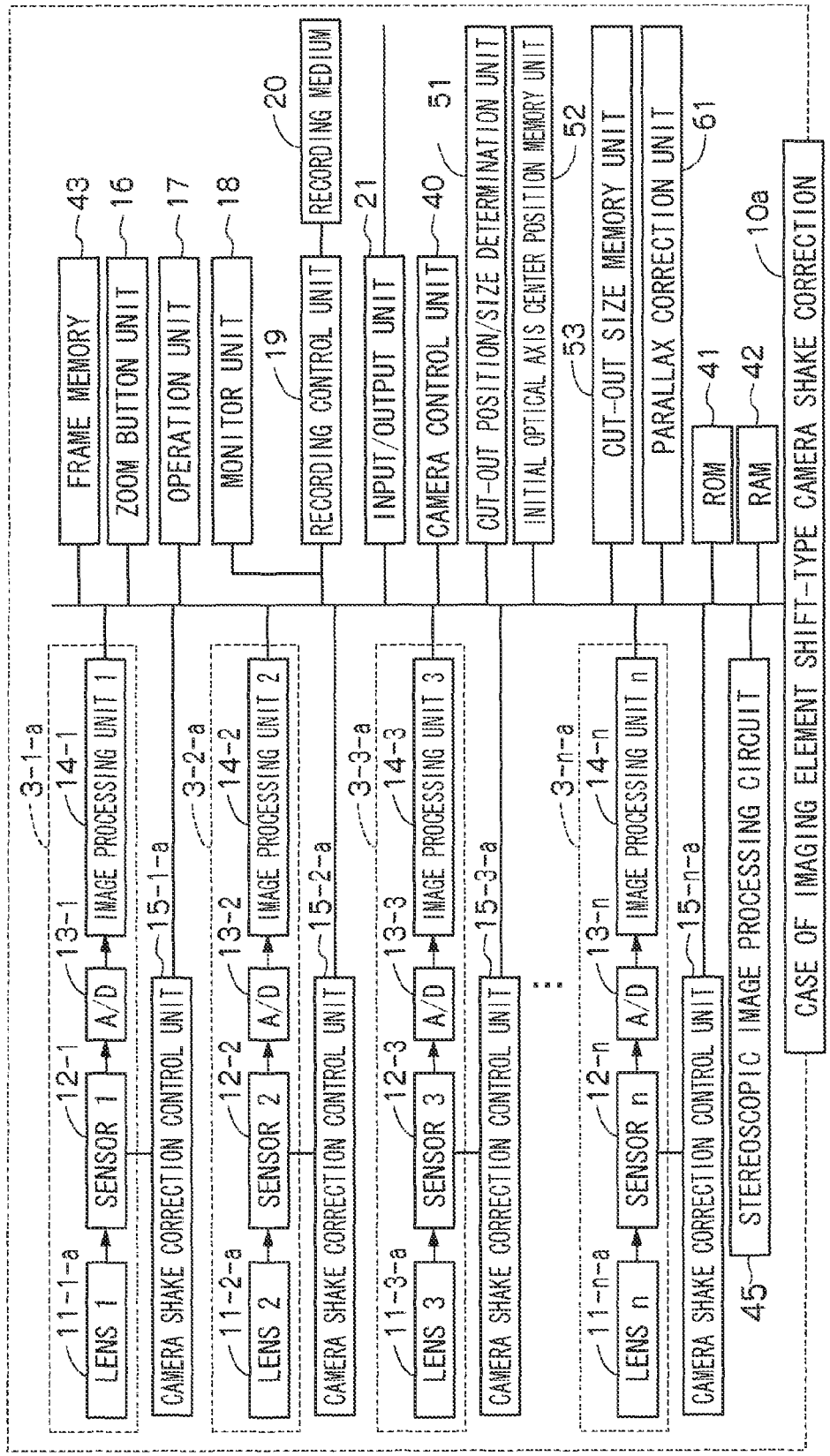
FIG. 29A is a block diagram of the imaging apparatus according to a tenth embodiment.
Figure 29B:
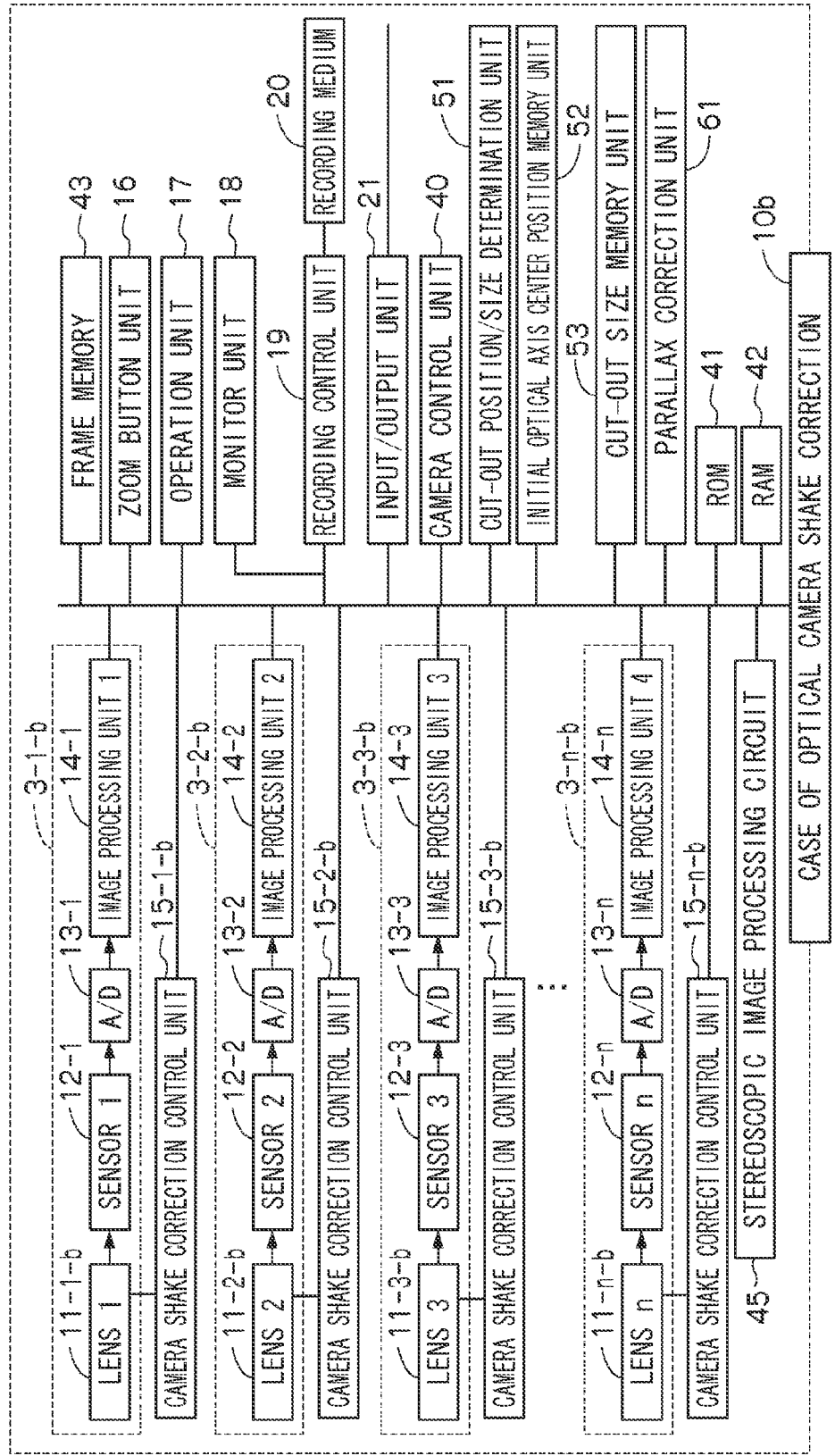
FIG. 29B is a block diagram of the imaging apparatus according to the tenth embodiment.

FIG. 29A shows a schematic block diagram of the imaging apparatus 10a including an imaging element shift-type camera shake correction control unit according to a tenth embodiment of the present invention, and FIG. 29B shows a schematic block diagram of the imaging apparatus 10b including an optical camera shake correction control unit according to the eighth embodiment of the present invention. Blocks with the same functions between the imaging apparatuses 10a/10b of FIGS. 29A and 29B or in the described embodiments are designated with the same reference numerals except for the branch numbers.

The imaging apparatuses 10a/10b include the parallax correction units 61 constituted by arithmetic apparatuses such as CPUs.

Figure 30:
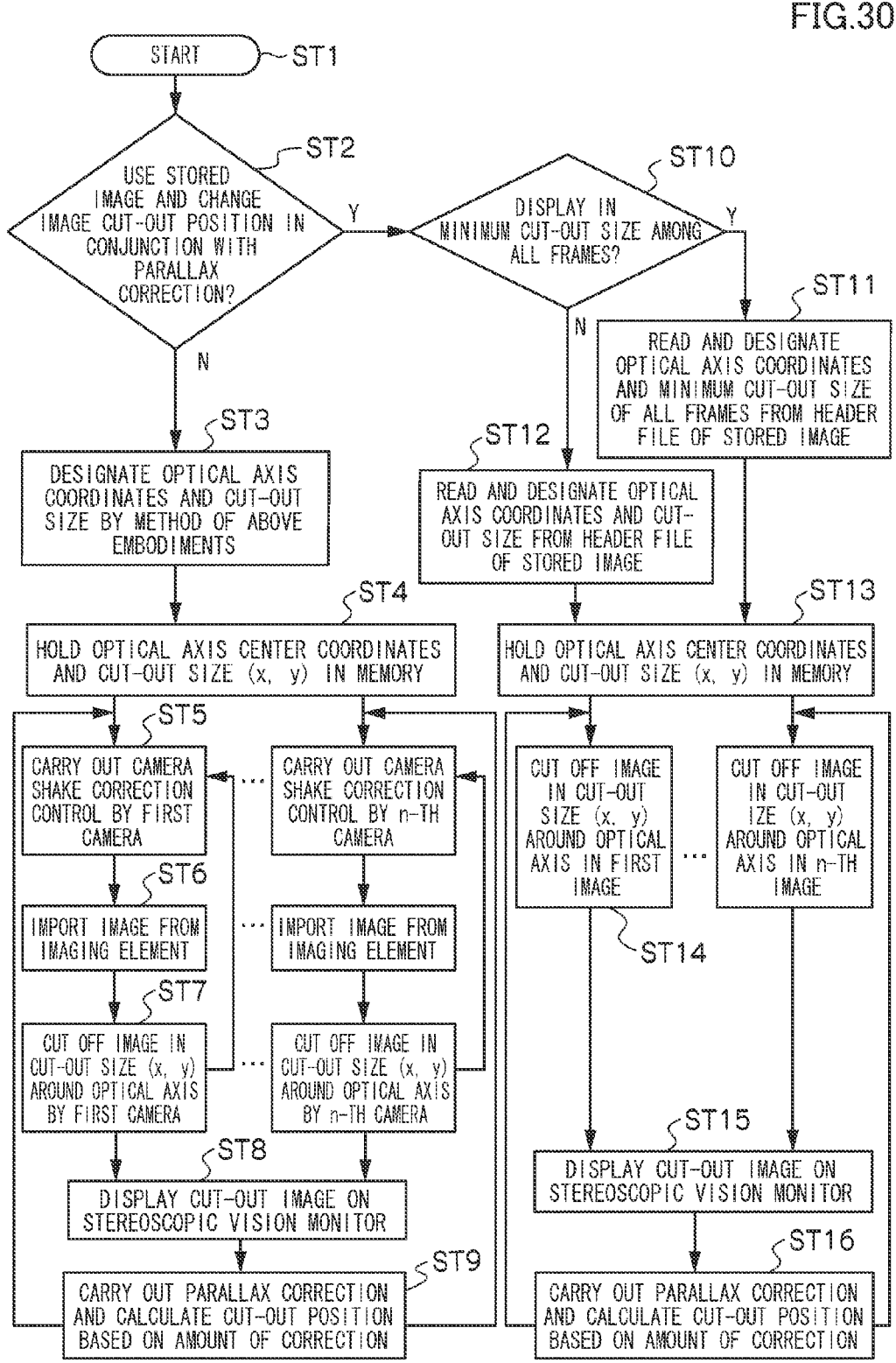
FIG. 30 is a flow chart of a process according to the tenth embodiment.

FIG. 30 shows a flow chart of a correction process executed by the imaging apparatus 10a or 10b according to the tenth embodiment. A program according to the tenth embodiment for causing the camera control unit 40a or 40b to execute the process is stored in the ROM 41.

Figure 31:
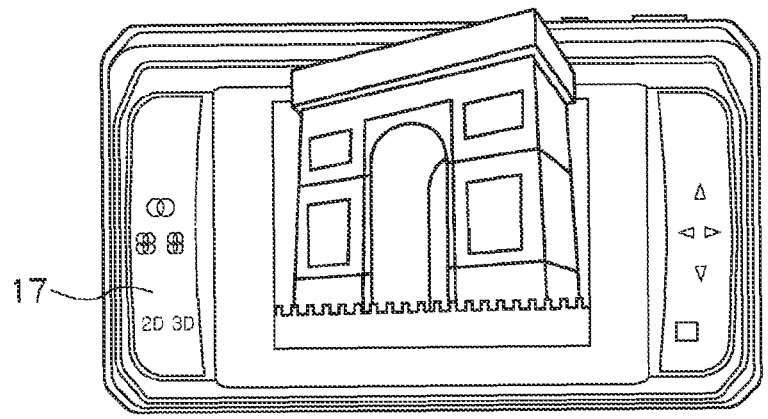
FIG. 31 is a diagram showing an example of a parallax correction button.

In ST1, the camera control unit 40 proceeds to ST2 in response to an instruction of the start of parallax adjustment from the operation unit 17. For example, a "parallax correction button" is provided as the operation unit 17 as shown in FIG. 31, and the process proceeds to ST2 in response to pressing of the button.

In ST2, the camera control unit 40 receives, from the operation unit 17, an instruction of whether to use the i-th image data (including the data stored in the above described embodiments) recorded in the recording medium 20 to change the image cut-out position in conjunction with the parallax correction. The process proceeds to ST10 if the instruction is received and proceeds to ST3 if the instruction is not received.

ST3 to ST7 are the same as ST2 to ST6 of the ninth embodiment (FIG. 27).

Figure 32A:
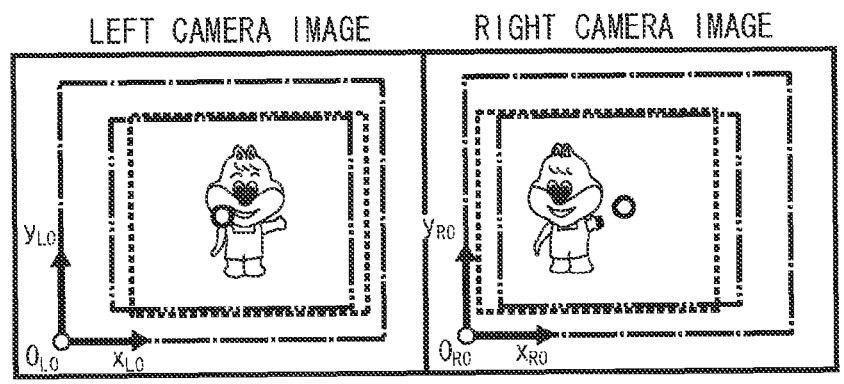
FIG. 32A is a diagram schematically showing parallax correction of a stereoscopic image.

In ST8, the cut-out positions of the i-th viewpoint images after the parallax correction from the i-th viewpoint images are determined so that the parallax amount between the i-th viewpoint images cut out in ST7 becomes a predetermined parallax amount stored in the ROM 41. The camera control unit 40 cuts out the i-th viewpoint images from the determined cut-out positions of the i-th image data (see FIG. 32A).

Figure 32B:
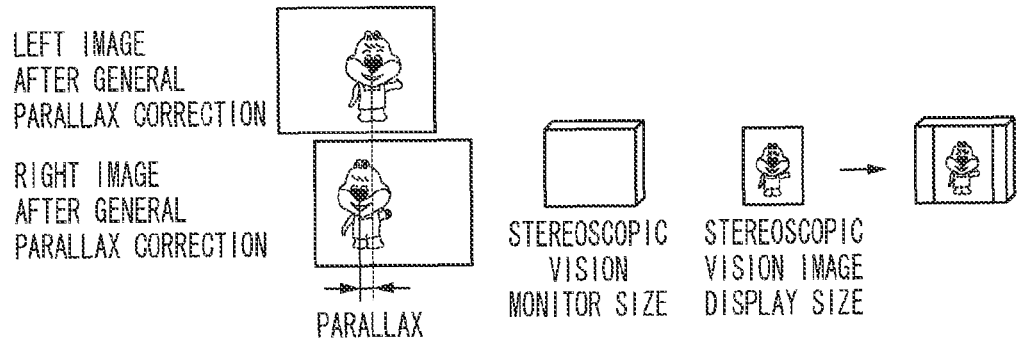
FIG. 32B is another diagram schematically showing parallax correction of a stereoscopic image.

In ST9, the camera control unit 40 outputs the cut out i-th viewpoint images to the monitor unit 18. As a result, a stereoscopic image adjusted to the predetermined parallax amount is displayed on the monitor unit 18. However, the size of the stereoscopic image may decrease as a result of the parallax adjustment (see FIG. 32B).

In ST10, the camera control unit 40 receives, from the operation unit 17, an instruction of whether to display the image by the minimum cut-out size among all frames. The process proceeds to ST11 if the instruction is received and proceeds to ST12 if the instruction is not received.

In ST11, the camera control unit 40 reads out the optical axis center coordinates and the minimum cut-out size (including the size stored in ST10 of the seventh embodiment) from the attached information or the like of the image file of the recording medium 20.

In ST12, the camera control unit 40 reads out the optical axis center coordinates and the cut-out size (including the size calculated in ST8 or 8.1 of the first embodiment) from the attached information or the like of the image file of the recording medium 20.

In ST13, the camera control unit 40 stores the optical axis center coordinates and the cut-out size read out in ST11 or ST12 in the cut-out size memory unit 53.

In ST14, the camera control unit 40 cuts out a rectangular area with the center position and the size stored in the cut-out size memory unit 53 from each of the first to n-th image data after the vibration correction to obtain the first to n-th viewpoint images.

Figure 32C:
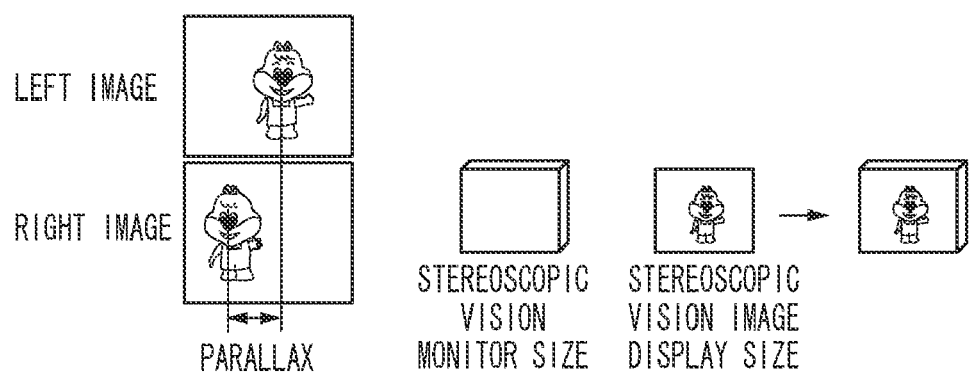
FIG. 32C is another diagram schematically showing parallax correction of a stereoscopic image.

In ST15, the camera control unit 40 outputs the cut out i-th viewpoint images on the monitor unit 18 (see FIG. 32C). The i-th viewpoint images are displayed in the minimum size if the images are cut out in the minimum cut-out size stored in ST10 of the seventh embodiment, and a change in the angle of view can be prevented even if the camera shake correction is operated. For example, the amount of camera shake correction always changes when movie imaging is performed for still images, and the angle of view changes as if digital zooming is repeated. However, the angle of view does not change if the images are always displayed in the minimum size.

In ST16, the camera control unit 40 controls the parallax correction unit 61 to execute the parallax correction. In response to the instruction of the start of the parallax correction from the camera control unit 40, the parallax correction unit 61 determines the cut-out position of the i-th viewpoint images from the i-th image data so that the parallax between the i-th viewpoint images becomes the predetermined parallax amount stored in the ROM 41 while maintaining the cut-out size in the x and y direction of the i-th viewpoint images held in the RAM 42 in ST13.

Figure 32D:
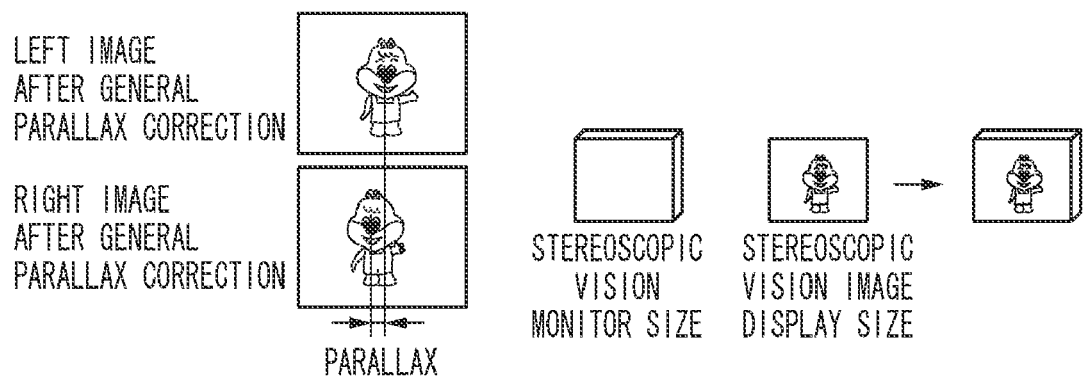
FIG. 32D is another diagram schematically showing parallax correction of a stereoscopic image.

The camera control unit 40 cuts out the i-th viewpoint images after the parallax adjustment from the determined cut-out position of the i-th image data (see FIG. 32D). The camera control unit 40 outputs the cut out i-th viewpoint images after the parallax adjustment on the monitor unit 18. As a result, a stereoscopic image adjusted to the predetermined parallax amount is displayed on the monitor unit 18 while the size of the image is maintained.

The stereoscopic vision range is usually narrowed down after the parallax correction of the stereoscopic image as in 32B. However, in the present process, narrowing down of the stereoscopic vision range can be prevented by associating the cut-out range of each i-th viewpoint image with the parallax correction as in FIG. 32D.

Eleventh Embodiment

Figure 33A:
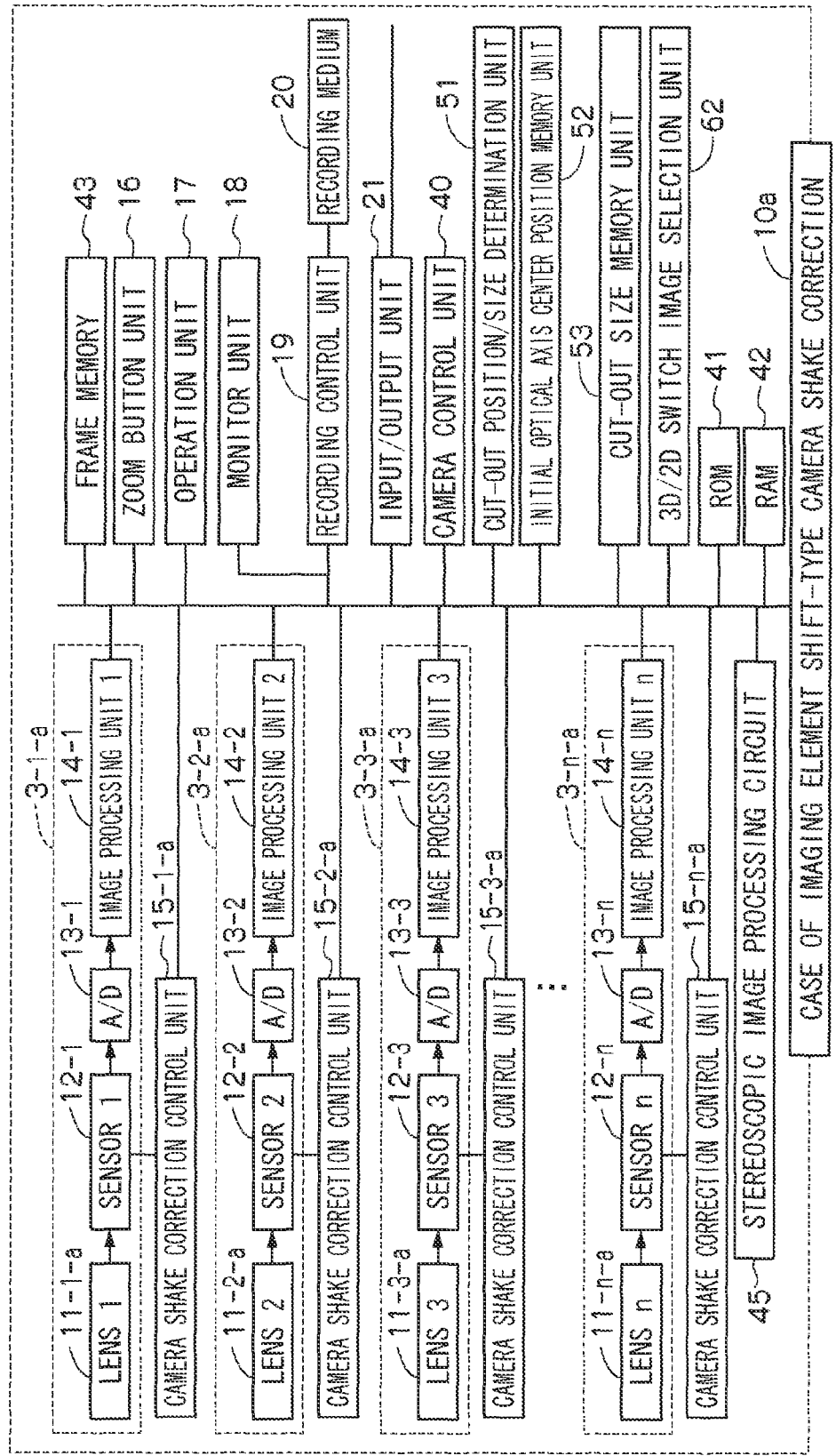
FIG. 33A is a block diagram of the imaging apparatus according to an eleventh embodiment.
Figure 33B:
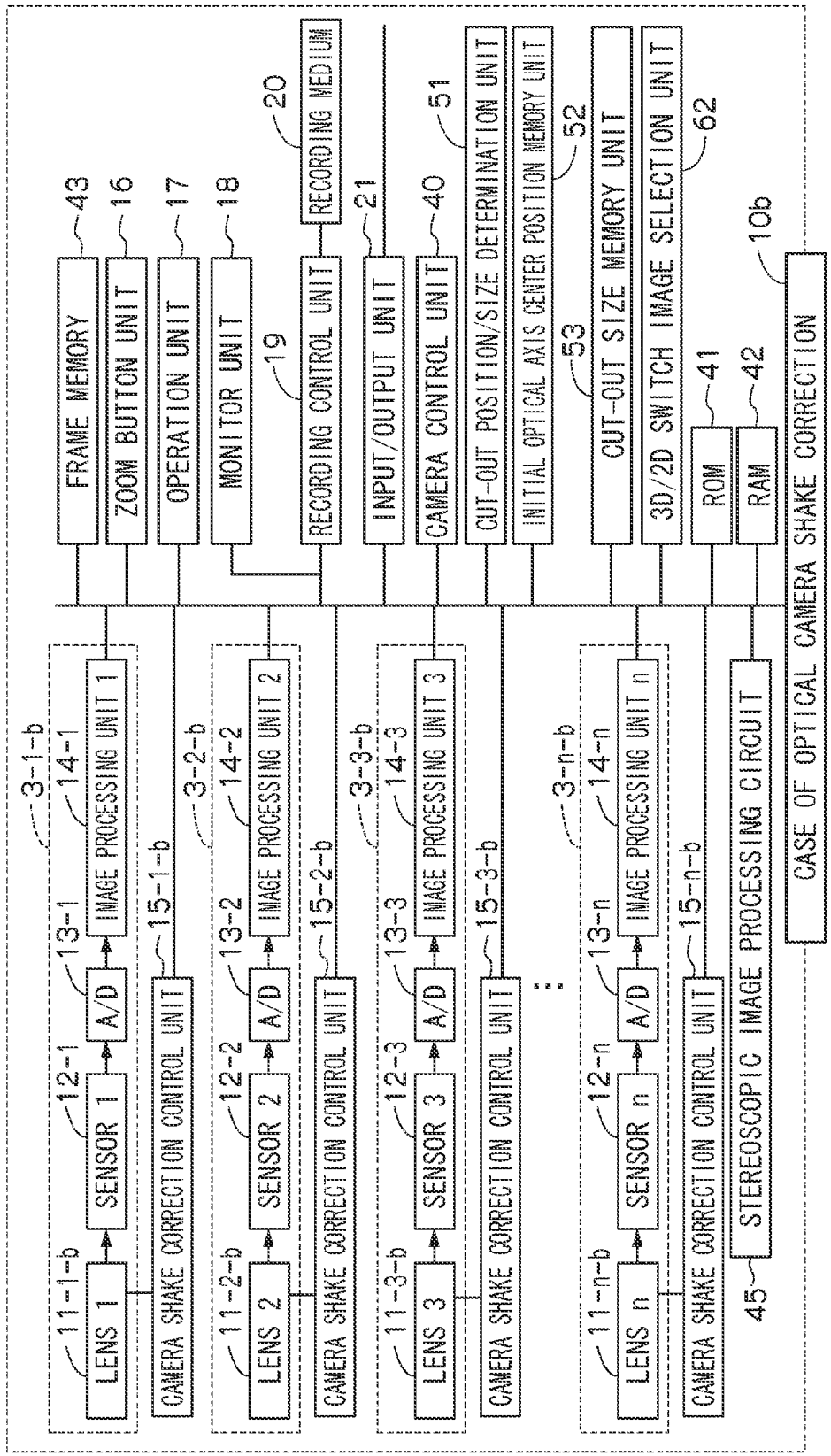
FIG. 33B is another block diagram of the imaging apparatus according to the eleventh embodiment.

FIG. 33A shows a schematic block diagram of the imaging apparatus 10a including an imaging element shift-type camera shake correction control unit according to an eleventh embodiment of the present invention, and FIG. 33B shows a schematic block diagram of the imaging apparatus 10b including an optical camera shake correction control unit according to the eleventh embodiment of the present invention. Blocks with the same functions between the imaging apparatuses 10a/10b of FIGS. 33A and 33B or in the described embodiments are designated with the same reference numerals except for the branch numbers.

The imaging apparatuses 10a/10b include 3D/2D switch image selection units 62 constituted by user interfaces.

FIG. 34 shows a flow chart of a process executed by the imaging apparatus 10a or 10b according to the eleventh embodiment. A program according to the eleventh embodiment for causing the camera control unit 40a or 40b to execute the process is stored in the ROM 41. The process can be executed by the imaging apparatus 10a or 10b of FIG. 21.

In ST1, the camera control unit 40 proceeds to ST2 in response to the reception of the start of a display operation from the operation unit 17.

Figure 35A:
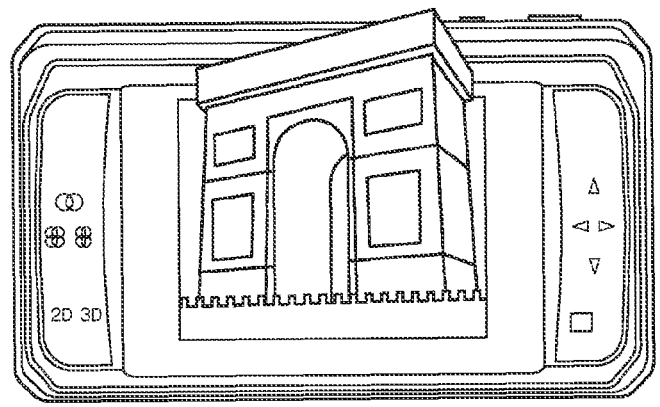
FIG. 35A is a diagram showing an example of display of a 3D image.
Figure 35B:
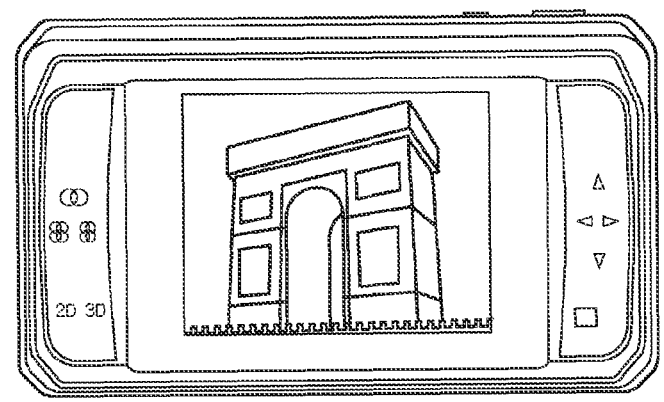
FIG. 35B is a diagram showing an example of display of a 2D image.

In ST2, the camera control unit 40 receives, from the operation unit 17, an instruction of whether to use the i-th image data (including the data stored in the already described embodiments) recorded in the recording medium 20 to display a stereoscopic image (3D image) and a plane image (2D image). The process proceeds to ST15 if the instruction is received and proceeds to ST3 if the instruction is not instructed. FIG. 35A schematically shows the display of the 3D image, and FIG. 35B schematically shows the display of the 2D image.

ST3 to ST8 are the same as the tenth embodiment (FIG. 30).

In ST9, the camera control unit 40 determines whether the 2D display is instructed from the 3D/2D switch image selection unit 62. If YES, the process proceeds to ST10, and if NO, the process returns to ST5.

In ST10, the camera control unit 40 carries out the camera shake correction of the image data from a p-th imaging unit 3, such as the first imaging unit 3, corresponding to a desired number p stored in the ROM 41 among the images obtained from the i-th imaging units 3 as a result of ST5 to ST7.

In ST11, the camera control unit 40 acquires the image data after the camera shake correction in ST10.

In ST12, the camera control unit 40 cuts out a 2D image, which is an area determined by the optical axis center stored in ST4 and the cut-out size, from the acquired image data.

Figure 36A:
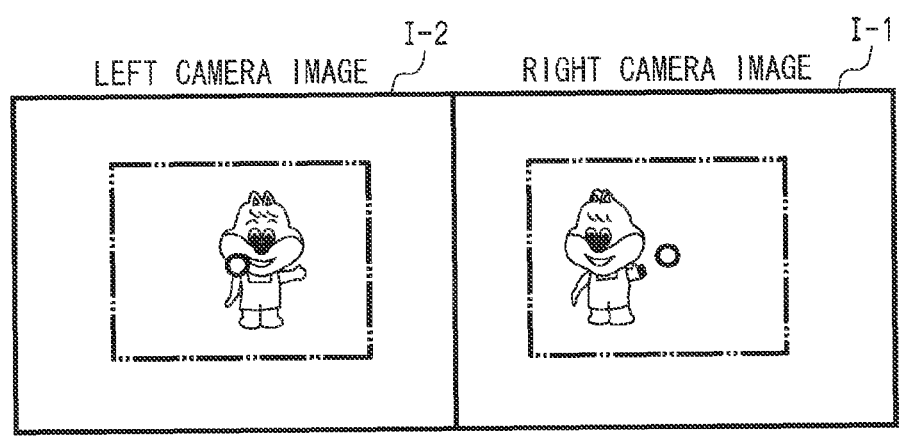
FIG. 36A is a diagram showing an example of display of viewpoint images.
Figure 36B:
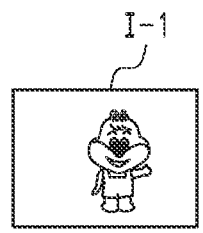
FIG. 36B is a diagram showing an example of display of a 2D image.

In ST13, the camera control unit 40 outputs the 2D image cut out in ST12 to the monitor unit 18. FIG. 36A shows an example of display of a first viewpoint image I-1 and a second viewpoint image I-2 constituting the 3D image when n=2, and FIG. 36B shows an example of display of a 2D image I-1 when P=1.

The process may return to ST9, and 3D/2D images may be displayed based on other images acquired from the i-th imaging units 3.

ST14 to ST19 are the same as ST10 to 15 of the tenth embodiment (FIG. 30).

In ST20, the same determination as in ST9 is performed. If YES, the process proceeds to ST21, and if NO, the process returns to ST19.

ST21 and 22 are the same as ST12 and 13. The process may return to ST20, and 3D/2D images may be displayed based on other recorded images.

If the p-th image data after the camera shake correction is displayed as it is as a 2D image, there is a change in the angle of view during the switch from the 3D image to the 2D image. However, in the present process, the p-th viewpoint image cut out around the initial optical axis position from the p-th image data after the camera shake correction is displayed as the 2D image. Therefore, since the displacement of the optical axis between the 3D image and the 2D image caused by the camera shake correction is prevented, there is a little change in the angle of view during the switch from the 3D image to the 2D image after the camera shake correction, and the viewability improves.

Twelfth Embodiment

Figure 37A:
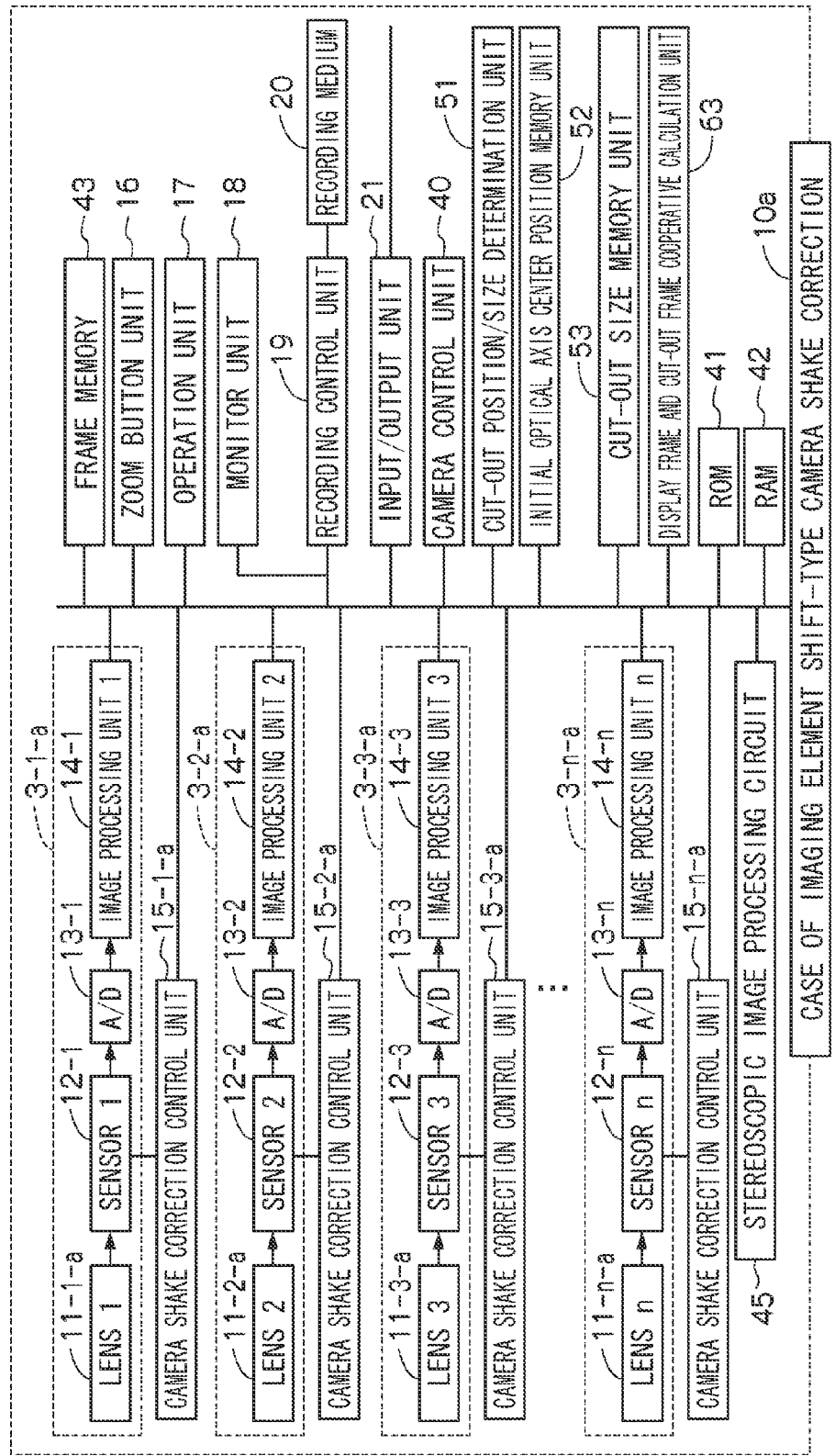
FIG. 37A is a block diagram of the imaging apparatus according to a twelfth embodiment.
Figure 37B:
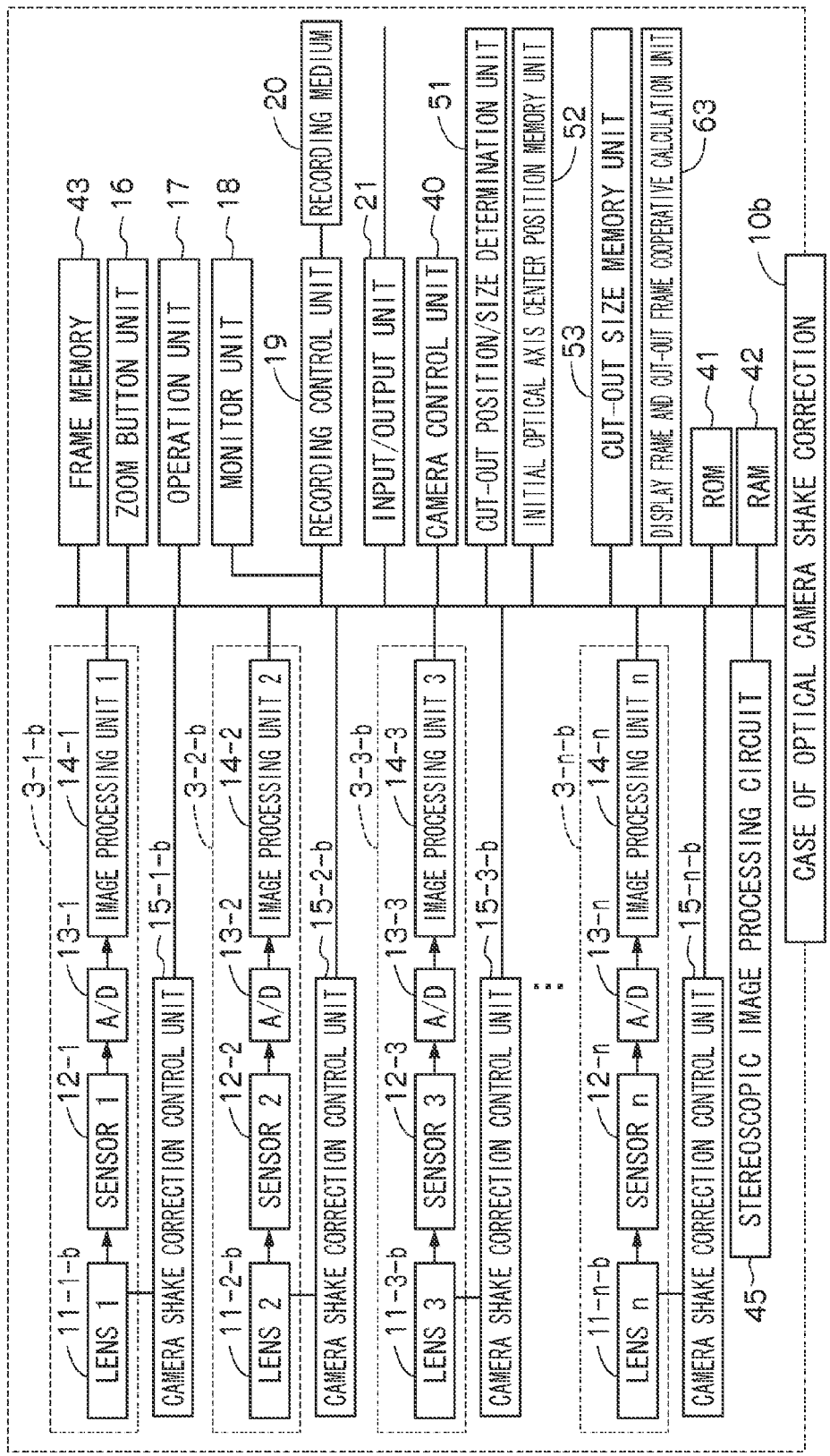
FIG. 37B is another block diagram of the imaging apparatus according to the twelfth embodiment.

FIG. 37A shows a schematic block diagram of the imaging apparatus 10a including an imaging element shift-type camera shake correction control unit according to a twelfth embodiment of the present invention, and FIG. 37B shows a schematic block diagram of the imaging apparatus 10b including an optical camera shake correction control unit according to the twelfth embodiment of the present invention. Blocks with the same functions between the imaging apparatuses 10a/10b of FIGS. 37A and 37B or in the described embodiments are designated with the same reference numerals except for the branch numbers.

The imaging apparatuses 10a/b include display frame and cut-out frame cooperative calculation units 63 constituted by CPUs or the like.

Figure 38:
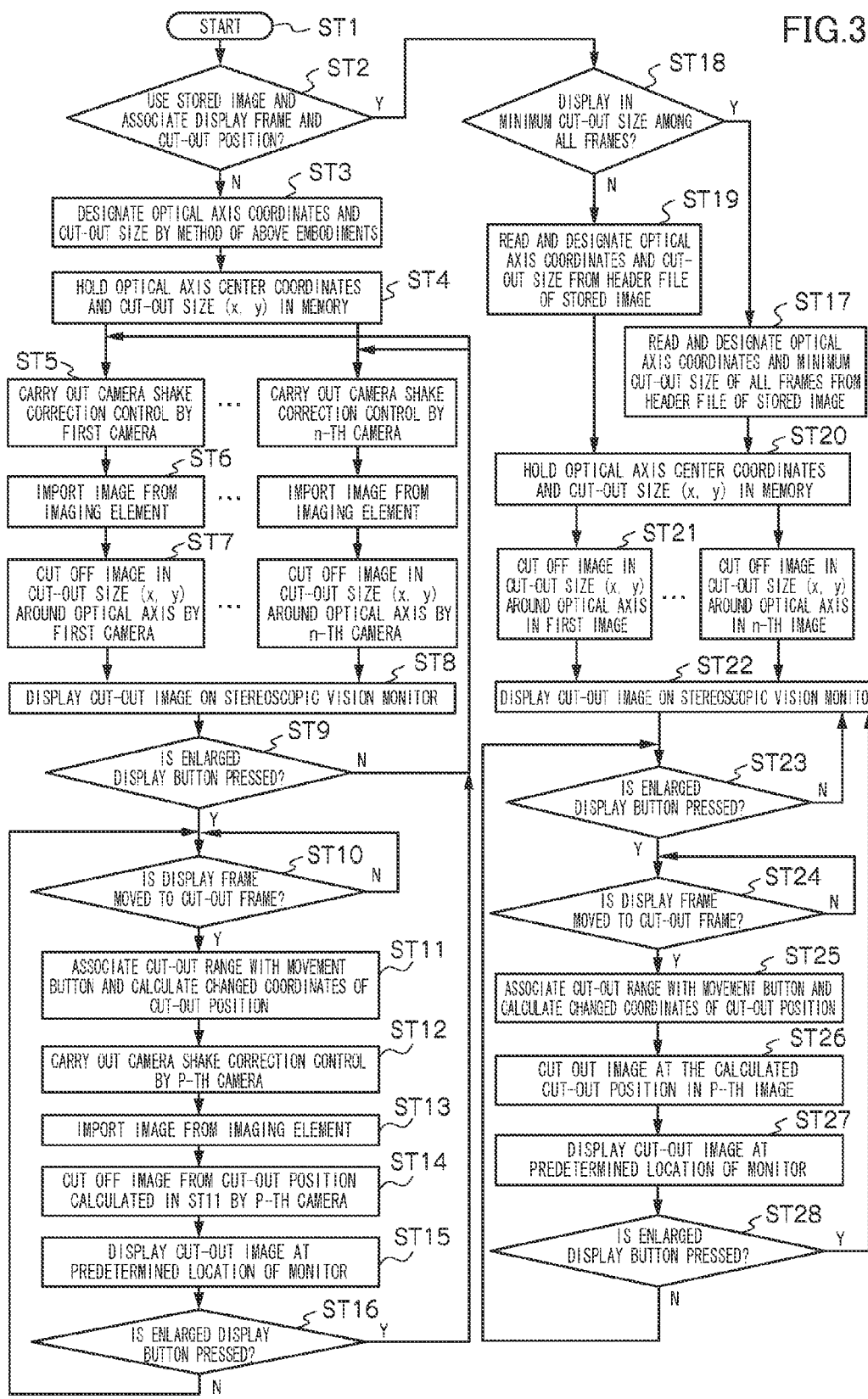
FIG. 38 is a flow chart of a process according to the twelfth embodiment.

FIG. 38 shows a flow chart of a correction process executed by the imaging apparatus 10a or 10b according to the twelfth embodiment. A program according to the twelfth embodiment for causing the camera control unit 40a or 40b to execute the process is stored in the ROM 41.

In ST1, the camera control unit 40 proceeds to ST2 in response to the reception of the start of a display operation from the operation unit 17.

In ST2, the camera control unit 40 receives, from the operation unit 17, an instruction of whether to use the i-th image data (including the data stored in the above described embodiments) recorded in the recording medium 20 to display a stereoscopic image and to cut out, enlarge, and display a part designated in a display frame in the stereoscopic image. The process proceeds to ST18 if the instruction is received and proceeds to ST3 if the instruction is not received.

ST3 to ST8 are the same as the eleventh embodiment (FIG. 34).

In ST9, the camera control unit 40 receives an instruction for starting enlarged display of a part of the area of the 3D image from an enlarged display button arranged on the operation unit 17. The process proceeds to ST10 if the instruction is received and returns to ST5 if the instruction is not received.

In ST10, the camera control unit 40 receives a designation of an enlargement area, which is an area to be enlarged and displayed in the 3D image, through a cut-out frame designation button arranged on the operation unit 17. The camera control unit 40 determines whether the designated enlargement area reaches a periphery of the 3D image, in other words, a borderline of the cut-out area of the i-th viewpoint image from the i-th image data. If YES, the process proceeds to ST11, and if NO, the designation of the enlargement area and the determination are repeated.

In ST11, the camera control unit 40 controls the display frame and cut-out frame cooperative calculation unit 63 to calculate the cut-out position of the enlargement area from the p-th image data based on the position of the designated enlargement area.

In ST12, the camera control unit 40 carries out the camera shake correction for a p-th viewpoint image obtained from a desired p-th imaging unit 3, for example an n-th viewpoint image from an n-th imaging unit 3, among the i-th imaging units 3 as a result of ST5 to 7.

In ST13, the camera control unit 40 acquires the image data after the camera shake correction in ST12.

In ST14, the camera control unit 40 cuts out the enlargement area determined in ST11 from the acquired image data.

In ST15, the camera control unit 40 outputs the enlargement area cut out in ST14 to a predetermined position of the monitor unit 18.

In ST16, the same determination as in ST9 is performed. If YES, the process returns to ST5, and if NO, the process returns to ST10.

ST17 to ST22 are the same as ST14 to ST19 of the eleventh embodiment.

ST23 to ST28 are the same as ST9 to ST16. However, the image as the cut-out source of the enlargement area here is the p-th viewpoint image reproduced from the recording medium 20.

Figure 39A:
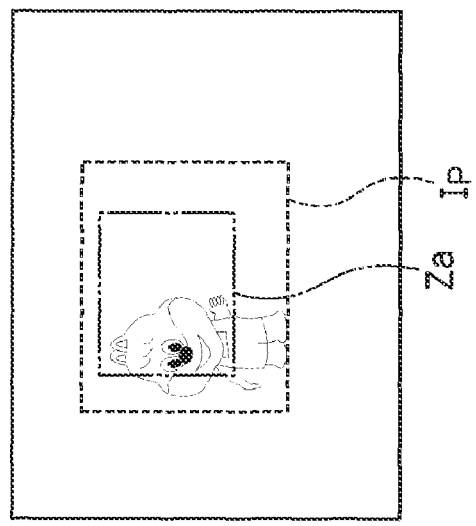
FIG. 39A is a diagram showing an example of a cut-out position of an enlargement area.
Figure 39B:
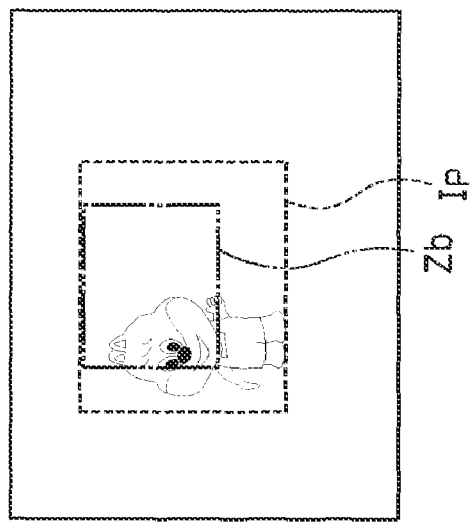
FIG. 39B is another diagram showing an example of a cut-out position of an enlargement area.
Figure 39C:
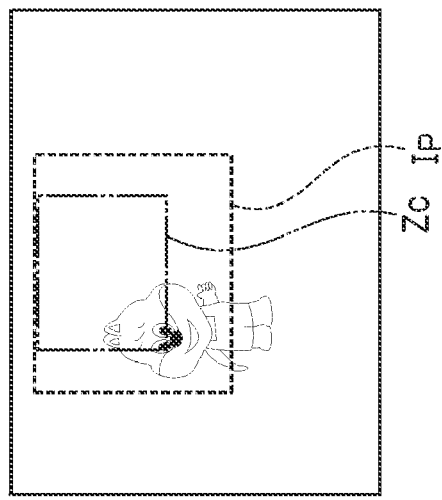
FIG. 39C is another diagram showing an example of a cut-out position of an enlargement area.
Figure 40A:
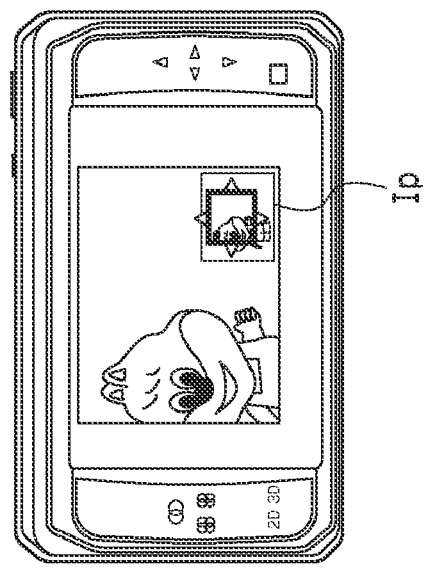
FIG. 40A is a diagram showing an example of display of an enlargement area.
Figure 40B:
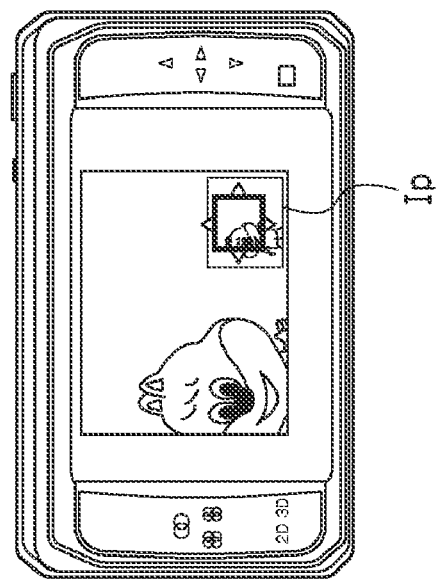
FIG. 40B is another diagram showing an example of display of an enlargement area.
Figure 40C:
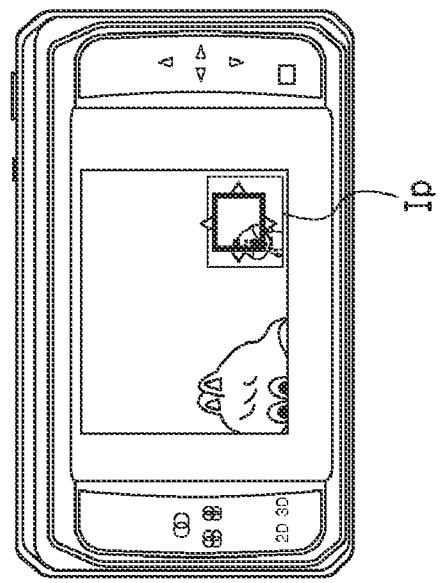
FIG. 40C is another diagram showing an example of display of an enlargement area.

FIGS. 39A to 39C show an example of cut-out positions Za to Zc of the arbitrarily designated enlargement area, and FIGS. 40A to 40C show an example of display of the enlargement area corresponding to FIGS. 39A to 39C, respectively. Reference character Ip designates the p-th image data.

As a result of the process, an arbitrary part of the area in the viewpoint image after the camera shake correction can be enlarged and displayed. Even if the designated position of the enlargement area extends beyond the viewpoint image, an image equivalent to the enlargement area is cut out from the p-th image data. Therefore, there is no loss of image in the enlargement area.

Thirteenth Embodiment

Figure 41A:
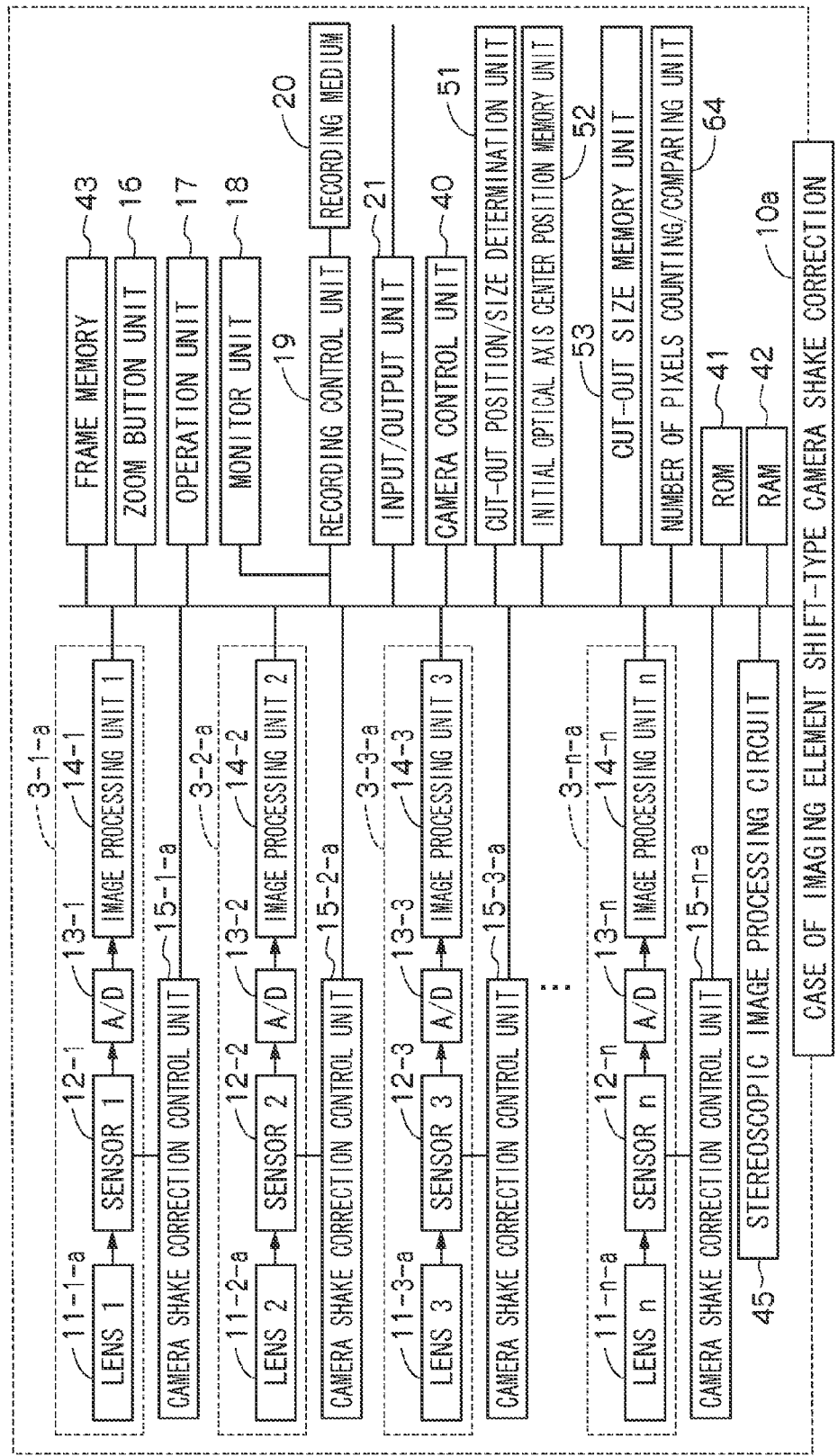
FIG. 41A is a block diagram of the imaging apparatus according to a thirteenth embodiment.
Figure 41B:
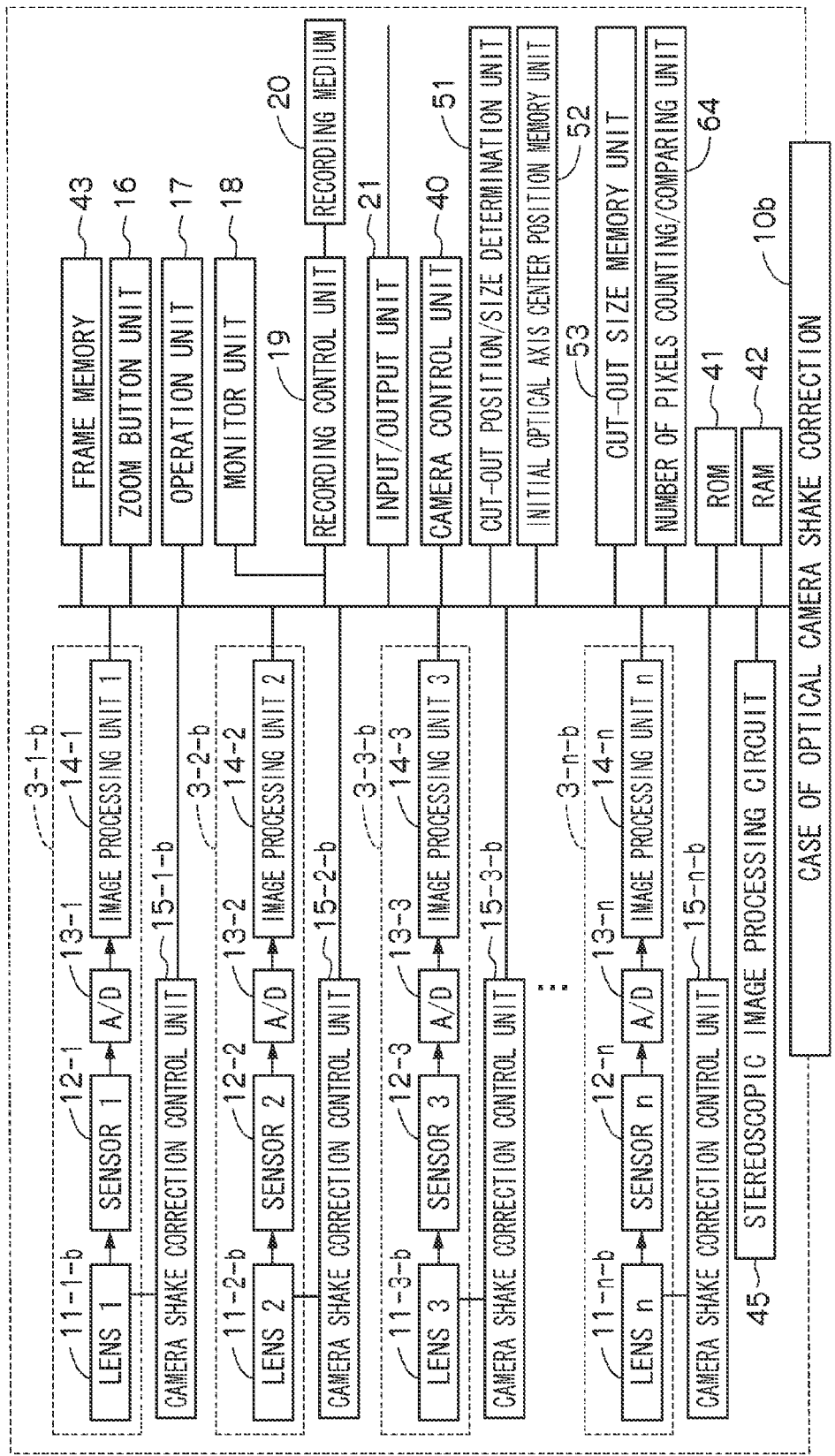
FIG. 41B is another block diagram of the imaging apparatus according to the thirteenth embodiment.

FIG. 41A shows a schematic block diagram of the imaging apparatus 10a including an imaging element shift-type camera shake correction control unit according to a thirteenth embodiment of the present invention, and FIG. 41B shows a schematic block diagram of the imaging apparatus 10b including an optical camera shake correction control unit according to the thirteenth embodiment of the present invention. Blocks with the same functions between the imaging apparatuses 10a/10b of FIGS. 41A and 41B or in the described embodiments are designated with the same reference numerals except for the branch numbers.

The imaging apparatuses 10a/10b include number of pixels counting/comparing units 64 constituted by CPUs or the like. The number of pixels counting/comparing units 64 and the complement target area calculation units 70 may be shared.

Figure 42:
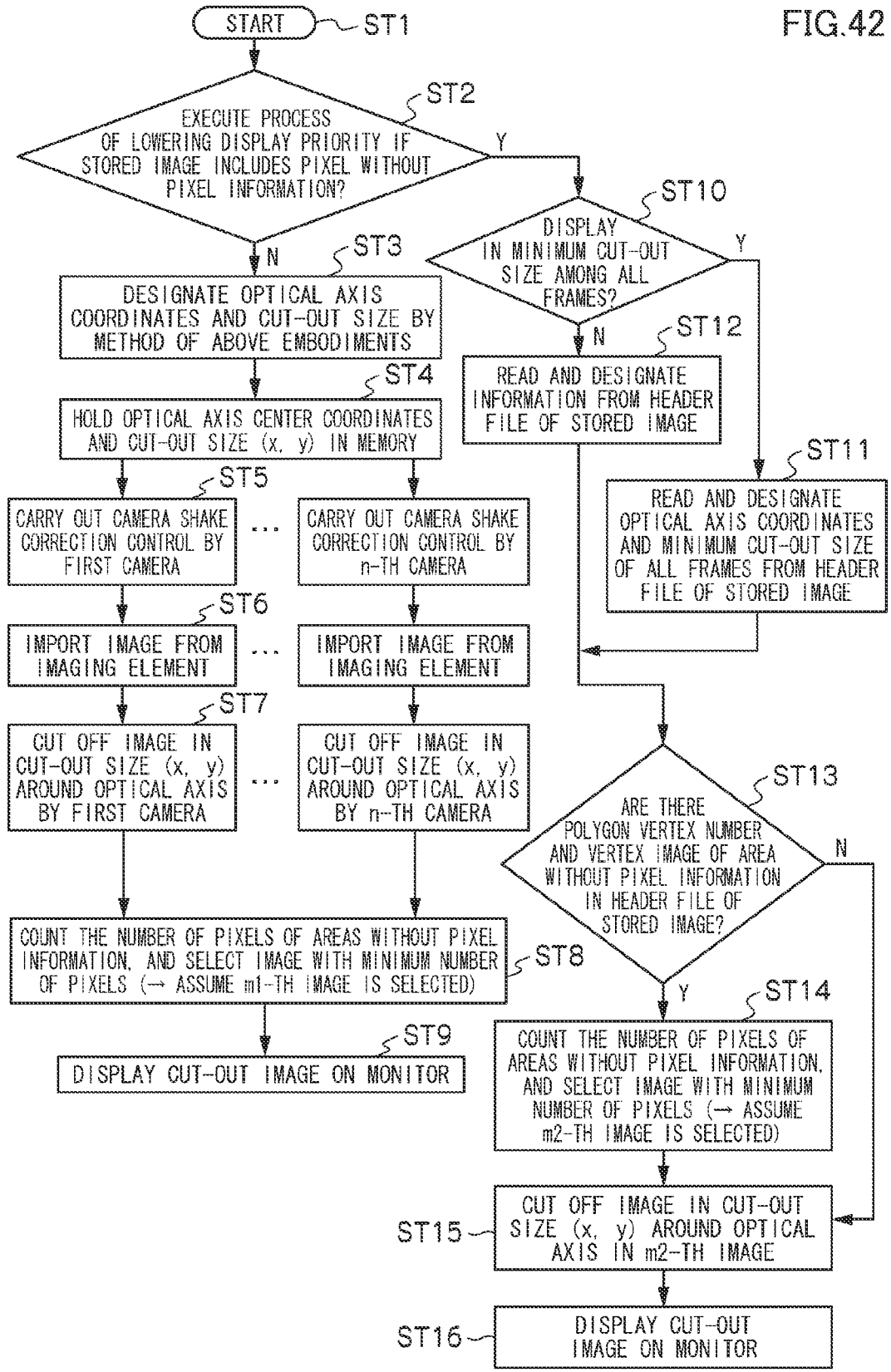
FIG. 42 is a flow chart of a process according to the thirteenth embodiment.

FIG. 42 shows a flow chart of a correction process executed by the imaging apparatus 10a or 10b according to the thirteenth embodiment. A program according to the thirteenth embodiment for causing the camera control unit 40a or 40b to execute the process is stored in the ROM 41.

In ST1, the camera control unit 40 proceeds to ST2 in response to the reception of the start of a display operation from the operation unit 17.

In ST2, the camera control unit 40 receives, from the operation unit 17, an instruction of whether to lower the display priority of an i-th image viewpoint image if the i-th viewpoint image recorded in the recording medium 20 includes a non-pixel area (or complement target area) without pixel information. The process proceeds to ST11 if the instruction is received and proceeds to ST3 if the instruction is not received.

ST3 to 7 are the same as in the twelfth embodiment (FIG. 38).

In ST8, the camera control unit 40 controls the number of pixels counting/comparing unit 64 to calculate a non-pixel area, which is an area without pixel information, and the number of pixels, for each of the first to n-th viewpoint images acquired in S6. The camera control unit 40 also controls the number of pixel counting/comparing unit 64 to select an m1-*th* viewpoint image, which is a viewpoint image with the minimum number of pixels in the complement target area, among the first to n-th viewpoint images.

In ST9, the camera control unit 40 outputs the m1-*th* viewpoint image selected in ST8 to the monitor unit 18 as a 2D image.

ST10 to ST12 are similar to the twelfth embodiment. However, in ST12, if the non-pixel area (or complement target area) described in the ninth embodiment is stored in the recording medium 20, the non-pixel area is also read.

In ST13, the camera control unit 40 determines whether various information read from the recording medium 20 in S10 or S12 includes non-pixel area information. If Yes, the process proceeds to ST14, and if NO, the process proceeds to ST15.

In ST14, the camera control unit 40 controls the number of pixels counting/comparing unit 64 to select m2-*th* image data, which is image data with the minimum number of pixels in the non-pixel area (or complement target area) among the first to n-th viewpoint images based on the non-pixel area information of the first to n-th viewpoint images.

In ST15, the camera control unit 40 cuts out an m2-*th* viewpoint image from the m2-*th* image data based on the optical axis center coordinates and the cut-out size read out in ST10 or 12.

In ST16, the camera control unit 40 outputs the cut out m2-*th* viewpoint image to the monitor unit 18 as a 2D image.

Figure 43A:
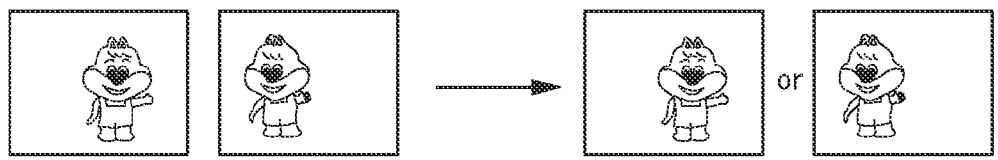
FIG. 43A is a diagram showing another example of image data with the minimum number of pixels in a complement target area.
Figure 43B:
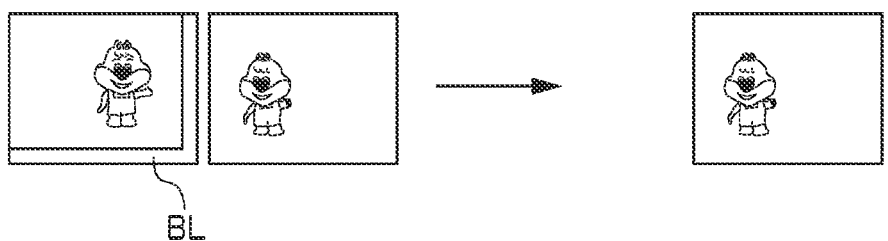
FIG. 43B is a diagram showing another example of image data with the minimum number of pixels in a complement target area.
Figure 43C:
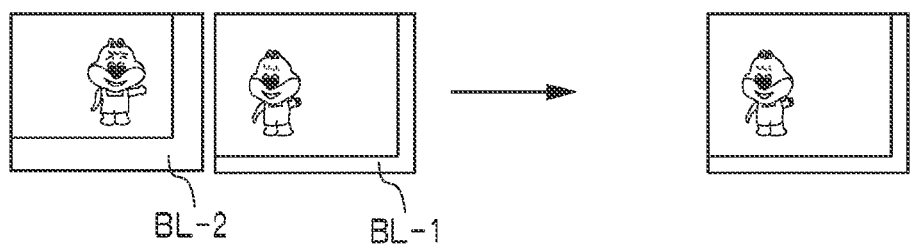
FIG. 43C is a diagram showing another example of image data with the minimum number of pixels in a complement target area.
Figure 43D:
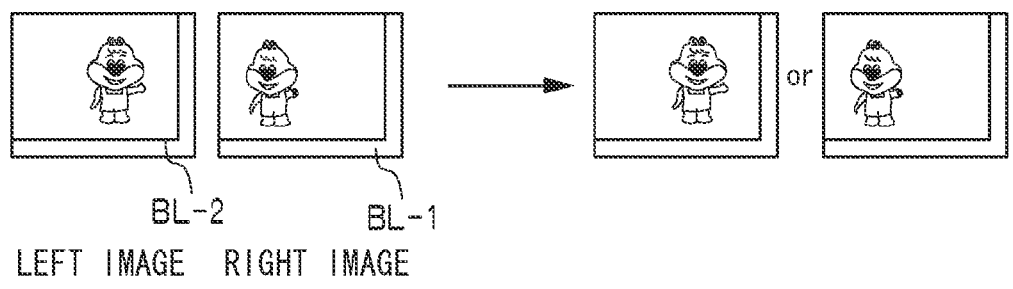
FIG. 43D is a diagram showing another example of image data with the minimum number of pixels in a complement target area.

FIGS. 43A to 43D show examples of the i-th (i=1, 2) viewpoint images and the image data with the minimum number of pixels in the complement target area. FIG. 43A illustrates that there is no non-pixel area BL in the left and right images, and an arbitrary one of the images is outputted as a 2D image. FIG. 43B illustrates that there is a non-pixel area BL in the left image, and the right image is outputted as a 2D image. FIG. 43C illustrates that the non-pixel area BL-1 of the right image is smaller than the non-pixel area BL-2 of the left image, and the right image is outputted as a 2D image. FIG. 43D illustrates that there are non-pixel areas BL with the same area in the left and right images, and an arbitrary one of the images is outputted as a 2D image.

As a result of the process, the 2D image is outputted based on the image data with a small non-pixel area, and the quality of the 2D image is not reduced.

Fourteenth Embodiment

Figure 44:
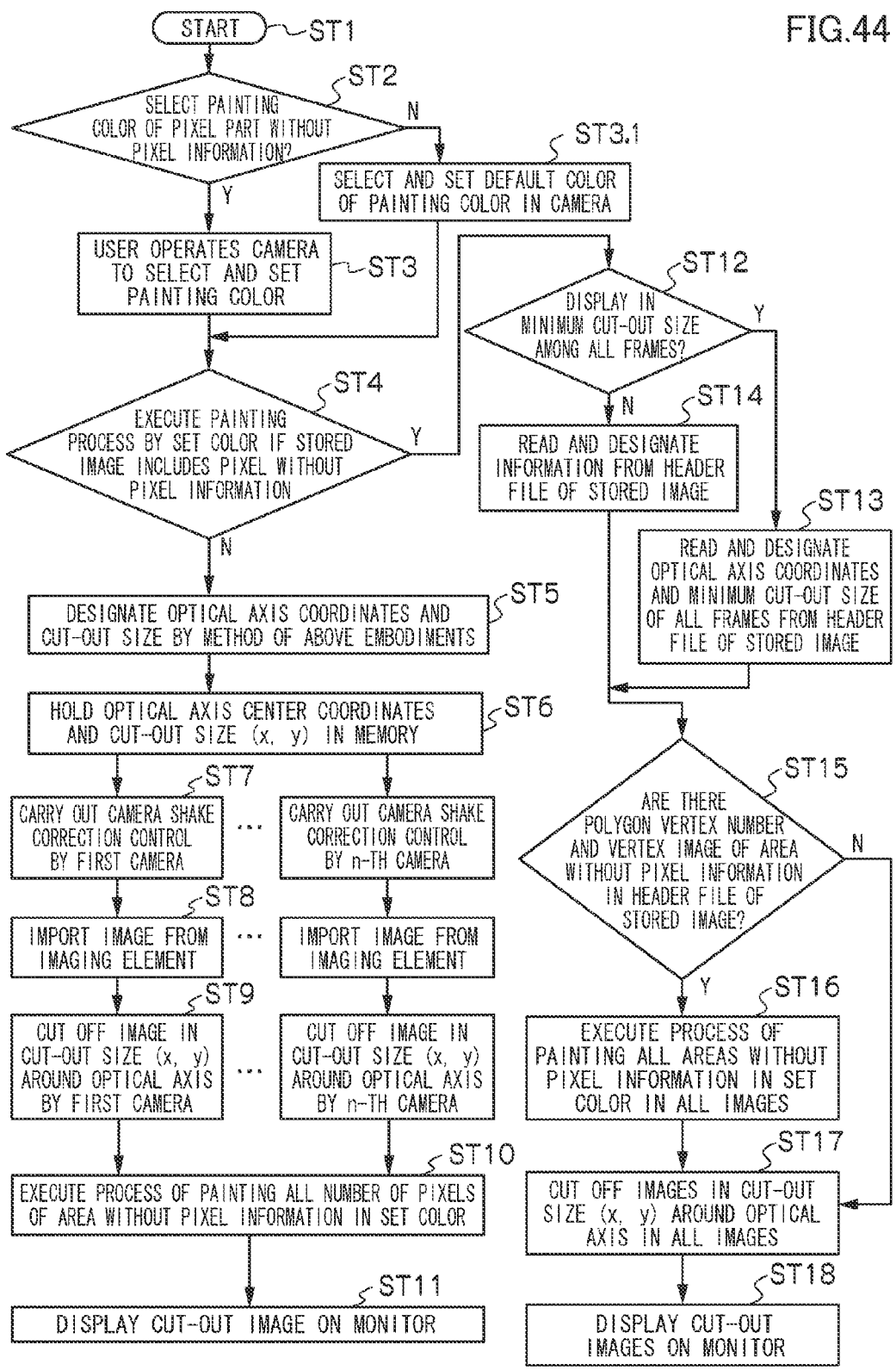
FIG. 44 is a flow chart of a process according to a fourteenth embodiment.
Figure 45A:
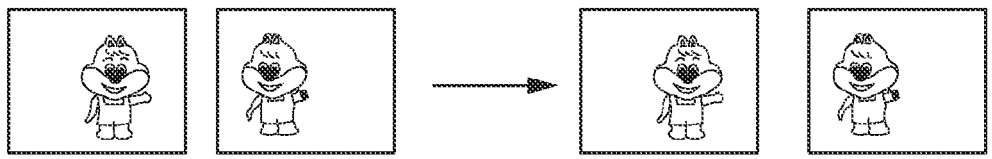
FIG. 45A is a diagram showing an example of a non-pixel area and painting.
Figure 45B:
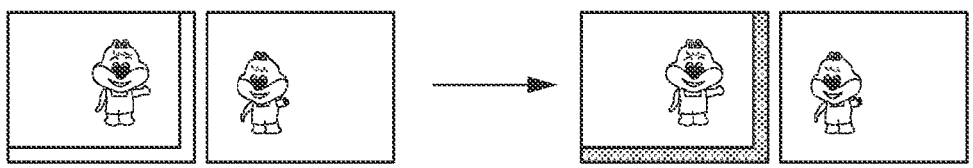
FIG. 45B is another diagram showing an example of a non-pixel area and painting.
Figure 45C:
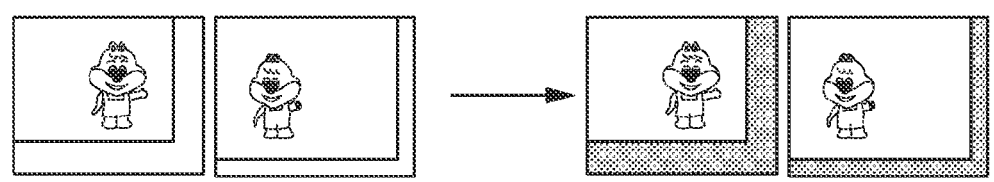
FIG. 45C is another diagram showing an example of a non-pixel area and painting.
Figure 45D:
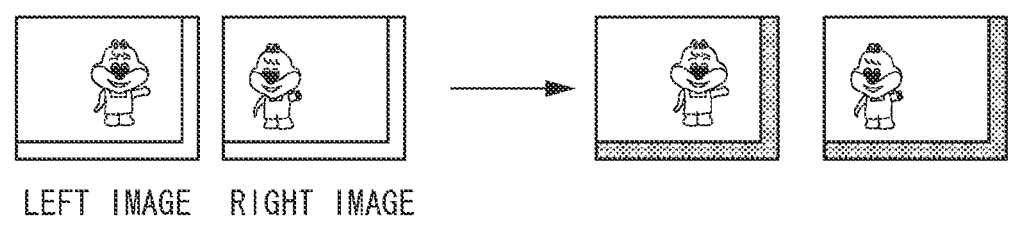
FIG. 45D is another diagram showing an example of a non-pixel area and painting.

FIG. 44 shows a flow chart of a correction process executed by the imaging apparatus 10*a* or 10*b* according to a fourteenth embodiment. A program according to the fourteenth embodiment for causing the camera control unit 40*a* or 40*b* to execute the process is stored in the ROM 41. The imaging apparatus 10*a* or 10*b* of the fourth embodiment (FIG. 12) can execute the process.

In ST1, the camera control unit 40 proceeds to ST2 in accordance with the reception of the start of a display operation from the operation unit 17.

St2 to 3.1 are similar to the fourth embodiment (FIG. 13). However, the cut-out size does not have to be selected.

In ST4, the camera control unit 40 receives, from the operation unit 17, an instruction of whether to paint a non-pixel area of an i-th viewpoint image if the i-th viewpoint image recorded in the recording medium 20 includes an area without pixel information. The process proceeds to ST12 if the instruction is received and proceeds to ST3 if the instruction is not received.

ST5 to 9 are the same as ST3 to 7 of the thirteenth embodiment.

ST10 and 11 are similar to ST9 and 10 of the fourth embodiment (FIG. 13). However, the non-pixel area of the i-th viewpoint image (or first to n-th image data) cut out from the i-th image data from the i-th imaging unit 3 is painted.

ST12 to 15 are the same as ST10 to 13 of the thirteenth embodiment (FIG. 42).

In ST16, the camera control unit 40 controls the painting unit 56 to paint the non-pixel areas of the first to n-th image data by the color set in ST3 or 3.1. FIGS. 45A to 45D show examples of the non-pixel areas and painting when n=2 (first and second image data).

S17 is similar to S15 of the thirteenth embodiment (FIG. 42). However, the cut-off sources of the i-th viewpoint images are the first to n-th image data in which the non-pixel areas are painted.

S18 is the same as ST16 of the thirteenth embodiment (FIG. 42).

As a result of the process, the non-pixel areas are painted when the i-th viewpoint images are cut out and reproduced from the recorded i-th image data, and the non-pixel areas can be inconspicuous compared to when the non-pixel areas are simply blank. Furthermore, the non-pixel areas and other areas can be distinguished.

Fifteenth Embodiment

Figure 46:
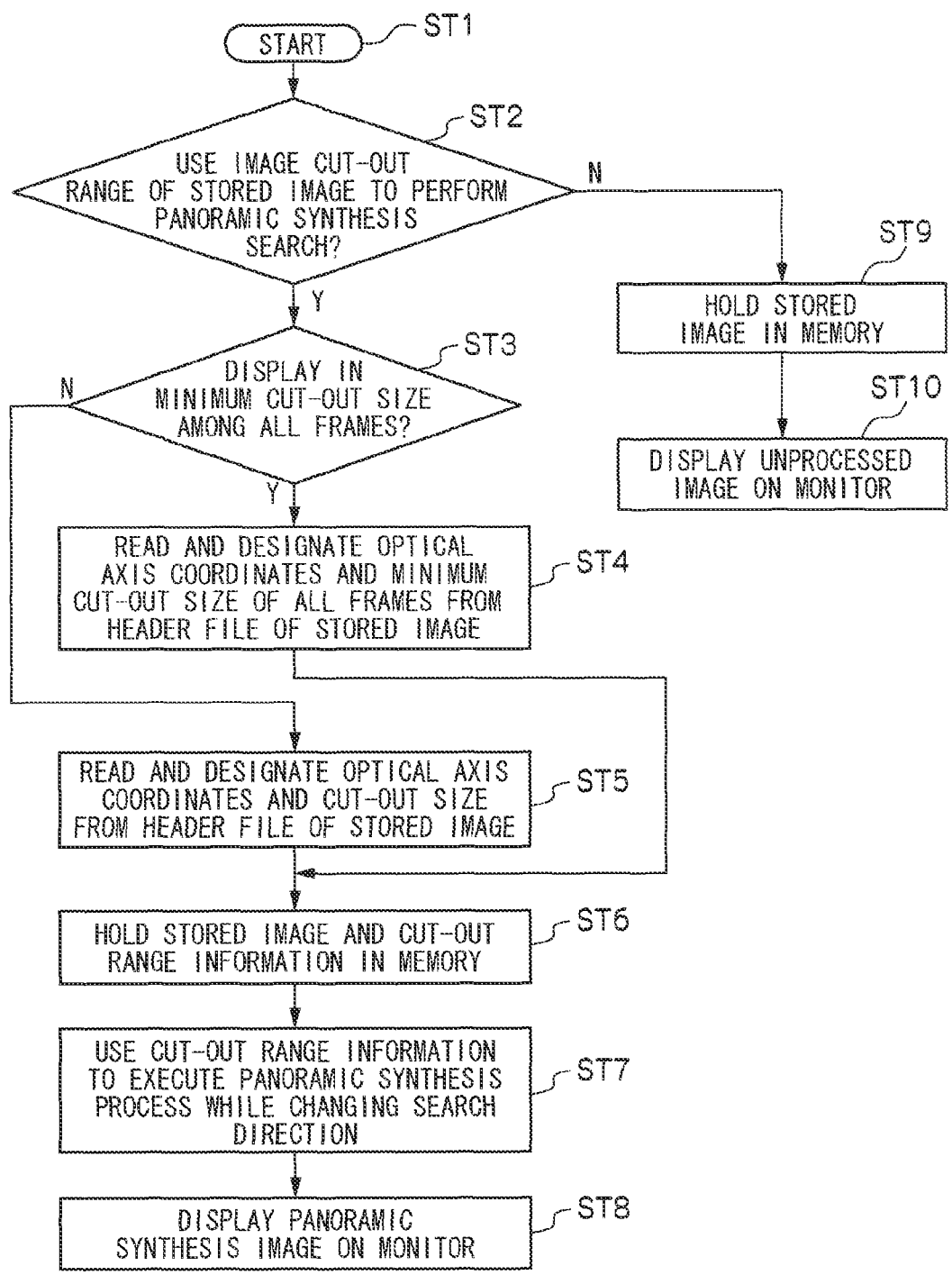
FIG. 46 is a flow chart of a process according to a fifteenth embodiment.

FIG. 46 shows a flow chart of a correction process executed by the imaging apparatus 10*a* or 10*b* according to a fifteenth embodiment. A program according to the fifteenth embodiment for causing the camera control unit 40*a* or 40*b* to execute the process is stored in the ROM 41. The imaging apparatus 10*a* or 10*b* of the fifth embodiment (FIG. 15) can execute the process.

In ST1, the camera control unit 40 proceeds to ST2 in response to the reception of the start of a display operation from the operation unit 17.

In ST2, the camera control unit 40 receives, from the operation unit 17, an instruction of whether to synthesize a panoramic image based on the cut-out range included in the storage information of image stored in the recording medium 20. The process proceeds to ST3 if the instruction is received and proceeds to ST9 if the instruction is not received.

In ST3, the camera control unit 40 receives, from the operation unit 17, an instruction of whether to display the image in the minimum cut-out size among all frames. The process proceeds to ST4 if the instruction is received and proceeds to ST5 if the instruction is not received.

In ST4, the camera control unit 40 reads out the images stored in the recording medium 20 and the storage information of the images. The storage information is stored in the seventh embodiment and includes the optical axis center coordinates, the minimum cut-out size, and the image cut-out coordinates.

In ST5, the camera control unit 40 reads out the images stored in the recording medium 20 and the storage information attached to the images. The storage information is stored in the seventh embodiment (FIG. 22) and includes the optical axis center coordinates, the cut-out size of each i-th viewpoint image, and the image cut-out coordinates.

In ST6, the camera control unit 40 stores the storage information read out from the recording medium 20 in the RAM 42.

In ST7, the camera control unit 40 controls the panoramic synthesis calculation unit 57 to search similar points that serve as a basis of the synthesis position of the panoramic image based on the storage information stored in the RAM 42 in ST5 or 6. More specifically, the panoramic synthesis calculation unit 57 sets a range, in which the displacement between the image cut-out coordinates of different i-th image data is corrected, as a search range of the similar points between different i-th image data and searches the similar points in the search range.

Figure 47:
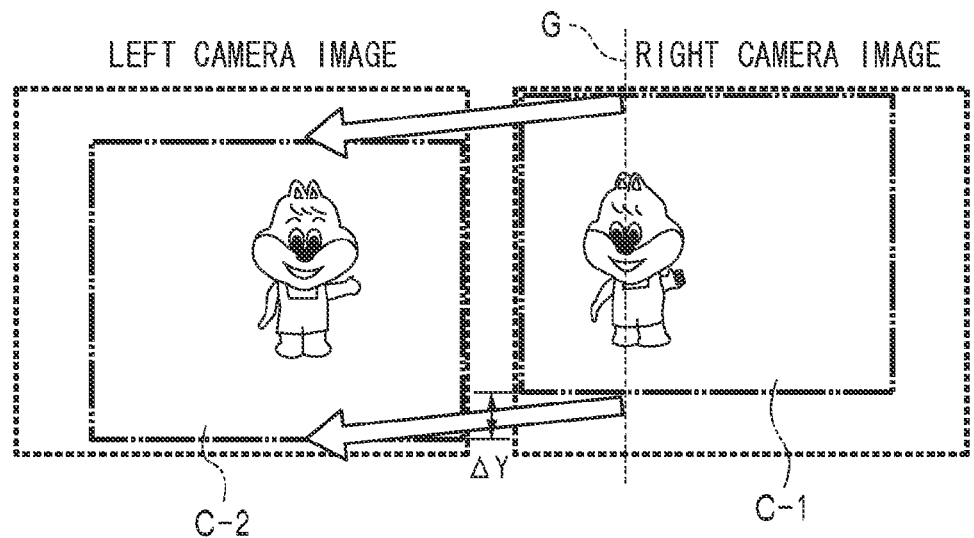
FIG. 47 is a diagram showing an example of correction of a search range.
Figure 48:
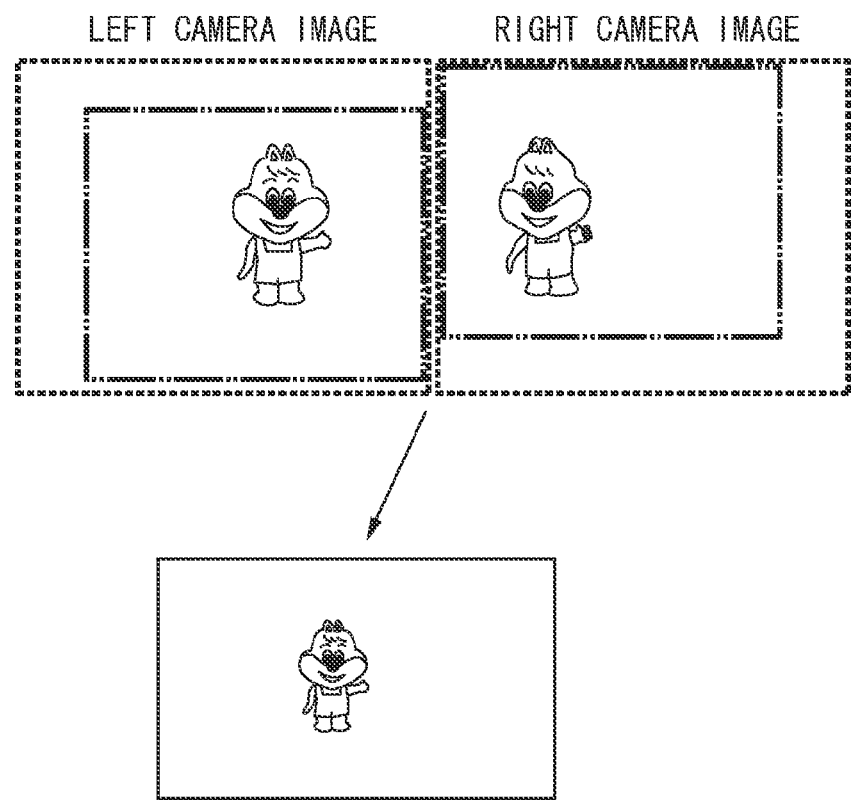
FIG. 48 is a diagram showing an example of a panoramic image.

FIG. 47 shows an example of correction of the search range when n=2 (first and second image data). The panoramic synthesis calculation unit 57 is designed to set, as base pixels, a pixel group G lined up in the vertical direction including the same X coordinate in the first image data and searches, from the second image data, the similar points similar to the pixel group G while scanning the pixel group G in the X direction in the first image data (moving the X coordinate of the pixel group G). In this case, the panoramic synthesis calculation unit 57 subtracts an amount of displacement ΔY in the Y direction between a cut-out range C-1 of the first image data and a cut-out range C-2 of the second image data from the Y coordinate of each pixel Yi constituting the pixel group G and sets the value as the Y coordinate in which similar points Y'i corresponding to the pixels Yi of the pixel group G should be searched. If the panoramic synthesis calculation unit 57 specifies X'0, which is an X coordinate of the similar points Y'i corresponding to the pixels Yi of the pixel group G including the same coordinate X0, a pixel group G' is determined as the similar points corresponding to the pixel group G. The panoramic synthesis calculation unit 57 synthesizes a panoramic image by attaching the first image data and the second image data so that the pixel group G of the first image data and the pixel group G' of the second image data coincide (see FIG. 48).

As a result of the process, a panoramic image can be synthesized from images stored after camera shake correction, in the same level of accuracy as from the images without the camera shake correction.

Sixteenth Embodiment

Figure 49:
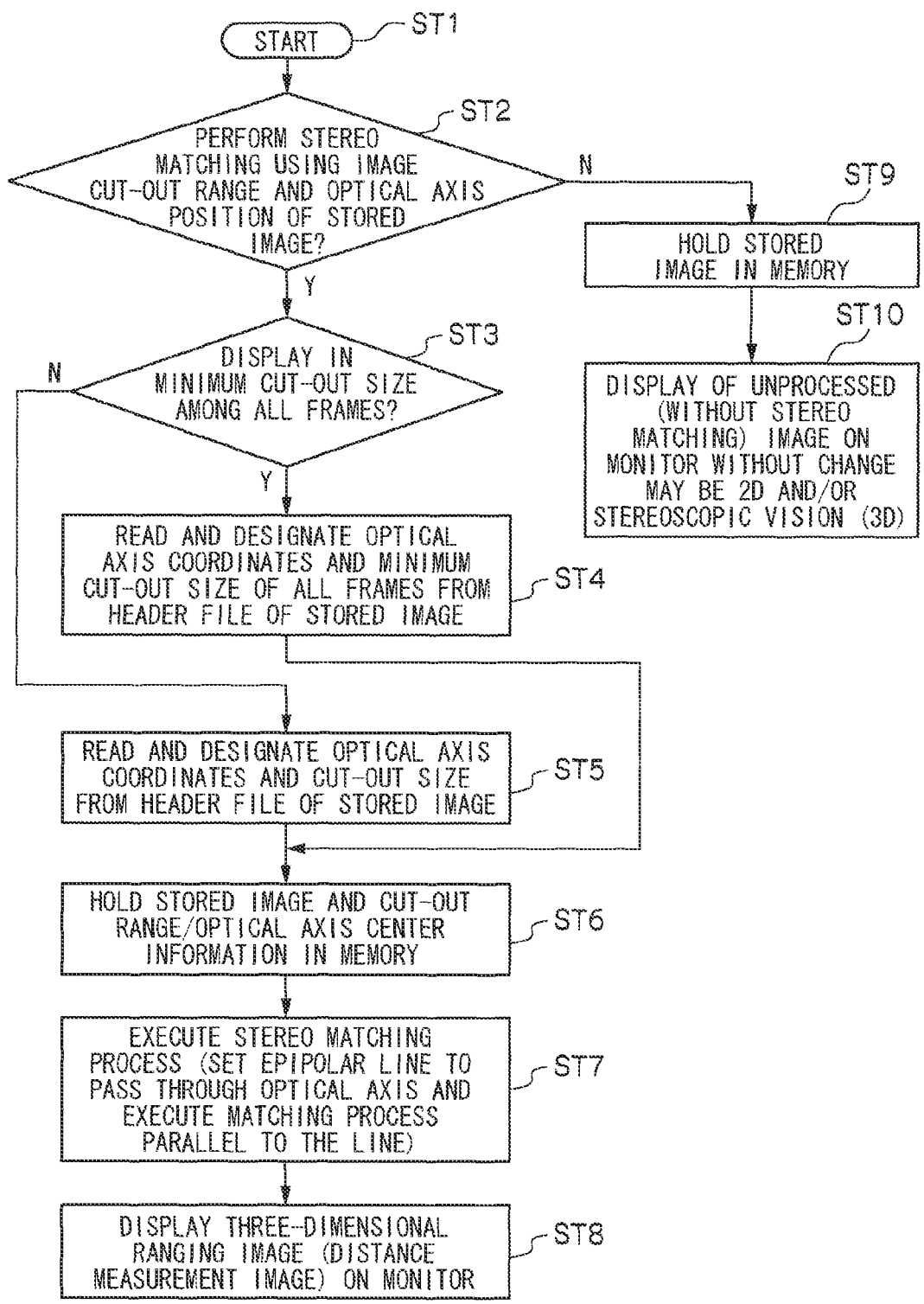
FIG. 49 is a flow chart of a process according to a sixteenth embodiment.

FIG. 49 shows a flow chart of a correction process executed by the imaging apparatus 10a or 10b according to a sixteenth embodiment. A program according to the sixteenth embodiment for causing the camera control unit 40a or 40b to execute the process is stored in the ROM 41. The imaging apparatus 10a or 10b of the sixth embodiment (FIG. 18) can execute the process.

In ST1, the camera control unit 40 proceeds to ST2 in response to the reception of the start of a display operation from the operation unit 17.

In ST2, the camera control unit 40 receives, from the operation unit 17, an instruction of whether to perform stereo matching based on the cut-out range included in the attached information of the images stored in the recording medium 20. The process proceeds to ST3 if the instruction is received and proceeds to ST9 if the instruction is not received.

ST3 to 6 are the same as in the fifteenth embodiment.

Figure 50A:
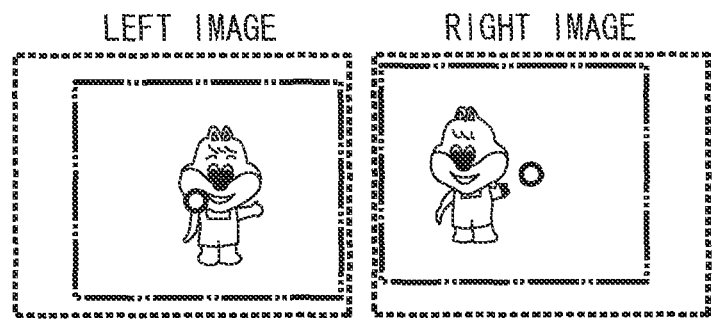
FIG. 50A is a diagram schematically showing stereo matching according to the sixteenth embodiment.
Figure 50B:
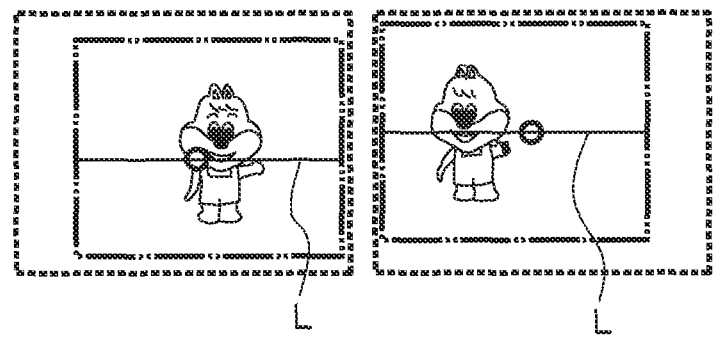
FIG. 50B is another diagram schematically showing stereo matching according to the sixteenth embodiment.
Figure 50C:
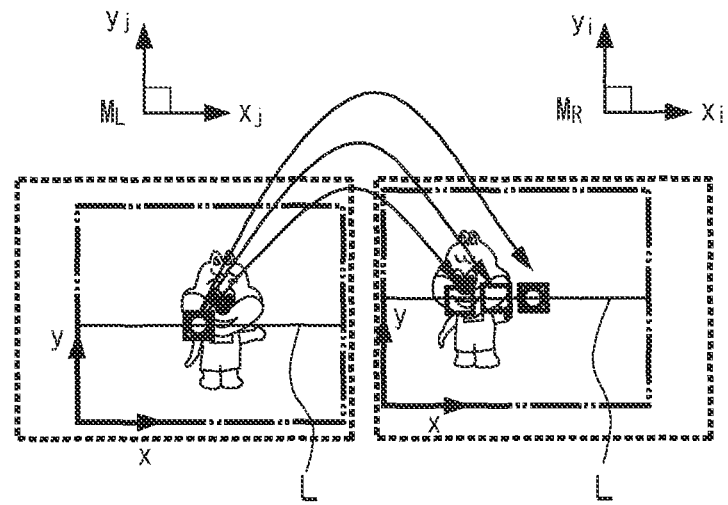
FIG. 50C is another diagram schematically showing stereo matching according to the sixteenth embodiment.

ST7 and 8 are similar to ST8 and 9 of the sixth embodiment (FIG. 19). However, the targets of the stereo matching and the display output are i-th viewpoint images cut out from the i-th image data read out from the recording medium 20 in ST5. FIG. 50A schematically shows an example of the i-th image data read out from the recording medium 20, FIG. 50B schematically shows an example of the epipolar lines L set to the i-th viewpoint images, and FIG. 50C schematically shows the stereo matching to the i-th viewpoint images.

In ST9, the camera control unit 40 reads out the images stored in the recording medium 20 to the frame memory 43.

In ST10, the camera control unit 40 outputs the images of the frame memory 43 to the monitor unit 18. The images may be 3D images or 2D images.

Seventeenth Embodiment

In the embodiments, frames of moving images recorded in the recording medium 20 can be handled as still images. Therefore, the present invention can be applied to recording of both the moving images and the still images. In recording a plurality of still images as in continuous imaging, the frames may be or may not be recorded in chronological order of imaging as in the moving images.

Eighteenth Embodiment

The direction of alignment of the imaging units 3 may be the vertical (Y) direction instead of the horizontal (X) direction. In this case, for example, a vertically long panoramic image can be obtained in the fifth and fifteenth embodiments. Or in sixth and sixteenth embodiments, the epipolar lines can be set in the Y direction to search the corresponding points. The direction of alignment of the imaging units 3 may be a diagonal direction. Therefore, the epipolar line can be set in the direction of alignment of the lens optical axes Li of the imaging units 3, and the corresponding points can be searched in the direction parallel to the epipolar line.

REFERENCE SIGNS LIST

51: cut-out position/size determination unit, 52: initial optical axis center position memory unit, 53: cut-out size memory unit, 70: complement target area calculation unit, 56: painting unit, 57: panoramic synthesis calculation unit, 58: stereo matching calculation unit, 59: association processing unit, 60: image association processing unit, 61: parallax correction unit, 62: 3D/2D switch image selection unit, 63: display frame and cut-out frame cooperative calculation unit, 64: number of pixels counting/comparing unit

The invention claimed is:

1. An imaging apparatus comprising: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging apparatus comprising:

a size determination unit that determines a cut-out size for cutting out an image for output from an image acquired from each of the plurality of imaging units, the size determination unit determining the cut-out size with a predetermined aspect ratio common to a plurality of images acquired from each of the plurality of imaging units based on a possible area in a minimum size among sizes of possible areas around an initial optical axis center included in areas common to prescribed imaging areas based on the initial optical axis center before each vibration correction by the plurality of imaging units and imaging areas after each vibration correction by the plurality of imaging units; and a cut-out unit that cuts out the image for output from each of the plurality of images in the common cut-out size determined by the size determination unit based on the initial optical axis center before each vibration correction by the plurality of imaging units.

2. An imaging apparatus comprising: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging apparatus comprising:

a size determination unit that determines a cut-out size for cutting out an image for output from an image acquired from each of the plurality of imaging units, the size determination unit determining, for each of the plurality of imaging units, a possible cut-out area around an initial optical axis center included in an invariant imaging area independent of vibration correction by the vibration correction unit for each of the plurality of imaging units and then determining the cut-out size with a predetermined aspect ratio common to the images from each of the plurality of imaging units based on a minimum value of sizes of the possible cut-out areas corresponding to the plurality of imaging units; and a cut-out unit that cuts out the image for output from each of the plurality of imaging units in the common cut-out size determined by the size determination unit based on the initial optical axis center before each vibration correction by the plurality of imaging units.

3. The imaging apparatus according to claim 2, wherein the size determination unit determines, for each of the plurality of imaging units, the invariant imaging area based on a common area between two different imaging areas displaced to the maximum extent in a vertical direction and/or a horizontal direction by the vibration correction by the vibration correction unit for each of the plurality of imaging units.

4. The imaging apparatus according to claim 3, wherein the size determination unit determines, for each of the plurality of imaging units, the common area between two different imaging areas displaced to the maximum extent in the vertical direction and/or the horizontal direction obtained by the vibration correction carried out at least twice by the vibration correction unit for each of the plurality of imaging units and sets the common area determined for each of the plurality of imaging units as the invariant imaging area corresponding to each imaging unit.

5. The imaging apparatus according to claim 1, comprising an image complement unit that complements a complement target area, which is beyond a prescribed cut-out range, by an image of an effective pixel area of the imaging units equivalent to the complement target area if the image for output cut out by the cut-out unit includes the complement target area.

6. The imaging apparatus according to claim 1, comprising a color complement unit that complements a complement target area, which is beyond a prescribed cut-out range of the imaging units, by a predetermined color if the image for output cut-out by the cut-out unit includes the complement target area.

7. The imaging apparatus according to claim 1, comprising a panoramic image creation unit that creates a panoramic image by combining each image based on the initial optical axis center of each image for output cut out by the cut-out unit.

8. The imaging apparatus according to claim 1, comprising a stereo matching calculation unit that performs stereo matching by setting an epipolar line based on the initial optical axis center of each image for output cut out by the cut-out unit and by calculating a correlation of each image for output along the epipolar line.

9. The imaging apparatus according to claim 1, comprising a storage unit that associates and stores each image from each of the plurality of imaging units and the initial optical axis center position as well as the cut-out size of each image.

10. The imaging apparatus according to claim 1, comprising a storage unit that associates and stores each image for output corresponding to each image acquired at the same imaging time from each of the plurality of imaging units.

11. The imaging apparatus according to claim 5, comprising a storage unit that associates, with the image for output, coordinates of the complement target area of the image for output and identification information of the image for output including the minimum complement target area to store the coordinates and the identification information.

12. The imaging apparatus according to claim 1, comprising a parallax adjustment unit that determines the cut-out positions of the images for output so that a parallax between the images for output becomes a predetermined parallax amount while the cut-out size of the images for output is maintained.

13. The imaging apparatus according to claim 1, comprising an output unit that outputs a plane image or a stereoscopic image based on the images cut out by the cut-out unit.

14. The imaging apparatus according to claim 1, comprising a designation unit that receives a designation of an enlargement position, wherein the cut-out unit changes the position of cutting out the image for output in accordance with the enlargement position if the enlargement position received by the designation unit reaches a borderline of cutting out the image for output from the image.

15. The imaging apparatus according to claim 11, comprising a plane image output unit that outputs the image with the minimum complement target area as a plane image based on the identification information stored in the storage unit.

16. The imaging apparatus according to claim 11, comprising:

a color complement unit that complements the complement target area stored in the storage unit by a predetermined color; and an output unit that outputs a plane image or a stereoscopic image based on the image for which the color complement unit has complemented the color.

17. The imaging apparatus according to claim 9, comprising a panoramic image creation unit that cuts out each image for output based on the initial optical axis center position and the cut-out size corresponding to each image stored in the storage unit and then combines each output image to create a panoramic image.

18. The imaging apparatus according to claim 9, comprising
a stereo matching calculation unit that cuts out each output image based on the initial optical axis center position and the cut-out size corresponding to each image stored in the storage unit and then sets the epipolar line to each image for output based on the initial optical axis center to calculate the correlation of each image for output along the epipolar line to perform the stereo matching.

19. An imaging method executed by an imaging apparatus, the imaging apparatus comprising: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging method comprising:
a step of determining a cut-out size with a predetermined aspect ratio common to a plurality of images acquired from each of the plurality of imaging units based on a possible area in a minimum size among sizes of possible areas around an initial optical axis center included in areas common to prescribed imaging areas based on the initial optical axis center before each vibration correction by the plurality of imaging units and imaging areas after each vibration correction by the plurality of imaging units to determine the cut-out size for cutting out an image for output from an image acquired from each of the plurality of imaging units; and
a step of cutting out the image for output from each of the plurality of images in the common cut-out size determined by the size determination unit based on the initial optical axis center before each vibration correction by the plurality of imaging units.

20. An imaging method executed by an imaging apparatus, the imaging apparatus comprising: a plurality of imaging units that take subject images from different viewpoints; a vibration detection unit that detects each vibration of the imaging units; and a vibration correction unit that corrects the vibration of the subject image taken by each imaging unit based on the vibration of each imaging unit detected by the vibration detection unit, the imaging method comprising:
a step of determining, for each of the plurality of imaging units, a possible cut-out area around an initial optical axis center included in an invariant imaging area independent of vibration correction by the vibration correction unit for each of the plurality of imaging units and then determining a cut-out size with a predetermined aspect ratio common to the images from each of the plurality of imaging units based on a minimum value of sizes of the possible cut-out areas corresponding to the plurality of imaging units to determine the cut-out size for cutting out an image for output from an image acquired from each of the plurality of imaging units; and
a step of cutting out the image for output from each of the plurality of imaging units in the common cut-out size determined by the size determination unit based on the initial optical axis center before each vibration correction by the plurality of imaging units.

21. A non-transitory computer readable medium comprising a program for causing the imaging apparatus to execute the imaging method according to claim 19.

22. A non-transitory recording medium recording a computer-readable code of the program according to claim 21.

* * * * *